US012548408B2

(12) United States Patent
Shane et al.

(10) Patent No.: US 12,548,408 B2
(45) Date of Patent: Feb. 10, 2026

(54) SYMBOL ACCUMULATION SEQUENCE WITH ONE OR MORE DIFFERENT ENHANCEMENT FEATURES

(71) Applicant: IGT, Las Vegas, NV (US)

(72) Inventors: David Shane, Reno, NV (US); Michael DeBrabander, Reno, NV (US)

(73) Assignee: IGT, Las Vegas, NV (US)

( * ) Notice: Subject to any disclaimer, the term of this patent is extended or adjusted under 35 U.S.C. 154(b) by 538 days.

(21) Appl. No.: 18/052,357

(22) Filed: Nov. 3, 2022

(65) Prior Publication Data

US 2024/0153354 A1 May 9, 2024

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
CPC ............. G07F 17/3267; G07F 17/3213; G07F 17/3258; G07F 17/3265; G07F 17/3262
See application file for complete search history.

(56) References Cited

U.S. PATENT DOCUMENTS 5,393,057 A 2/1995 Marnell
5,573,249 A * 11/1996 Johnson .................. G07F 17/32 273/292
5,788,573 A 8/1998 Baerlocher et al.
5,823,873 A * 10/1998 Moody ..................... A63F 1/00 463/13
5,833,537 A 11/1998 Barrie
5,897,436 A * 4/1999 Singer ....................... A63F 1/00 273/303
5,971,849 A * 10/1999 Falciglia ............. G07F 17/3293 463/19
6,015,344 A 1/2000 Kelly et al.
6,159,095 A * 12/2000 Frohm .................... G07F 17/32 463/19
6,174,235 B1 1/2001 Walker et al.
6,315,664 B1 11/2001 Baerlocher et al.
6,319,124 B1 11/2001 Baerlocher et al.
6,439,995 B1 8/2002 Hughs-Baird et al.
6,572,472 B1 6/2003 Glavich
6,572,473 B1 6/2003 Baerlocher
6,599,193 B2 7/2003 Baerlocher et al.
6,609,972 B2 8/2003 Seelig et al.
6,612,927 B1 * 9/2003 Slomiany ............ G07F 17/3267 463/16
6,682,420 B2 1/2004 Webb et al.
6,726,563 B1 4/2004 Baerlocher et al.
(Continued)

OTHER PUBLICATIONS

"2048 (video game)", www.en.wikipedia.org/wiki/2048_(video_game), available before the priority date of this patent application.

*Primary Examiner* — David L Lewis
*Assistant Examiner* — Matthew D Hoel

(57) ABSTRACT

Gaming systems and methods providing a symbol accumulation sequence that includes one or more different enhancement features. The different enhancement features can be provided individually or can be provided in any suitable combination of these different enhancement features including two or more or all of the different enhancement features combined together. The different enhancement features can include a compression enhancement feature.

17 Claims, 64 Drawing Sheets

(56) References Cited

U.S. PATENT DOCUMENTS 6,733,386 B2 5/2004 Cuddy et al.
6,758,747 B2 7/2004 Baerlocher
6,840,859 B2 1/2005 Cannon et al.
6,913,532 B2 7/2005 Baerlocher et al.
6,926,607 B2 * 8/2005 Slomiany ............ G07F 17/3262 463/16
6,958,013 B2 10/2005 Miereau et al.
6,971,954 B2 12/2005 Randall et al.
6,971,955 B2 12/2005 Baerlocher et al.
7,001,275 B2 * 2/2006 McCall .................. G07F 17/32 463/22
7,018,293 B2 * 3/2006 Brown .................... G07F 17/32 463/20
7,056,213 B2 6/2006 Ching et al.
7,169,043 B2 1/2007 Seelig et al.
7,238,110 B2 7/2007 Glavich et al.
7,252,589 B1 8/2007 Marks et al.
7,255,644 B2 8/2007 Duhamel
7,264,546 B2 9/2007 Marshall et al.
7,267,611 B2 * 9/2007 Slomiany ................ G07F 17/32 463/16
7,300,348 B2 11/2007 Kaminkow et al.
7,314,409 B2 1/2008 Maya et al.
7,316,608 B2 1/2008 Moody
7,335,102 B2 2/2008 Baerlocher et al.
7,351,141 B2 4/2008 Rodgers et al.
7,384,334 B2 6/2008 Glavich et al.
7,470,189 B2 12/2008 Baerlocher et al.
7,526,736 B2 4/2009 Kaminkow et al.
7,566,269 B2 7/2009 B-Jensen et al.
7,578,736 B2 8/2009 Baerlocher et al.
7,585,218 B2 9/2009 Mead et al.
7,585,219 B2 9/2009 Randall et al.
7,591,722 B2 9/2009 Baerlocher et al.
7,597,620 B2 10/2009 Webb et al.
7,607,980 B2 10/2009 Masci et al.
7,611,406 B2 11/2009 Fuller
7,654,895 B2 2/2010 Pacey
7,666,083 B2 2/2010 Baerlocher et al.
7,695,363 B2 4/2010 Gilliland et al.
7,708,640 B2 5/2010 Burak et al.
7,789,747 B2 9/2010 Glavich et al.
7,811,165 B2 * 10/2010 Slomiany ............ G07F 17/3267 463/16
7,824,262 B2 11/2010 Webb et al.
7,867,073 B2 * 1/2011 Walker ...................... A63F 1/00 463/13
7,914,373 B2 3/2011 Webb et al.
7,922,573 B2 4/2011 Baerlocher et al.
7,949,413 B2 5/2011 Dorgelo et al.
7,993,199 B2 8/2011 Iddings et al.
8,002,620 B2 8/2011 Nicely et al.
8,016,657 B2 9/2011 Walker et al.
8,033,903 B2 10/2011 Cregan
8,038,522 B2 * 10/2011 Thomas ................. G07F 17/32 273/139
8,070,591 B2 12/2011 Fiden
8,079,903 B2 12/2011 Nicely et al.
8,105,145 B2 1/2012 Jaffe
8,118,664 B2 2/2012 Johnson
8,133,110 B1 3/2012 Muskin
8,152,630 B2 4/2012 Cohen
8,172,685 B2 5/2012 Englman et al.
8,192,270 B2 * 6/2012 Slomiany ................ G07F 17/32 463/19
8,210,930 B2 7/2012 Graham et al.
8,216,062 B2 7/2012 Baerlocher et al.
8,221,218 B2 7/2012 Gilliland et al.
8,231,454 B2 7/2012 Caputo
8,241,104 B2 8/2012 Wolf
8,267,777 B2 9/2012 Jaffe
8,287,358 B2 10/2012 Aoki
8,292,724 B2 10/2012 Marks et al.
8,328,636 B2 12/2012 Jaffe et al.
8,333,657 B1 12/2012 Nelson et al.
8,337,298 B2 12/2012 Baerlocher
8,342,945 B2 1/2013 Gomez
8,357,041 B1 1/2013 Saunders
8,360,851 B2 1/2013 Aoki et al.
8,371,924 B2 2/2013 Meyer
8,376,836 B2 2/2013 Baerlocher et al.
8,393,952 B2 3/2013 Frank et al.
8,408,993 B2 4/2013 Lafky et al.
8,419,519 B2 4/2013 Aoki et al.
8,425,303 B2 4/2013 Kennedy et al.
8,430,737 B2 4/2013 Saunders
8,449,362 B2 5/2013 Jackson
8,449,388 B2 5/2013 Nicely et al.
8,454,429 B2 6/2013 Jaffe et al.
8,500,549 B2 8/2013 Fujimoto et al.
8,500,551 B2 8/2013 Baerlocher et al.
8,517,827 B2 8/2013 Caputo et al.
8,550,899 B2 10/2013 Hornik et al.
8,556,708 B2 10/2013 Poole et al.
8,591,308 B2 11/2013 Hoffman et al.
8,602,865 B2 12/2013 Zielinski
8,616,953 B2 12/2013 Yi
8,672,762 B1 3/2014 Basallo et al.
8,747,205 B2 6/2014 Englman
8,753,190 B2 6/2014 Baerlocher et al.
8,764,537 B2 7/2014 Jaffe et al.
8,777,744 B2 7/2014 Basallo et al.
8,784,181 B2 7/2014 Caputo et al.
8,795,059 B2 8/2014 Aoki et al.
8,808,084 B2 * 8/2014 Visser ..................... G07F 17/34 463/31
8,814,654 B2 8/2014 Hoffman et al.
8,814,657 B2 8/2014 Englman et al.
8,888,582 B2 11/2014 Louie et al.
9,033,792 B2 5/2015 Rodgers et al.
9,047,740 B2 6/2015 Owen et al.
9,123,209 B2 9/2015 Pacey et al.
9,135,785 B2 9/2015 Hoffman et al.
9,142,088 B2 9/2015 Nicely et al.
9,183,706 B2 11/2015 Vancura
9,208,651 B2 12/2015 Jaffe
9,275,523 B1 3/2016 Hughes et al.
9,336,645 B2 5/2016 Bristol et al.
9,336,654 B2 5/2016 Nicely et al.
9,361,763 B1 6/2016 Aoki et al.
9,396,616 B2 7/2016 Baerlocher et al.
9,401,066 B2 7/2016 De Waal et al.
9,430,906 B2 8/2016 Aoki et al.
9,443,385 B2 9/2016 Adiraju et al.
9,472,058 B2 10/2016 Hornik et al.
9,483,900 B2 11/2016 Aoki et al.
9,569,935 B2 2/2017 Berman
9,589,424 B2 3/2017 Moody et al.
9,600,964 B2 3/2017 Hirato et al.
9,600,978 B2 * 3/2017 Acres .................. G07F 17/3213
9,640,024 B2 5/2017 Hornik
9,679,444 B2 6/2017 Ryan
9,704,352 B2 7/2017 Robbins et al.
9,852,574 B2 12/2017 Zoltewicz et al.
9,928,691 B2 3/2018 Olive
10,055,942 B2 * 8/2018 Gomez ............... G07F 17/3223
10,096,201 B2 10/2018 Basallo et al.
10,217,315 B2 2/2019 Rodgers et al.
10,255,761 B2 4/2019 Oh
10,339,761 B2 7/2019 Olive
10,467,855 B2 11/2019 Wolf et al.
10,553,068 B2 2/2020 Zehetner
10,607,439 B2 3/2020 Caputo
10,733,834 B1 8/2020 Hiten et al.
10,769,882 B2 9/2020 Uss et al.
10,825,285 B2 * 11/2020 Caputo ................. G07F 17/326
10,997,823 B2 5/2021 Marks et al.
11,011,025 B2 5/2021 Pierer
11,069,199 B2 7/2021 Marks et al.
11,238,691 B2 2/2022 Zehetner
11,393,293 B2 7/2022 Marks et al.
11,393,294 B2 7/2022 Marks et al.
11,410,489 B2 * 8/2022 Maya ...................... G07F 17/34

(56) References Cited

U.S. PATENT DOCUMENTS

| | | | | |
|---|---|---|---|---|
| 11,413,534 | B2 * | 8/2022 | Inaba | A63F 13/95 |
| 11,839,819 | B2 * | 12/2023 | Inaba | A63F 13/57 |
| 2002/0022514 | A1 | 2/2002 | Randall et al. | |
| 2002/0160827 | A1 * | 10/2002 | Slomiany | G07F 17/3244 463/16 |
| 2003/0045348 | A1 | 3/2003 | Palmer et al. | |
| 2003/0073480 | A1 * | 4/2003 | Thomas | G07F 17/3262 463/18 |
| 2003/0100356 | A1 * | 5/2003 | Brown | G07F 17/32 463/9 |
| 2003/0157977 | A1 * | 8/2003 | Thomas | G07F 17/3293 463/16 |
| 2003/0157982 | A1 | 8/2003 | Gerrard et al. | |
| 2003/0199294 | A1 * | 10/2003 | Walker | A63F 1/00 463/13 |
| 2003/0207707 | A1 * | 11/2003 | Slomiany | G07F 17/3267 463/16 |
| 2004/0018872 | A1 | 1/2004 | Baerlocher et al. | |
| 2004/0023708 | A1 | 2/2004 | Kaminkow et al. | |
| 2004/0082378 | A1 | 4/2004 | Peterson et al. | |
| 2004/0127275 | A1 * | 7/2004 | McCall | G07F 17/32 463/13 |
| 2005/0043082 | A1 | 2/2005 | Peterson et al. | |
| 2005/0054414 | A1 | 3/2005 | Gauselmann | |
| 2005/0055114 | A1 * | 3/2005 | Thomas | G07F 17/3227 700/91 |
| 2005/0101378 | A1 | 5/2005 | Kaminkow et al. | |
| 2005/0250578 | A1 * | 11/2005 | Slomiany | G07F 17/3293 463/20 |
| 2005/0255903 | A1 | 11/2005 | Jackson | |
| 2006/0019738 | A1 | 1/2006 | Baerlocher et al. | |
| 2006/0043669 | A1 * | 3/2006 | Gumina | A63F 3/0665 273/139 |
| 2006/0068884 | A1 | 3/2006 | Baerlocher et al. | |
| 2006/0082064 | A1 * | 4/2006 | Caterinicchio | G07F 17/3293 273/292 |
| 2006/0116188 | A1 | 6/2006 | Blankstein | |
| 2006/0116208 | A1 | 6/2006 | Chen et al. | |
| 2006/0247002 | A1 | 11/2006 | Yoshimi et al. | |
| 2007/0010316 | A1 | 1/2007 | Baerlocher et al. | |
| 2007/0026920 | A1 | 2/2007 | Flint et al. | |
| 2007/0060261 | A1 | 3/2007 | Gomez | |
| 2007/0060297 | A1 | 3/2007 | Hein et al. | |
| 2007/0060338 | A1 * | 3/2007 | Kefaloukos | G06T 11/60 463/30 |
| 2008/0064487 | A1 | 3/2008 | Stevens et al. | |
| 2008/0102914 | A1 * | 5/2008 | Werkstell | G07F 17/3293 463/13 |
| 2008/0139287 | A1 | 6/2008 | Okada | |
| 2008/0254854 | A1 * | 10/2008 | Slomiany | G07F 17/32 463/19 |
| 2008/0268943 | A1 * | 10/2008 | Jacob | A63F 13/10 463/43 |
| 2009/0075722 | A1 | 3/2009 | Louie et al. | |
| 2009/0117978 | A1 | 5/2009 | Dias | |
| 2009/0149246 | A1 * | 6/2009 | Opaluch | A63F 13/30 463/30 |
| 2009/0191947 | A1 | 7/2009 | Stevens et al. | |
| 2009/0209317 | A1 | 8/2009 | Gomez | |
| 2009/0221348 | A1 | 9/2009 | Yoshizawa | |
| 2009/0233679 | A1 | 9/2009 | Yoshizawa | |
| 2009/0247271 | A1 | 10/2009 | Olive et al. | |
| 2010/0029381 | A1 | 2/2010 | Vancura | |
| 2010/0160030 | A1 * | 6/2010 | Indrakumar | G07F 17/3258 463/20 |
| 2010/0222123 | A1 | 9/2010 | Hornik | |
| 2010/0285864 | A1 | 11/2010 | Baerlocher et al. | |
| 2010/0304834 | A1 | 12/2010 | Okada | |
| 2011/0059790 | A1 * | 3/2011 | Slomiany | G07F 17/3293 463/22 |
| 2011/0218028 | A1 * | 9/2011 | Acres | G07F 17/3213 463/20 |
| 2011/0300920 | A1 * | 12/2011 | Slomiany | G07F 17/3262 463/20 |
| 2012/0013071 | A1 | 1/2012 | Kane et al. | |
| 2012/0122544 | A1 | 5/2012 | Roemer et al. | |
| 2012/0214580 | A1 | 8/2012 | Hoffman et al. | |
| 2012/0231868 | A1 | 9/2012 | Guinn | |
| 2012/0264497 | A1 * | 10/2012 | Iosilevsky | G07F 17/3293 463/13 |
| 2013/0029756 | A1 * | 1/2013 | Slomiany | G07F 17/3293 463/25 |
| 2013/0137497 | A1 * | 5/2013 | Werkstell | G07F 17/32 463/13 |
| 2013/0172061 | A1 * | 7/2013 | Iosilevsky | A63F 13/80 463/9 |
| 2013/0331173 | A1 | 12/2013 | Jaffe | |
| 2014/0018146 | A1 * | 1/2014 | Zielinski | G07F 17/3267 463/20 |
| 2014/0094263 | A1 | 4/2014 | Johnson et al. | |
| 2014/0113699 | A1 | 4/2014 | Wald | |
| 2015/0065224 | A1 | 3/2015 | Aoki et al. | |
| 2015/0262450 | A1 | 9/2015 | Elias et al. | |
| 2015/0262457 | A1 | 9/2015 | Jhanb | |
| 2015/0364014 | A1 | 12/2015 | Moody et al. | |
| 2016/0042594 | A1 * | 2/2016 | Bennett | G07F 17/3225 463/20 |
| 2016/0093141 | A1 | 3/2016 | Nelson et al. | |
| 2016/0133094 | A1 | 5/2016 | Thomas et al. | |
| 2016/0171821 | A1 | 6/2016 | Hughes et al. | |
| 2016/0253873 | A1 | 9/2016 | Olive | |
| 2016/0300453 | A1 * | 10/2016 | Slomiany | G07F 17/326 |
| 2016/0328909 | A1 * | 11/2016 | Joung | G07F 17/3244 |
| 2017/0092070 | A1 | 3/2017 | Marston et al. | |
| 2017/0109963 | A1 * | 4/2017 | Caputo | G07F 17/34 |
| 2017/0154498 | A1 | 6/2017 | Olive | |
| 2017/0256127 | A1 | 9/2017 | Zoltewicz et al. | |
| 2017/0345262 | A1 * | 11/2017 | Gomez | G07F 17/3295 |
| 2017/0372558 | A1 | 12/2017 | You et al. | |
| 2018/0061186 | A1 | 3/2018 | Berman et al. | |
| 2018/0122184 | A1 | 5/2018 | Wortmann | |
| 2018/0225929 | A1 | 8/2018 | Caputo | |
| 2018/0275825 | A1 | 9/2018 | Drake | |
| 2018/0286183 | A1 | 10/2018 | Davis et al. | |
| 2019/0088077 | A1 | 3/2019 | Zehetner | |
| 2019/0172305 | A1 * | 6/2019 | Maya | G07F 17/3225 |
| 2020/0051381 | A1 | 2/2020 | Tam et al. | |
| 2020/0074814 | A1 | 3/2020 | Marks et al. | |
| 2020/0143639 | A1 | 5/2020 | Berman | |
| 2020/0202671 | A1 | 6/2020 | Halvorson | |
| 2021/0049866 | A1 | 2/2021 | Caputo | |
| 2021/0097812 | A1 | 4/2021 | Malik et al. | |
| 2021/0110636 | A1 | 4/2021 | Halvorson et al. | |
| 2021/0142622 | A1 * | 5/2021 | Sanborn | G07F 17/34 |
| 2021/0248864 | A1 | 8/2021 | Marks et al. | |
| 2021/0295654 | A1 | 9/2021 | Kiss et al. | |
| 2021/0304565 | A1 | 9/2021 | Marks et al. | |
| 2021/0335097 | A1 | 10/2021 | Marks et al. | |
| 2021/0366228 | A1 * | 11/2021 | Zehetner | G07F 17/3213 |
| 2021/0366229 | A1 * | 11/2021 | Zehetner | G07F 17/3213 |
| 2021/0398392 | A1 | 12/2021 | Satterlie | |
| 2022/0284772 | A1 | 9/2022 | Maya | |
| 2022/0319271 | A1 * | 10/2022 | Maya | G07F 17/34 |
| 2022/0327888 | A1 * | 10/2022 | Maya | G07F 17/3244 |
| 2023/0104611 | A1 * | 4/2023 | McCormick | G07F 17/3213 463/31 |
| 2024/0005737 | A1 * | 1/2024 | Brimmer | G07F 17/3244 |
| 2024/0078865 | A1 * | 3/2024 | Narducci | G07F 17/3213 |
| 2024/0153352 | A1 * | 5/2024 | Shane | G07F 17/3211 |
| 2024/0153353 | A1 * | 5/2024 | Shane | G07F 17/3244 |
| 2024/0153355 | A1 * | 5/2024 | Shane | G07F 17/3267 |

* cited by examiner

SYMBOL ACCUMULATION SEQUENCE WITH ONE OR MORE DIFFERENT ENHANCEMENT FEATURES

CROSS-REFERENCE TO RELATED APPLICATIONS

This application is related to the following commonly owned co-pending patent applications: U.S. application Ser. No. 18/052,333, entitled "SYMBOL ACCUMULATION SEQUENCE WITH ONE OR MORE DIFFERENT ENHANCEMENT FEATURES,"; U.S. application Ser. No. 18/052,348, entitled "SYMBOL ACCUMULATION SEQUENCE WITH ONE OR MORE DIFFERENT ENHANCEMENT FEATURES,"; and U.S. application Ser. No. 18/052,372, entitled "SYMBOL ACCUMULATION SEQUENCE WITH ONE OR MORE DIFFERENT ENHANCEMENT FEATURES,".

BACKGROUND

The present disclosure relates to a symbol accumulation sequence with one or more different enhancement features.

Gaming machines may provide players awards in plays of primary games. Gaming machines may require the player to place a wager to activate a play of a primary game. Gaming machines may determine such awards based on winning symbols or symbol combinations and on the amount of the wager. Gaming machines may provide secondary games. Gaming machines may provide awards to players in plays of secondary games. Gaming machines may provide symbol accumulation type secondary games. Gaming machines may provide awards to players in plays of symbol accumulation secondary games.

SUMMARY

In various embodiments, the present disclosure relates to a gaming system including a processor and a memory device which stores a plurality of instructions, which when executed by the processor, for a symbol accumulation sequence, cause the processor to cause a display, by a display device, of randomly determined accumulated award symbols at symbol display positions, the symbol display positions arranged in rows and columns, each of the accumulated award symbols indicating an award amount associated with that accumulated award symbol, wherein a first plurality of the accumulated award symbols are at the symbol display positions of a first one of the columns. The plurality of instructions, when executed by the processor, further cause the processor to: cause a display, by the display device, of a randomly determined compression triggering event; after the display of the compression triggering event, cause a display, by the display device, of a new accumulated award symbol at one of the symbol display positions of the first one of the columns, wherein the displayed new accumulated award symbol indicates an award amount that is at least a sum of the award amounts indicated by the first plurality of accumulated award symbols at the symbol display positions of the first one of the columns prior to the display of the compression triggering event; and after the display of the compression triggering event, cause a display, by the display device, of a removal the first plurality of accumulated award symbols from the symbol display positions of the first one of the columns.

In various other embodiments, the present disclosure relates to a gaming system including a processor and a memory device which stores a plurality of instructions, which when executed by the processor, for a symbol accumulation sequence, cause the processor to cause a display, by a display device, of randomly determined accumulated award symbols at symbol display positions, the symbol display positions arranged in rows and columns, each of the accumulated award symbols indicating an award amount associated with that accumulated award symbol, wherein a first plurality of the accumulated award symbols are at symbol display positions of a first one of the rows. The plurality of instructions, when executed by the processor, further cause the processor to: cause a display, by the display device, of a randomly determined compression triggering event; after the display of the compression triggering event, cause a display, by the display device, of a new accumulated award symbol at one of the symbol display positions of the first one of the rows, wherein the displayed new accumulated award symbol indicates an award amount that is at least a sum of the award amounts indicated by the first plurality of accumulated award symbols at the symbol display positions of the first one of the rows prior to the display of the compression triggering event; and after the display of the compression triggering event, cause a display, by the display device, of a removal the first plurality of accumulated award symbols from the symbol display positions of the first one of the rows.

In various other embodiments, the present disclosure relates to a gaming system including a processor and a memory device which stores a plurality of instructions, which when executed by the processor, for a symbol accumulation sequence, cause the processor to cause a display, by a display device, of randomly determined accumulated award symbols at symbol display positions, each of the accumulated award symbols indicating an award amount associated with that accumulated award symbol. The plurality of instructions, when executed by the processor, further cause the processor to: cause a display, by the display device, of a randomly determined compression triggering event; after the display of the compression triggering event, cause a display, by the display device, of a new accumulated award symbol at one of the symbol display positions, wherein the displayed new accumulated award symbol indicates an award amount that is at least a sum of the award amounts indicated by a first plurality of accumulated award symbols at the symbol display positions; and after the display of the compression triggering event, cause a display, by the display device, of a removal the first plurality of accumulated award symbols from the symbol display positions.

Additional features and advantages are described in, and will be apparent from, the following Detailed Description and the figures.

BRIEF DESCRIPTION OF THE SEVERAL VIEWS OF THE DRAWINGS

FIGS. 3AA and 3JJ are front views of screen shots of parts of symbol accumulation sequences of alternative example embodiments that show additional enhancement features in accordance with the present disclosure.

DETAILED DESCRIPTION

Figure 1:
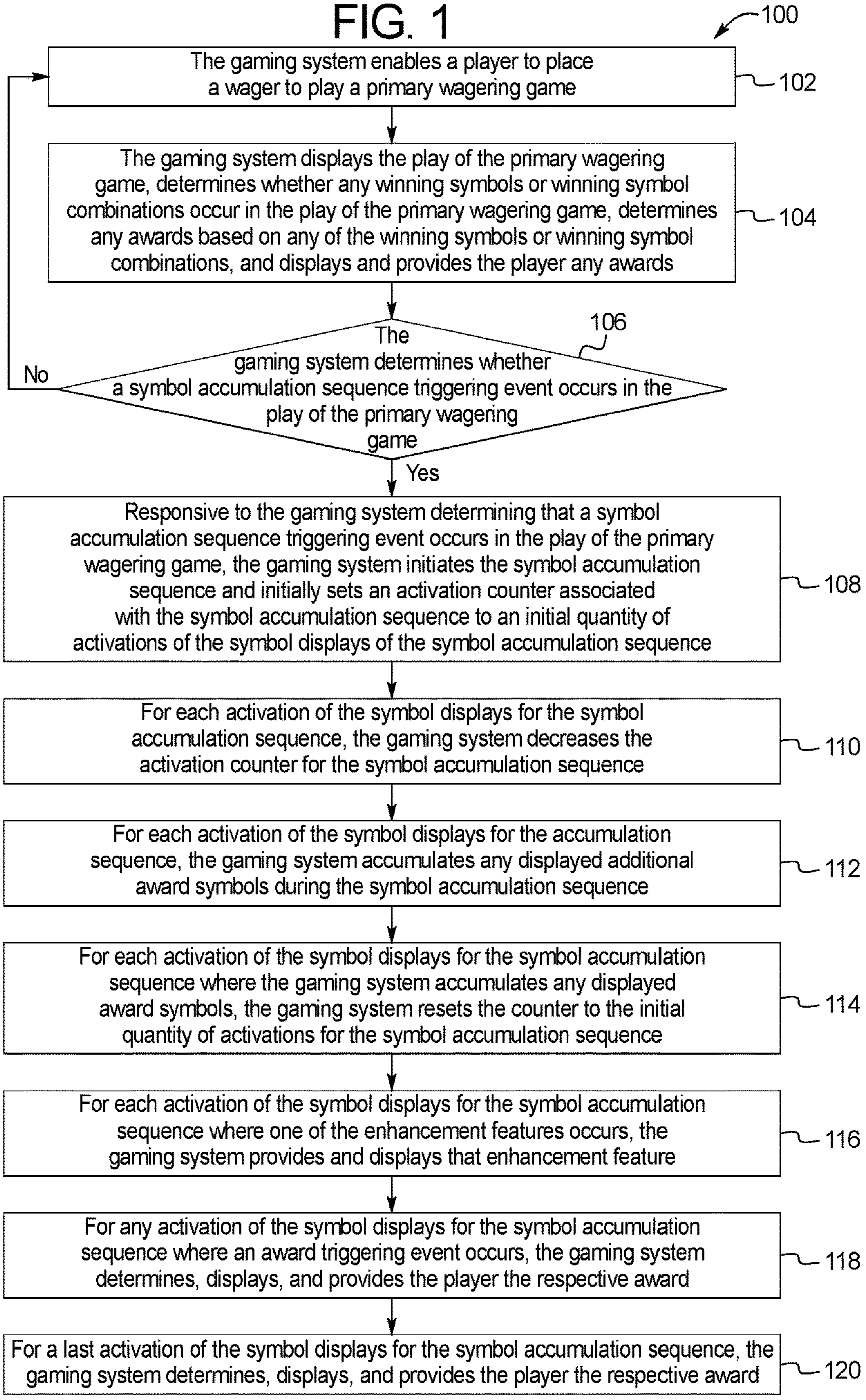
FIG. 1 is a flow chart of an example process for operating a gaming system providing a symbol accumulation sequence with a plurality of different enhancement features in accordance with various embodiments of the present disclosure.

In various embodiments, the present disclosure relates to gaming systems and methods that provide a symbol accumulation sequence that includes one or more different enhancement features. In various embodiments, the different enhancement features can be provided individually or can be provided in any suitable combination of these different enhancement features including two or more or all of the individual different enhancement features combined together. For brevity, the symbol accumulation sequence may sometimes be referred to herein as the accumulation sequence or as the sequence.

In various embodiments, the different enhancement features include: (1) a single function or multi-function sequence triggering symbol enhancement feature for the sequence; (2) a double-up enhancement feature for the sequence; (3) a boost enhancement feature for the sequence; (4) an extra-row enhancement feature for the sequence; (5) a compression enhancement feature for the sequence; (6) a secondary symbol accumulation enhancement feature for the sequence; (7) a secondary symbol accumulation enhancement feature with a blocking or delay feature for the sequence; (8) an alternative enhancement feature triggering symbol feature for the sequence; (9) an alternative sequence triggering feature for the sequence; (10) an alternative award triggering feature for the sequence; (11) a jackpot enhancement feature for the sequence; and (12) a collect feature for the sequence. Each of these different enhancement features are described below. Additionally, it should be appreciated that the secondary symbol accumulation enhancement feature for the sequence can be employed to provide other suitable enhancements for the sequence such as but not limited to additional counter resets for the sequence.

In various embodiments, the gaming system and method provide a primary game such as a primary wagering game, and for each play of the primary wagering game the gaming system and method display randomly determined symbols on symbol displays (such as on a plurality of reels) at a plurality of symbol display positions associated with the symbol displays. In various embodiments, one or more plays of the primary wagering game includes one or more of the enhancement features associated with or for triggering an accumulation sequence. For example, the single function or multi-function sequence triggering symbol enhancement feature can be applied for triggering a sequence from the play of the primary wagering game. Upon an occurrence of a symbol accumulation sequence triggering event in or associated with a play of the primary wagering game, the gaming system and method provide the symbol accumulation sequence based on or with one or more of the above enhancement features. In various embodiments, the symbol accumulation sequence triggering event includes the occurrence of a quantity of award symbols on the symbol displays. In various embodiments, the quantity of award symbols is predetermined (such as six award symbols), although the quantity can vary in accordance with the present disclosure. In various embodiments, the award symbols that trigger the symbol accumulation sequence remain on the symbol displays at the respective symbol display positions throughout the symbol accumulation sequence and are thus considered accumulated symbols for the symbol accumulation sequence. In various embodiments, the gaming system and method partly determine the total award for the symbol accumulation sequence based on these accumulated award symbols such as further explained below. The gaming system and method can also modify one or more of these award symbols during the accumulation sequence via various different enhancement features such as further described below. Thus, these the single function or multi-function sequence triggering symbol enhancement feature can provide one or more enhancements for the sequence.

In various embodiments, the symbol accumulation sequence includes a predefined initial quantity of activations of one or a plurality of the symbol displays (such as the reels) that each display a symbol at one of the plurality of symbol display positions associated therewith, wherein each activation utilizes previously one or more of the accumulated award symbols displayed by the symbol displays at the respective symbol display positions. In various embodiments, the predefined initial quantity is three, but can be any suitable quantity.

In various embodiments, the gaming system and method provide one or more of the enhancement features prior to or during the symbol accumulation sequence such as described herein or in other suitable manners. In various embodiments, one or more of the enhancement features are applied to trigger an accumulation sequence and/or to provide an enhancement feature in an accumulation sequence.

In various embodiments, the gaming system and method resets the remaining quantity of activations of the symbol displays for the symbol accumulation sequence responsive to a predefined additional quantity of award symbols being accumulated during an activation of the symbol displays of the symbol accumulation sequence. In various embodiments, the predefined quantity is one, but can be any suitable quantity.

In various embodiments, the gaming system and method ends the symbol accumulation sequence responsive to the quantity of activations of the symbol displays having all been employed (including any additional activations due to any resets of the quantity of remaining activations).

In various embodiments, the gaming system and method ends the symbol accumulation sequence responsive to the award symbols being accumulated at a quantity of (such as all of) the symbol display positions during activations of the symbol displays in the sequence.

While certain embodiments described below are directed to a secondary game including the symbol accumulation sequence, it should be appreciated that such embodiments may additionally or alternatively be employed in association with a primary game such as a primary wagering game.

While the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

FIG. 1 is a flowchart of an example process 100 of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

The gaming system enables a player to place a wager to play a primary wagering game, as indicated in block 102. In various embodiments, the gaming system enables a player to place the wager from a plurality of different wager amounts.

The gaming system displays the play of the primary wagering game, determines whether any winning symbols or winning symbol combinations occur in the play of the primary wagering game, determines any awards based on any of the winning symbols or winning symbol combinations, and displays and provides the player any awards, as indicated in block 104.

The gaming system determines whether a symbol accumulation sequence triggering event occurs in the play of the primary wagering game, as indicated in diamond 106.

Responsive to the gaming system determining that a symbol accumulation sequence triggering event occurs does not occur in the play of the primary wagering game, the gaming system returns to block 102.

Responsive to the gaming system determining that a symbol accumulation sequence triggering event occurs in the play of the primary wagering game, the gaming system initiates the symbol accumulation sequence and initially sets an activation counter associated with the symbol accumulation sequence to an initial quantity of activations of the symbol displays of the symbol accumulation sequence, as indicated in block 108. The activation counter tracks the quantity of activations of the symbol displays (such as the reels) for the symbol accumulation sequence.

For each activation of the symbol displays for the symbol accumulation sequence, the gaming system decreases the activation counter for the symbol accumulation sequence, as indicated in block 110.

For each activation of the symbol displays for the accumulation sequence, the gaming system accumulates any displayed additional award symbols during the symbol accumulation sequence, as indicated in block 112. In various embodiments, the gaming system accumulates award symbols displayed at the symbol display positions not otherwise associated with a previously accumulated award symbol. In other words, the gaming system of these embodiments accumulates up to one award symbol for each symbol display position associated with the symbol displays. If the gaming system determines to accumulate at least one award symbol, for each award symbol accumulated, the gaming system accumulates that award symbol in association with the symbol display position which that award symbol is displayed at. The gaming system displays an indication that an award symbol has been accumulated in association with that symbol display position. In various embodiments, once accumulated in association with a symbol display position for one quantity activations of the symbol accumulation sequence, the gaming system displays one or more award symbols at that same symbol display position for one, a plurality of, or each of the subsequent activations of the symbol displays of the symbol accumulation sequence.

For each activation of the symbol displays for the symbol accumulation sequence where the gaming system accumulates any displayed award symbols, the gaming system resets the counter to the initial quantity of activations for the symbol accumulation sequence, as indicated in block 114.

For each activation of the symbol displays for the symbol accumulation sequence where one of the enhancement features occurs, the gaming system provides and displays that enhancement feature, as indicated in block 116.

For any activation of the symbol displays for the accumulation sequence where an award triggering event occurs, the gaming system determines, displays, and provides the player the respective award, as indicated in block 118.

For a last activation of the symbol displays for the accumulation sequence, the gaming system determines, displays, and provides the player the respective award, as indicated in block 120. In other words, if the counter reaches zero for the symbol accumulation sequence, the gaming system provides any awards based on the accumulated award symbols associated with any of the symbol display positions and terminates the symbol accumulation sequence.

Figure 2A:
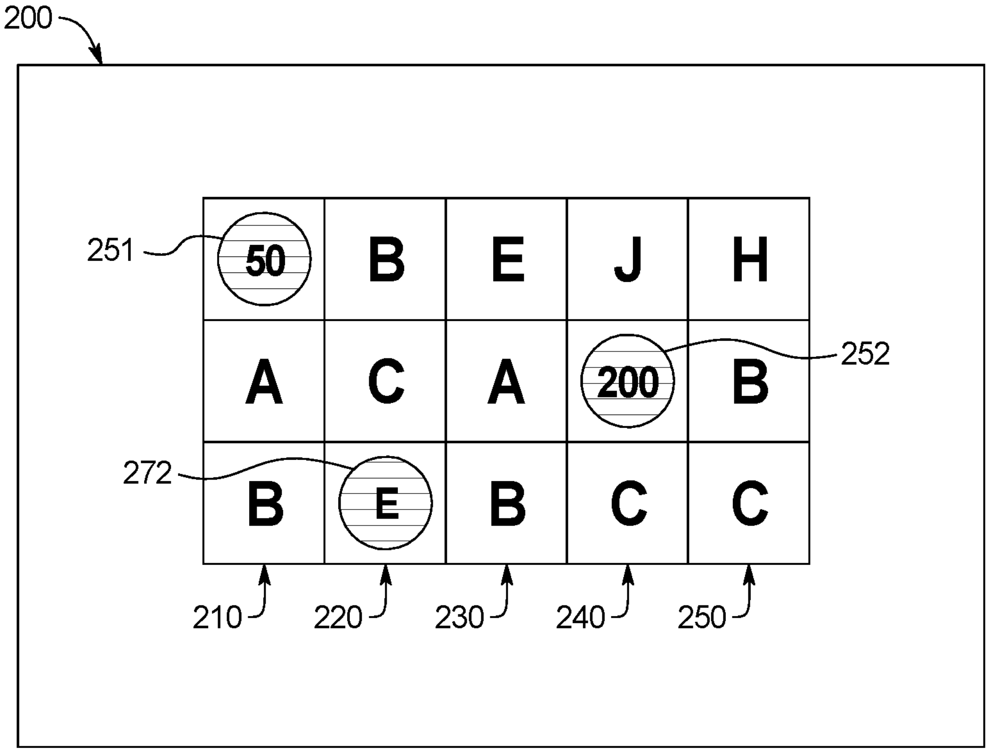
FIGS. 2A to 2Y are front views of screen shots of parts of plays of a primary wagering game and a symbol accumulation sequence triggered from the play of the primary wagering game, wherein the symbol accumulation sequence includes a plurality of different enhancement features of various embodiments of the present disclosure.
Figure 2B:
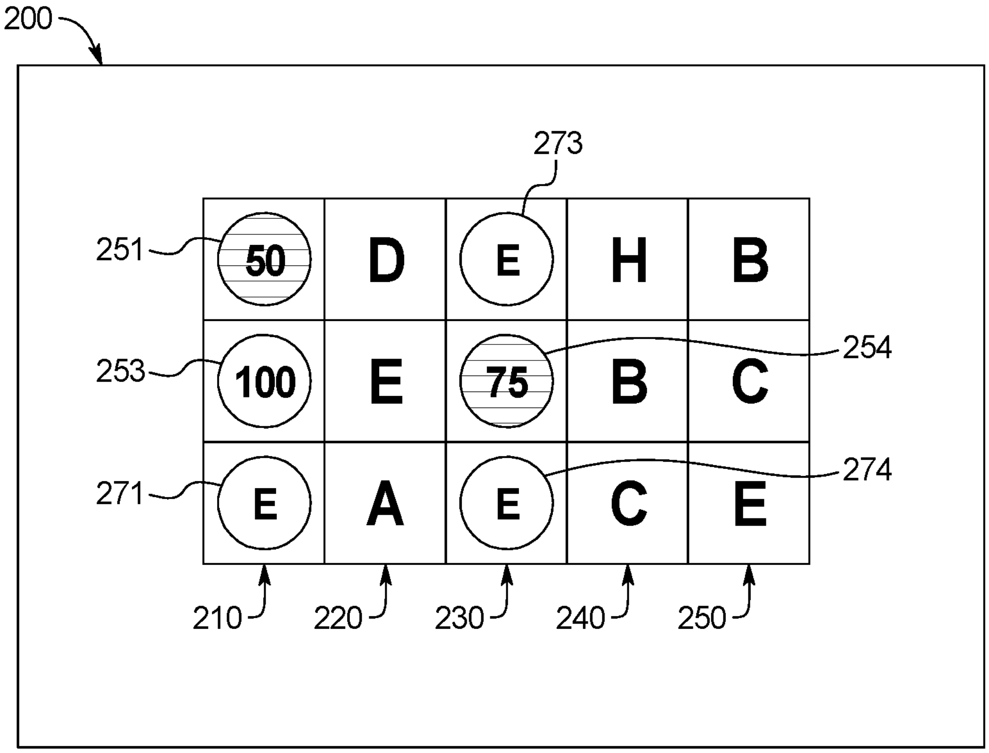
FIGS. 2Z and 2ZZ are front views of screen shots of parts of a symbol accumulation sequence of alternative example embodiments that show additional enhancement features in accordance with the present disclosure.
Figure 2C:
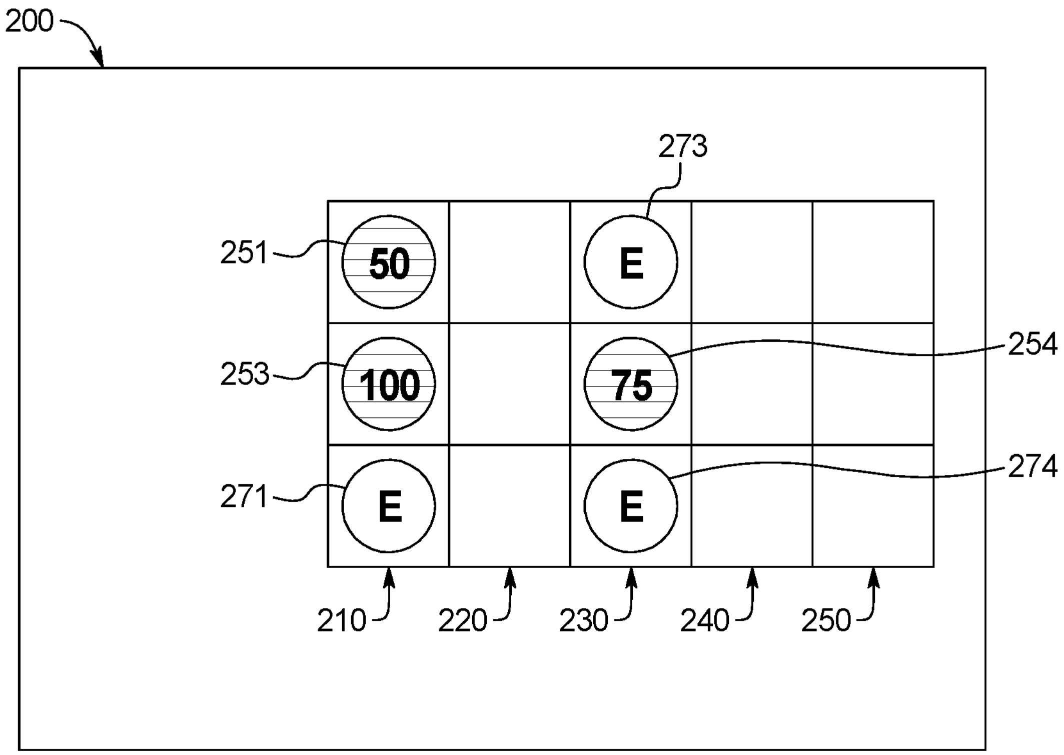
Figure 2D:
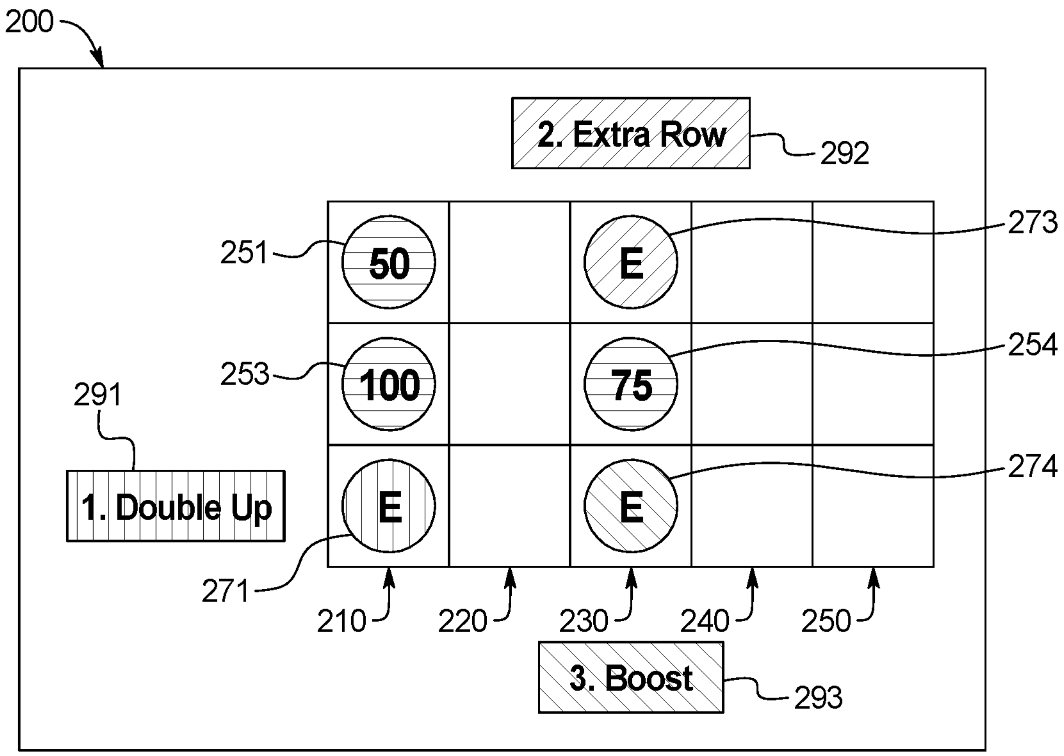
Figure 2E:
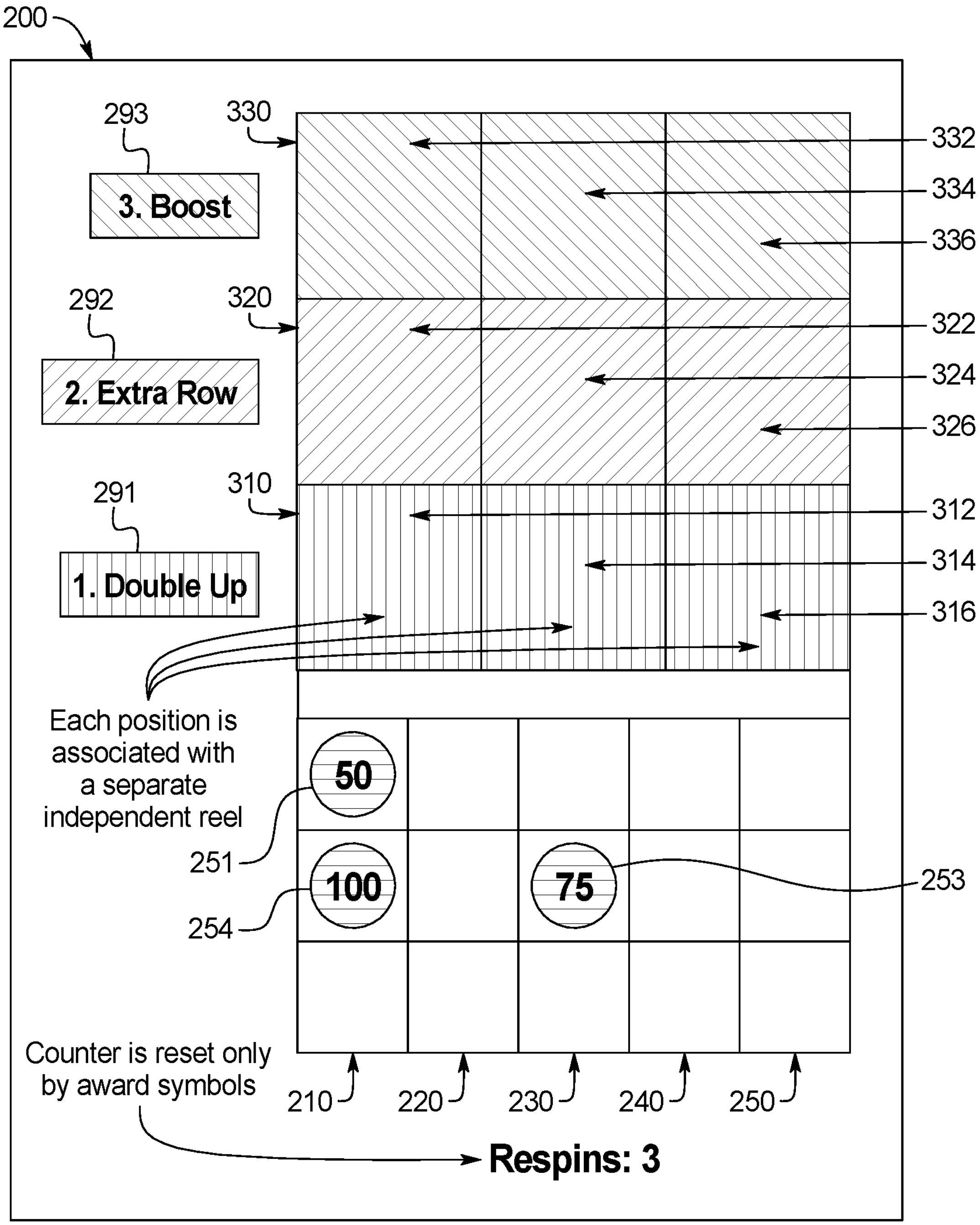
Figure 2F:
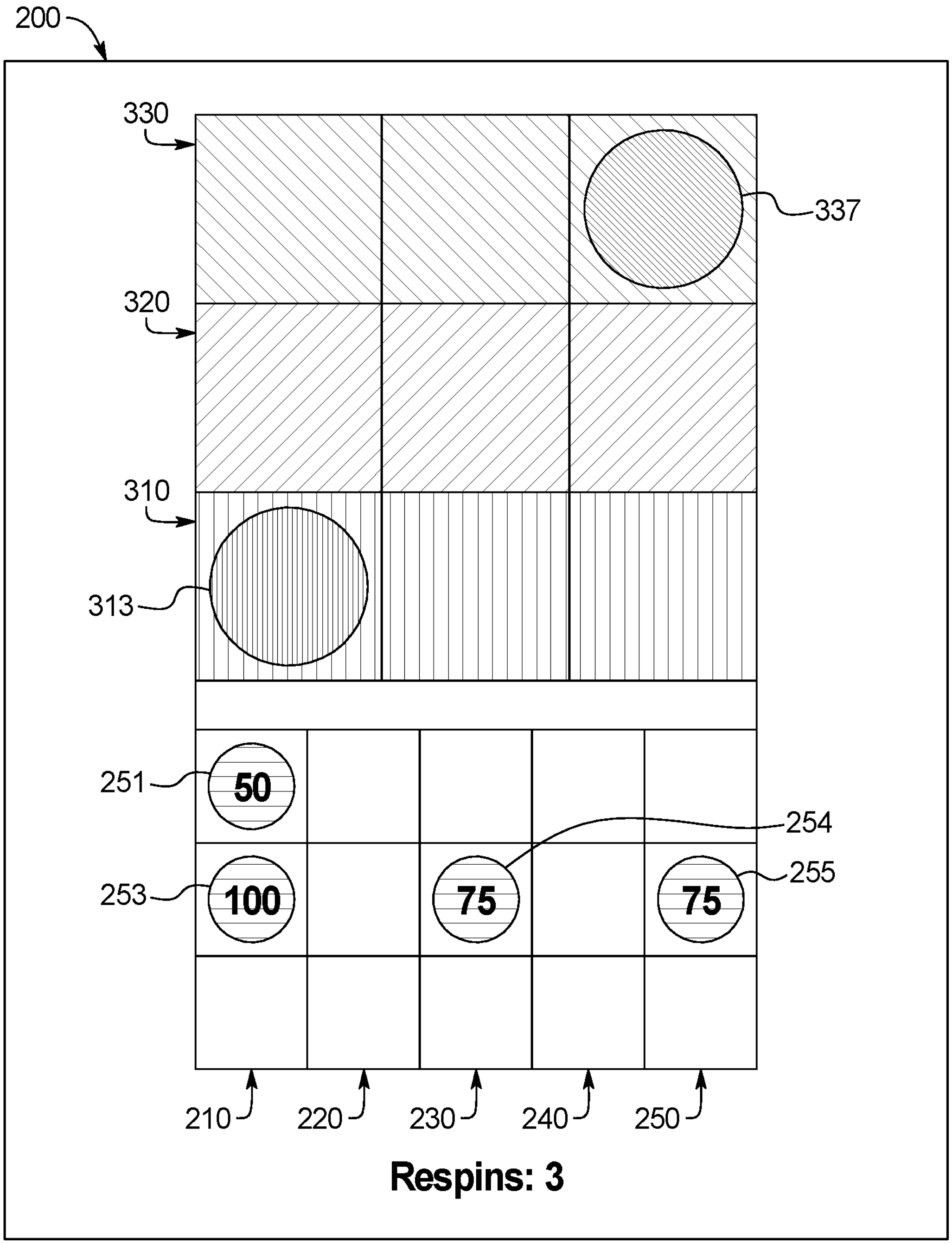
Figure 2G:
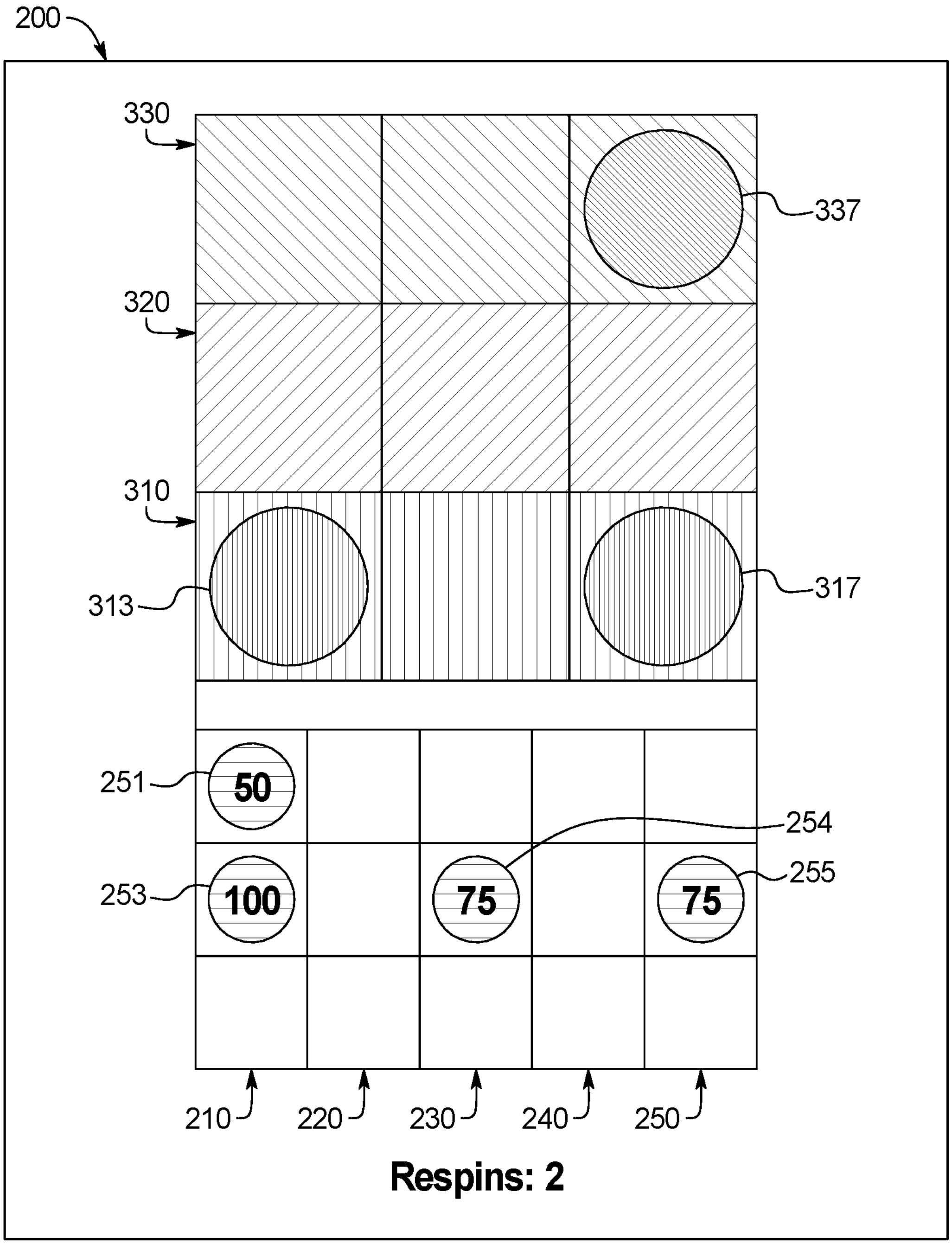
Figure 2H:
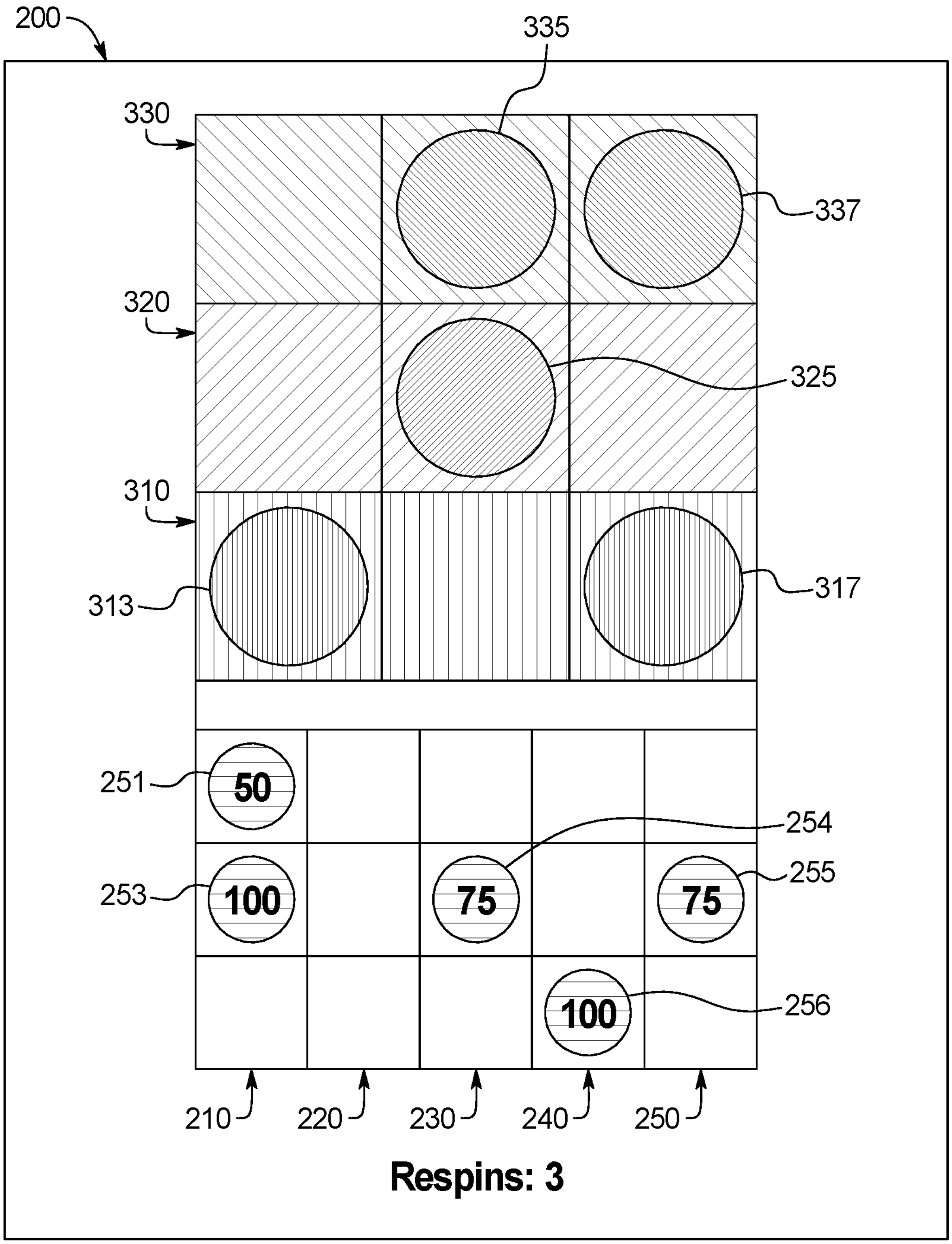
Figure 2I:
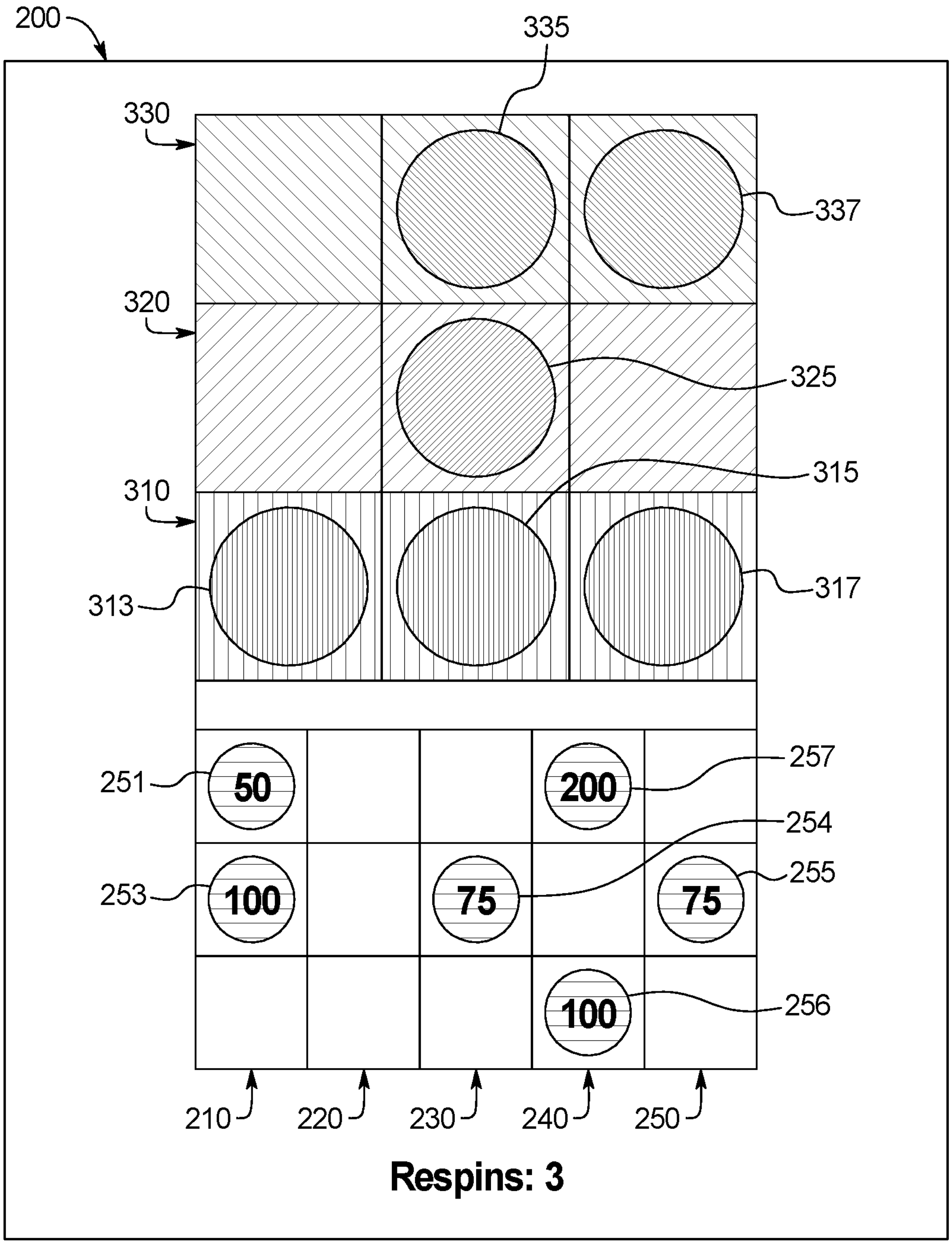
Figure 2J:
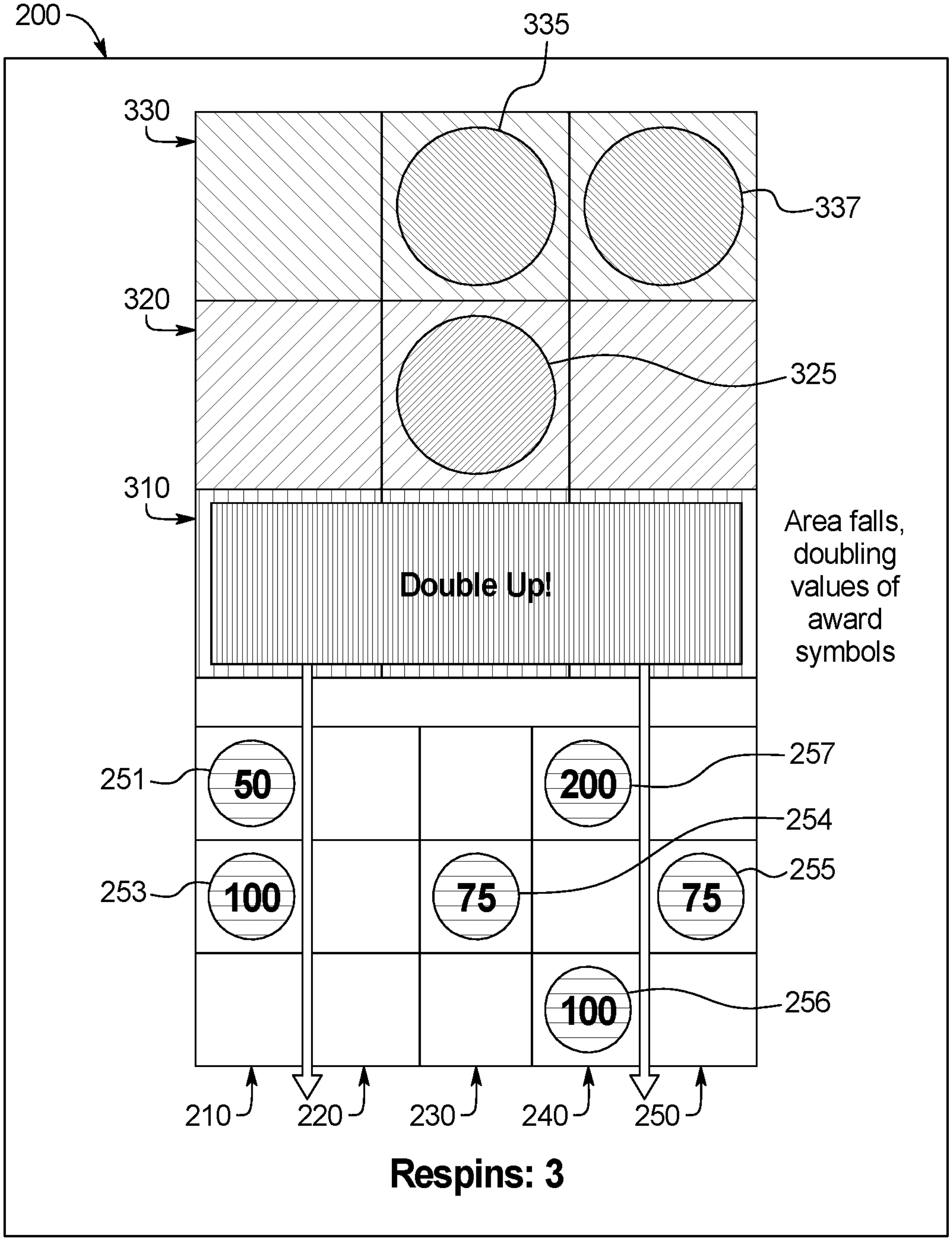
Figure 2K:
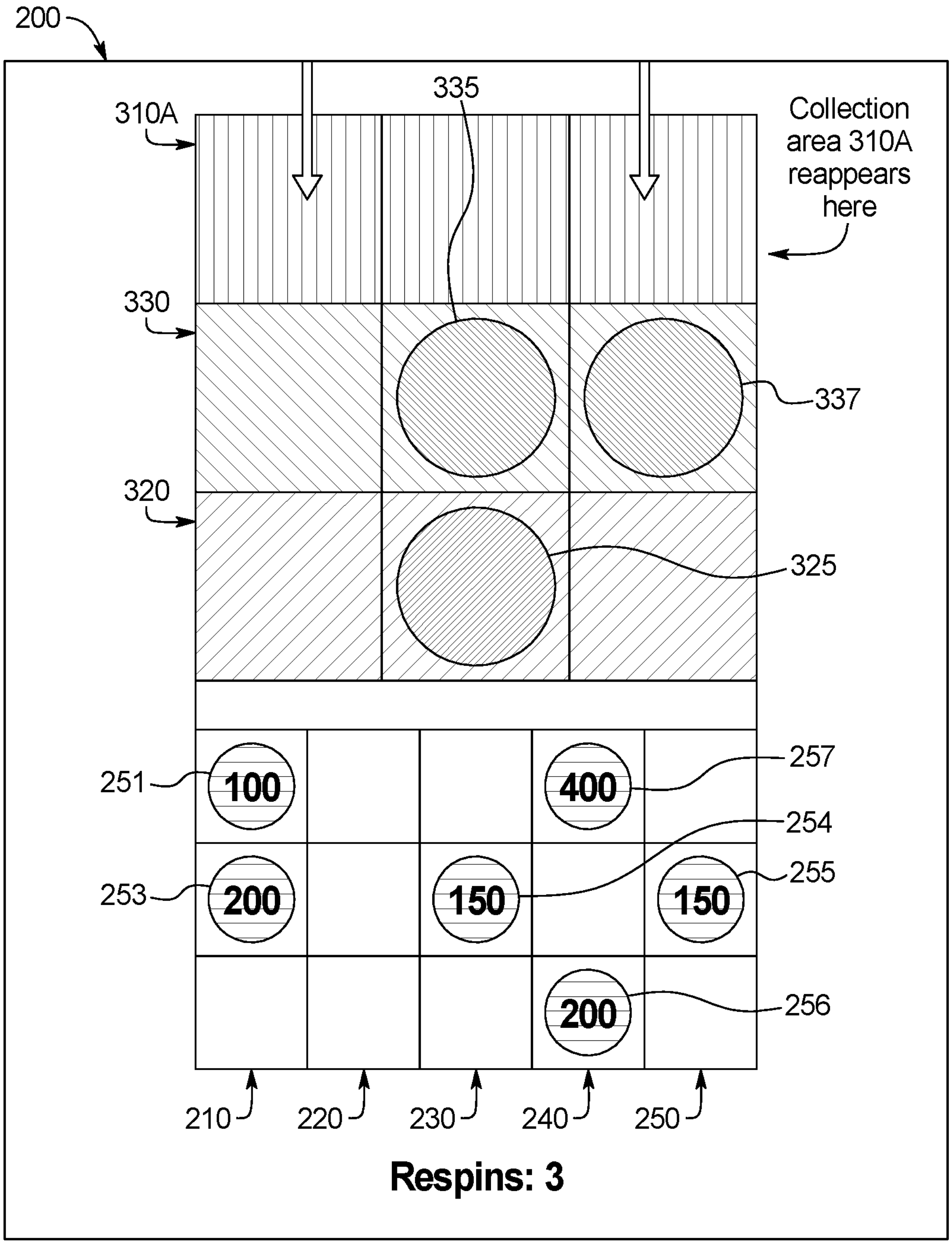
Figure 2L:
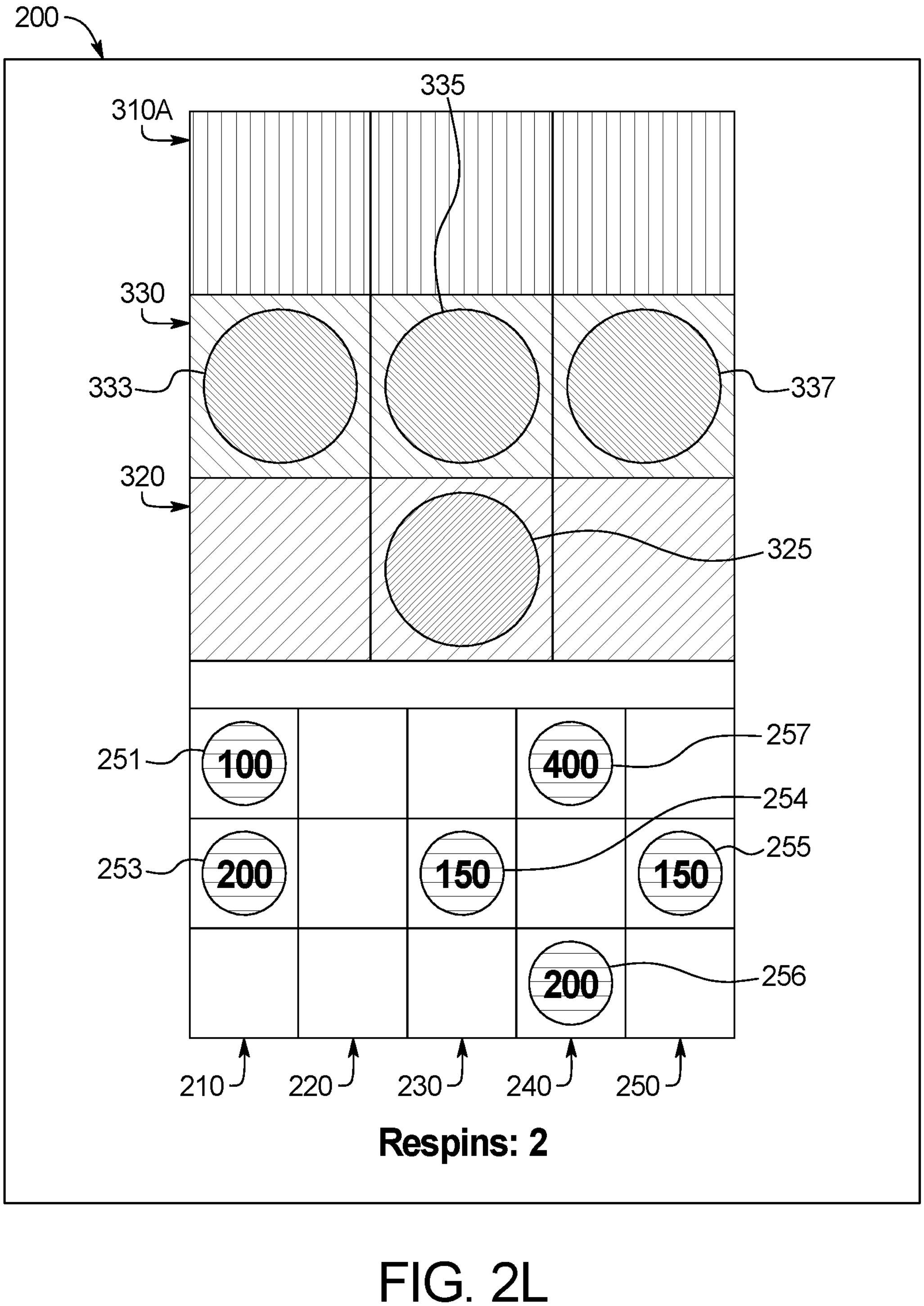
Figure 2M:
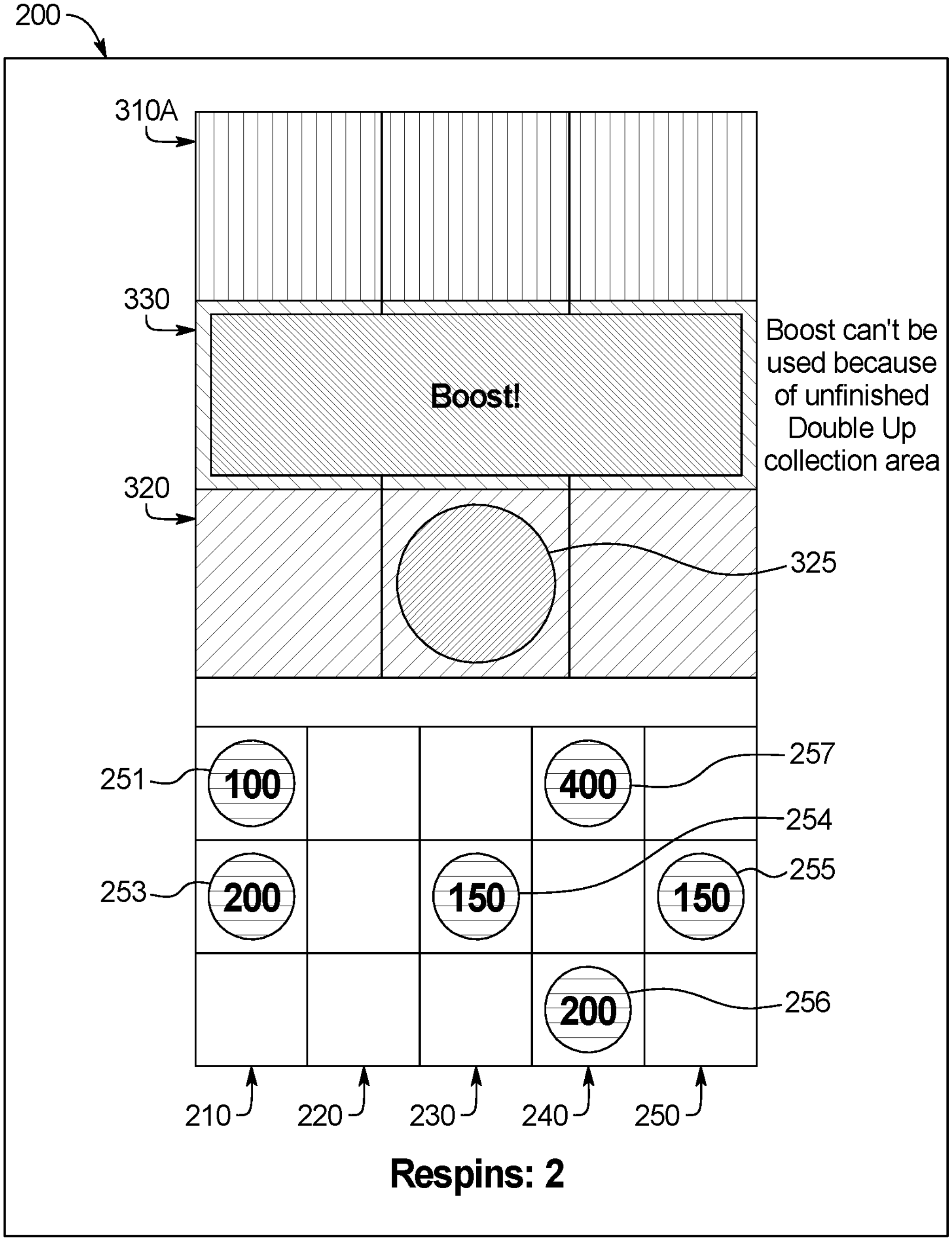
Figure 2N:
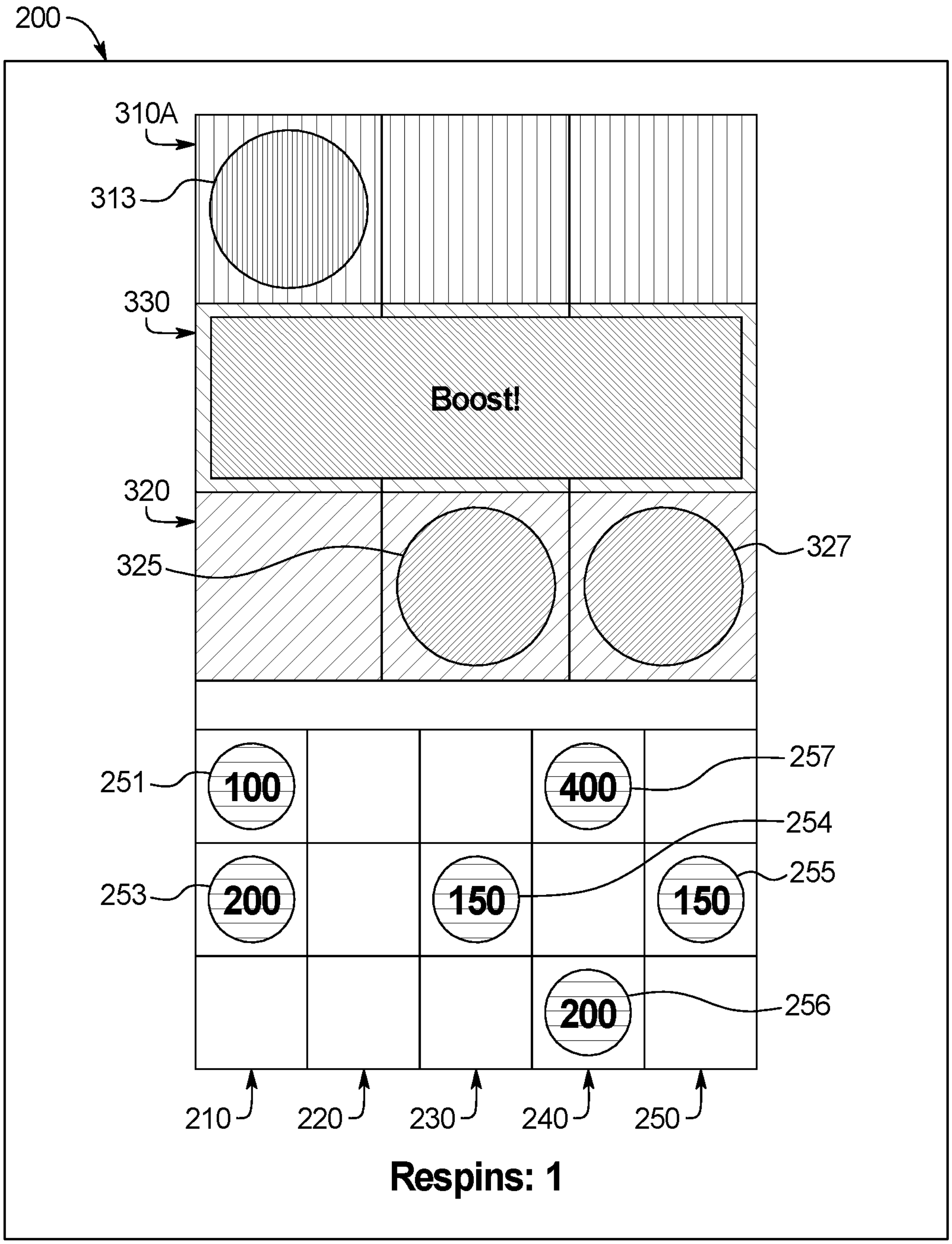
Figure 2O:
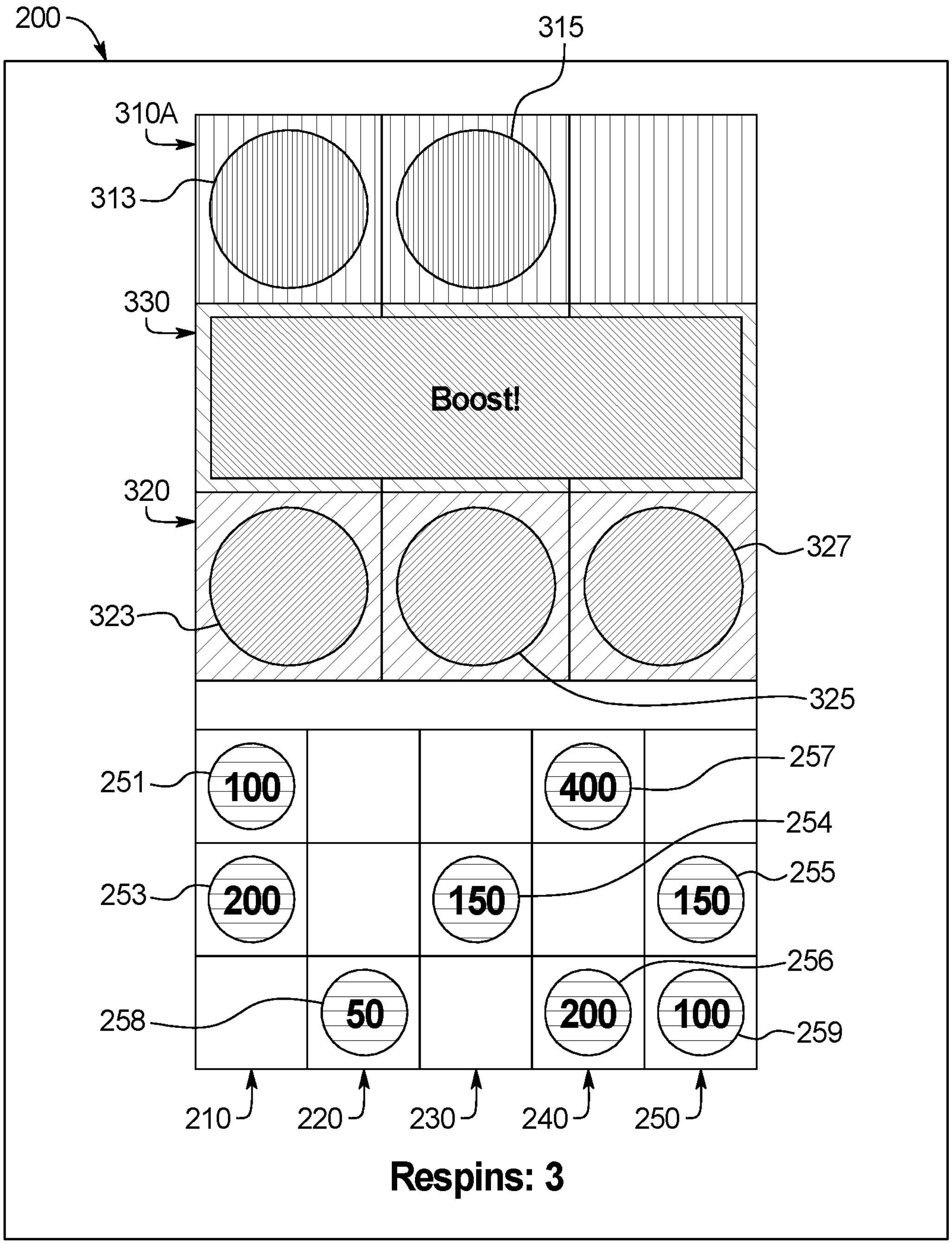
Figure 2P:
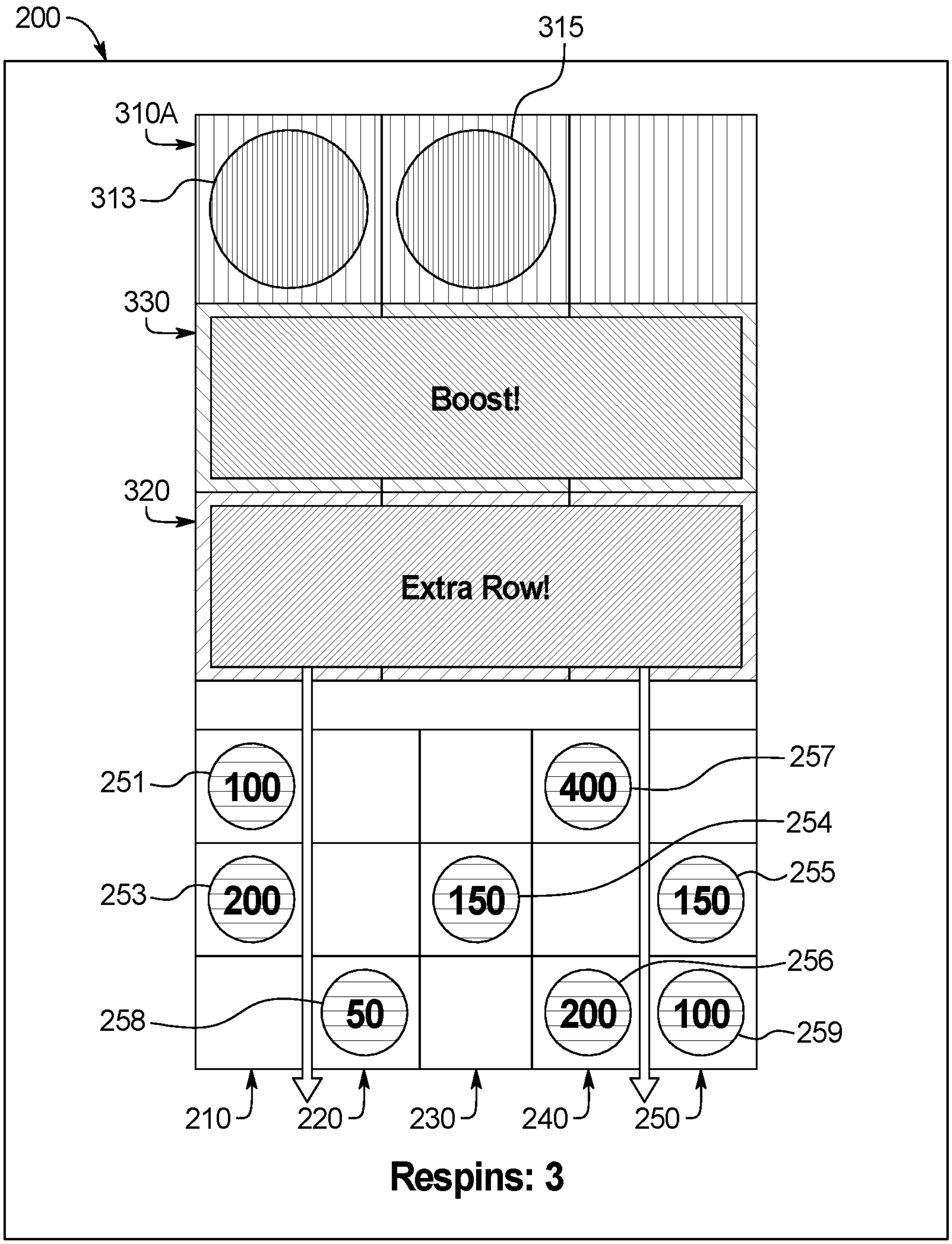
Figure 2Q:
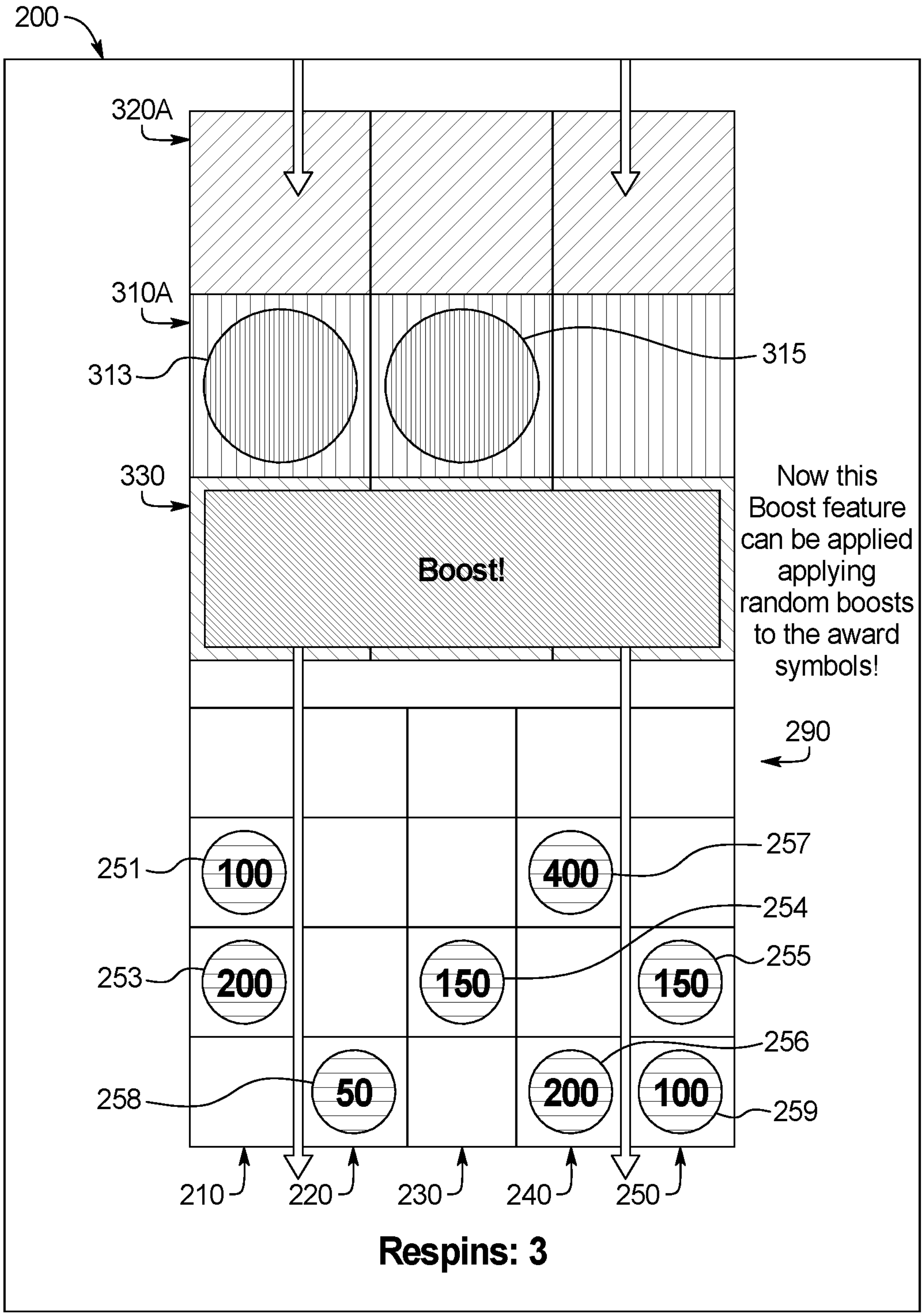
Figure 2R:
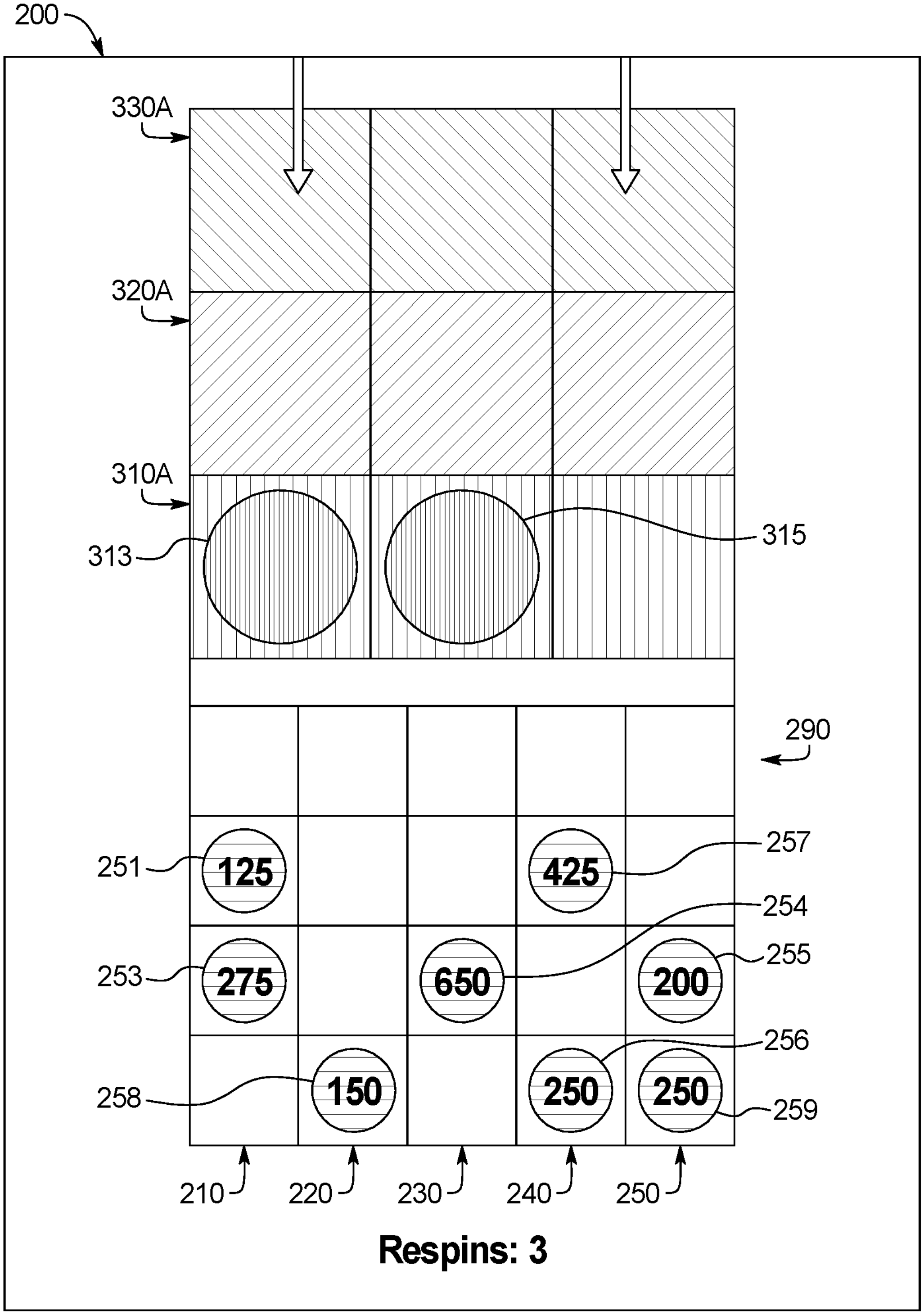
Figure 2S:
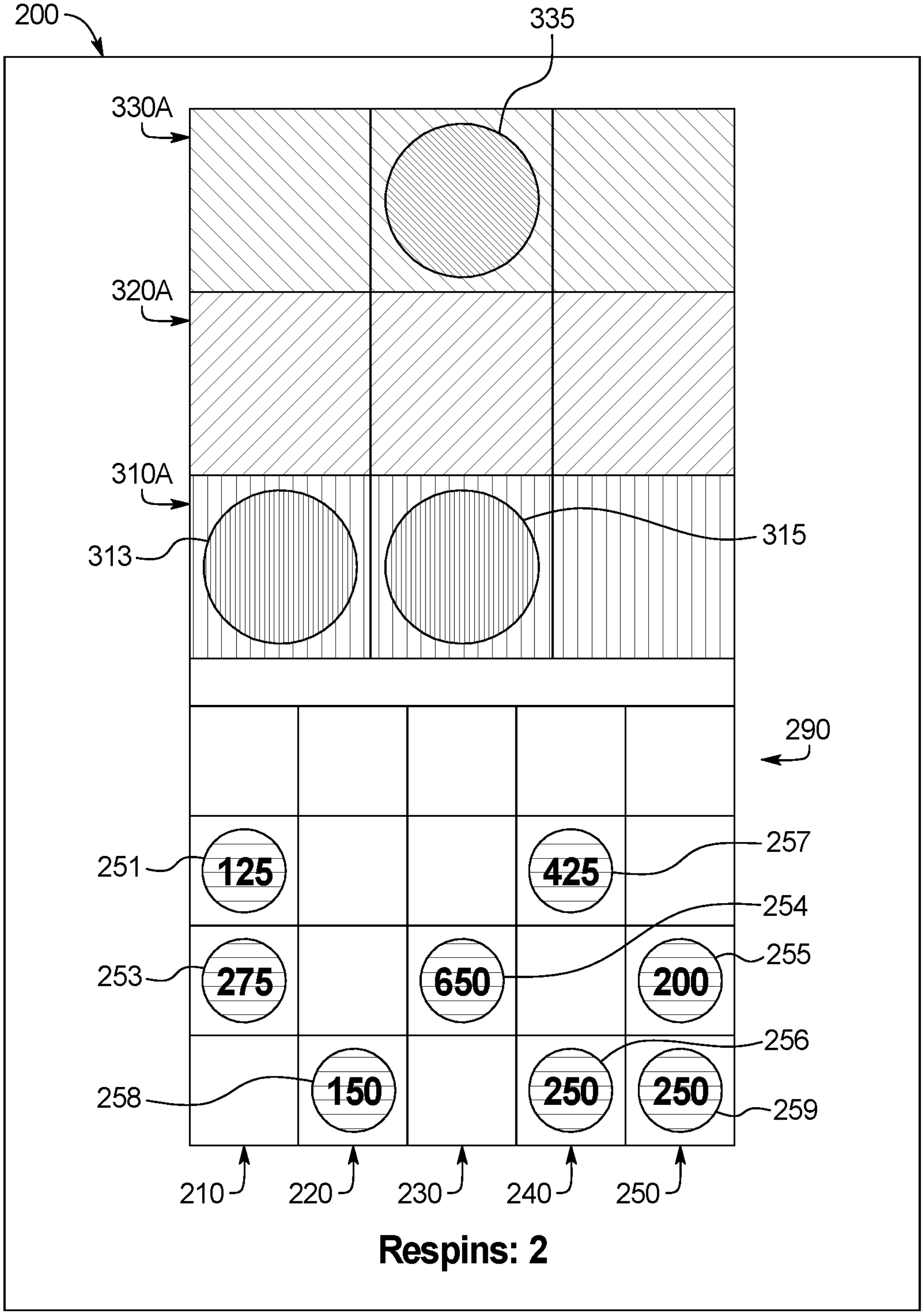
Figure 2T:
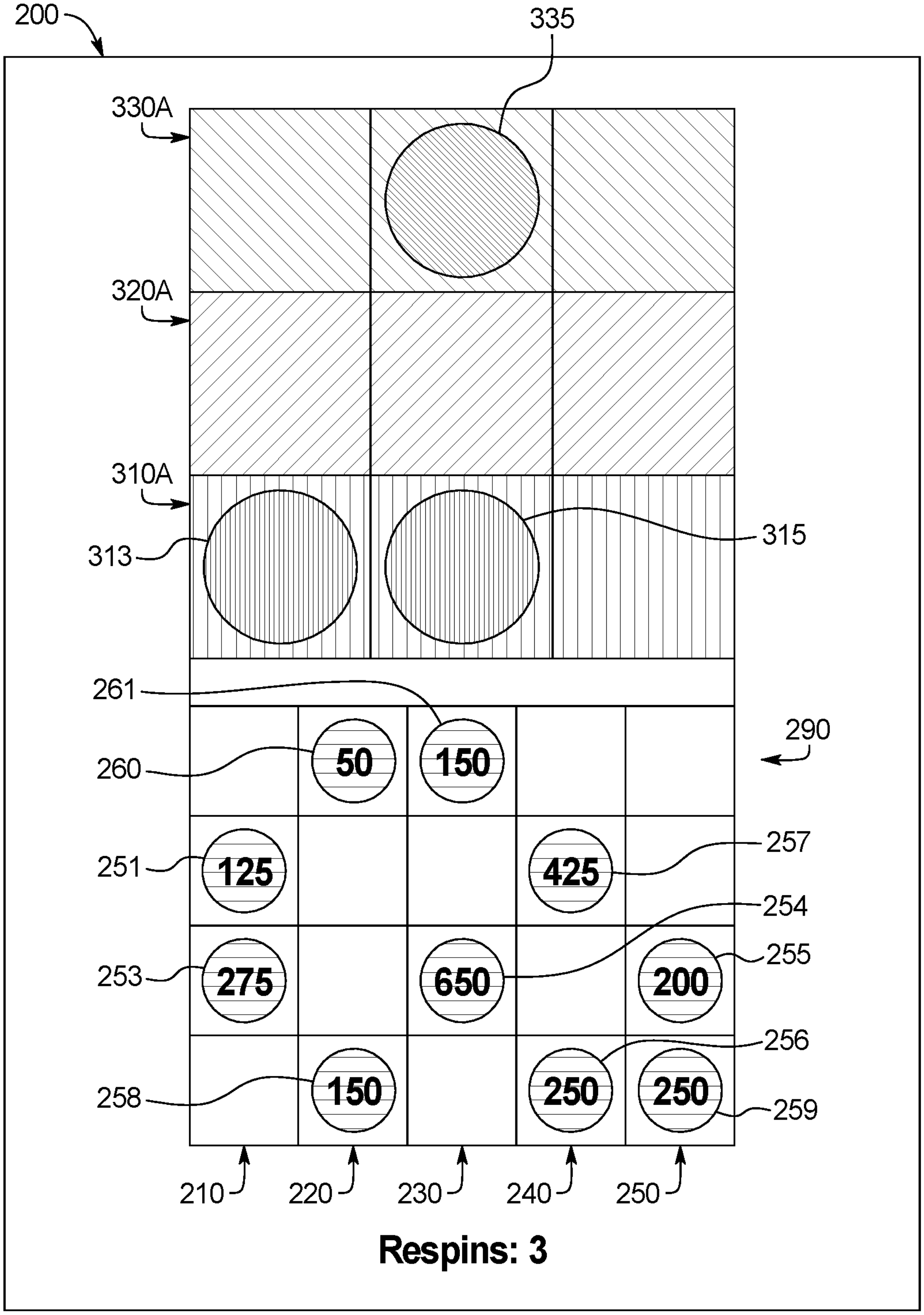
Figure 2U:
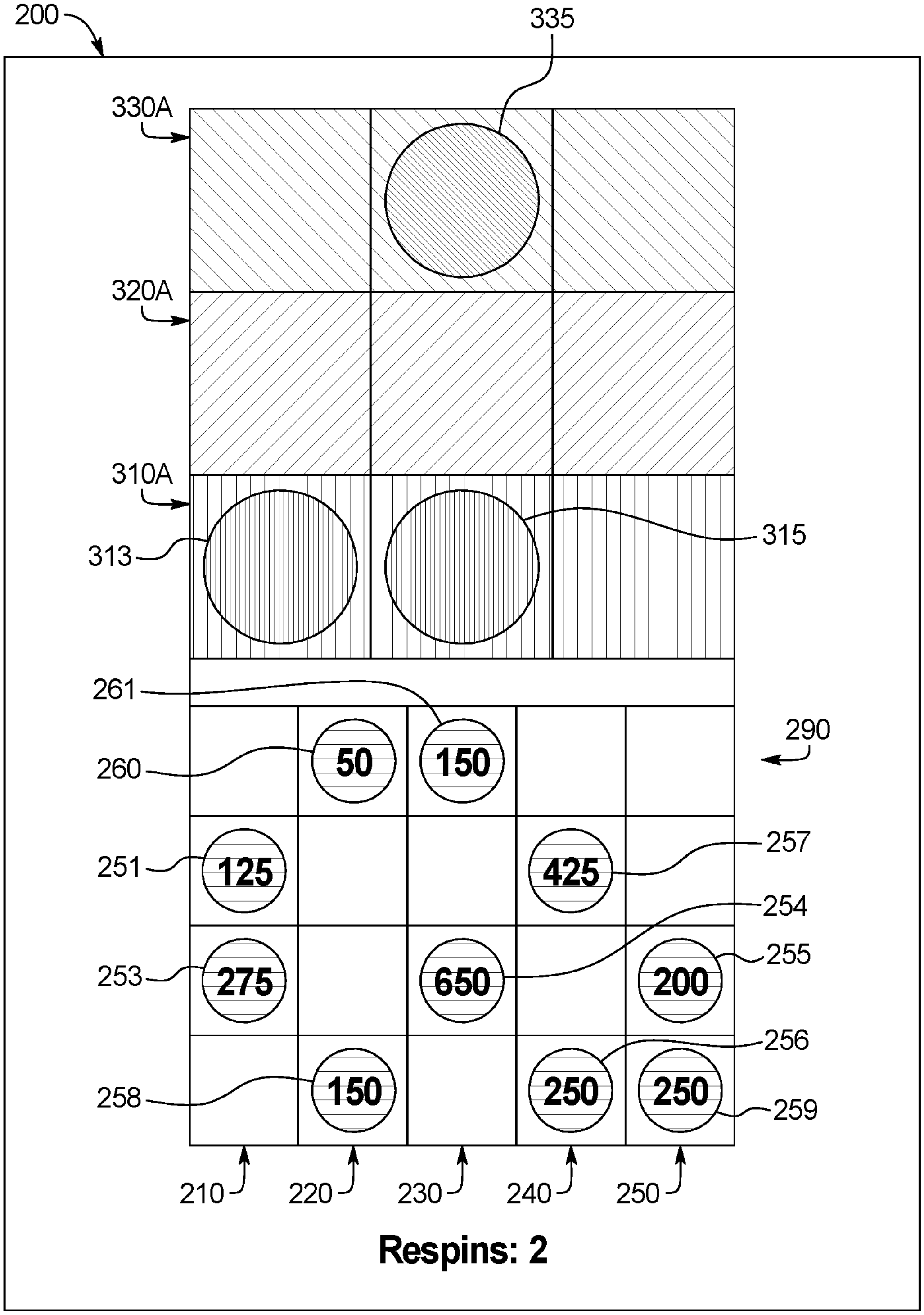
Figure 2V:
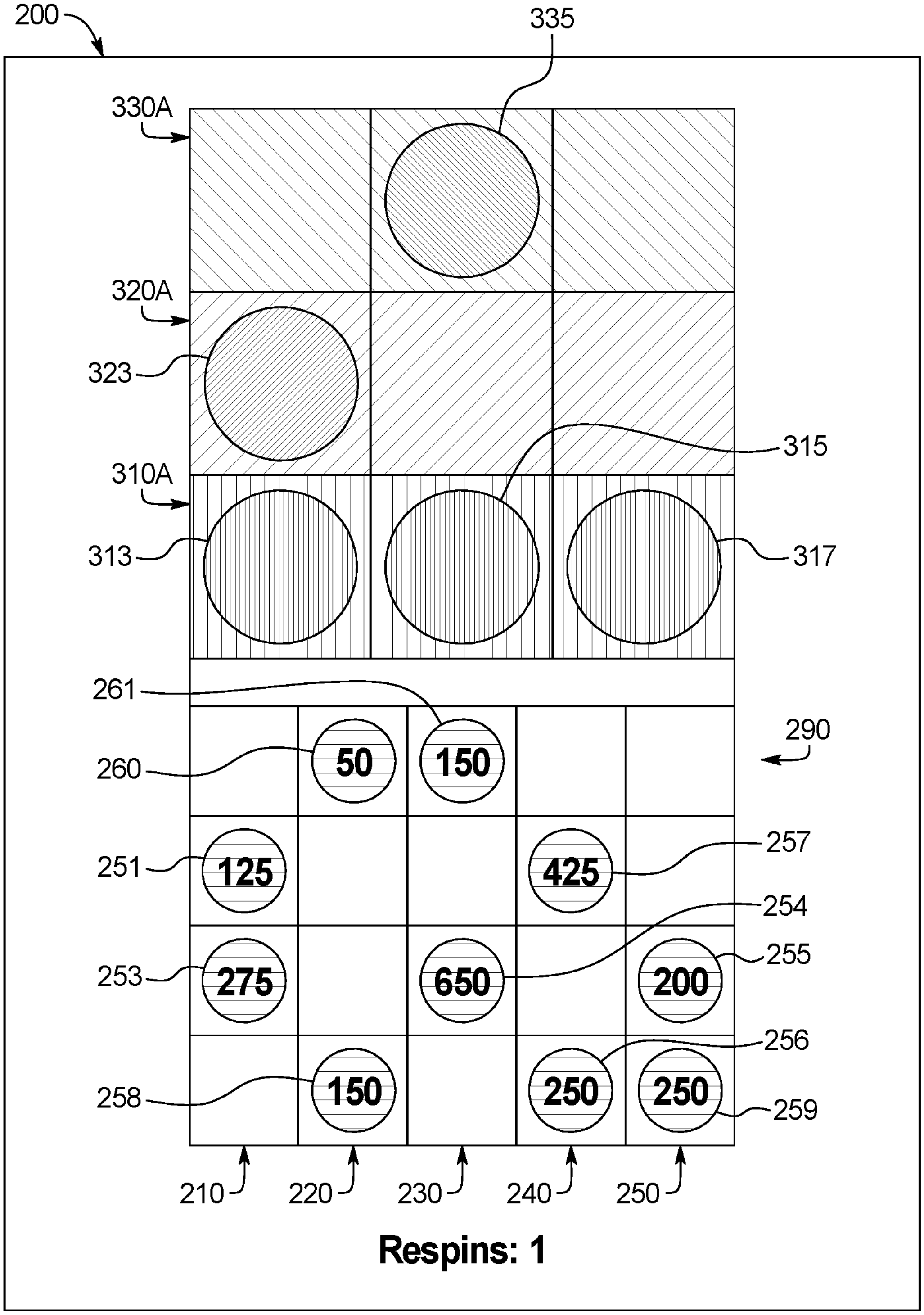
Figure 2W:
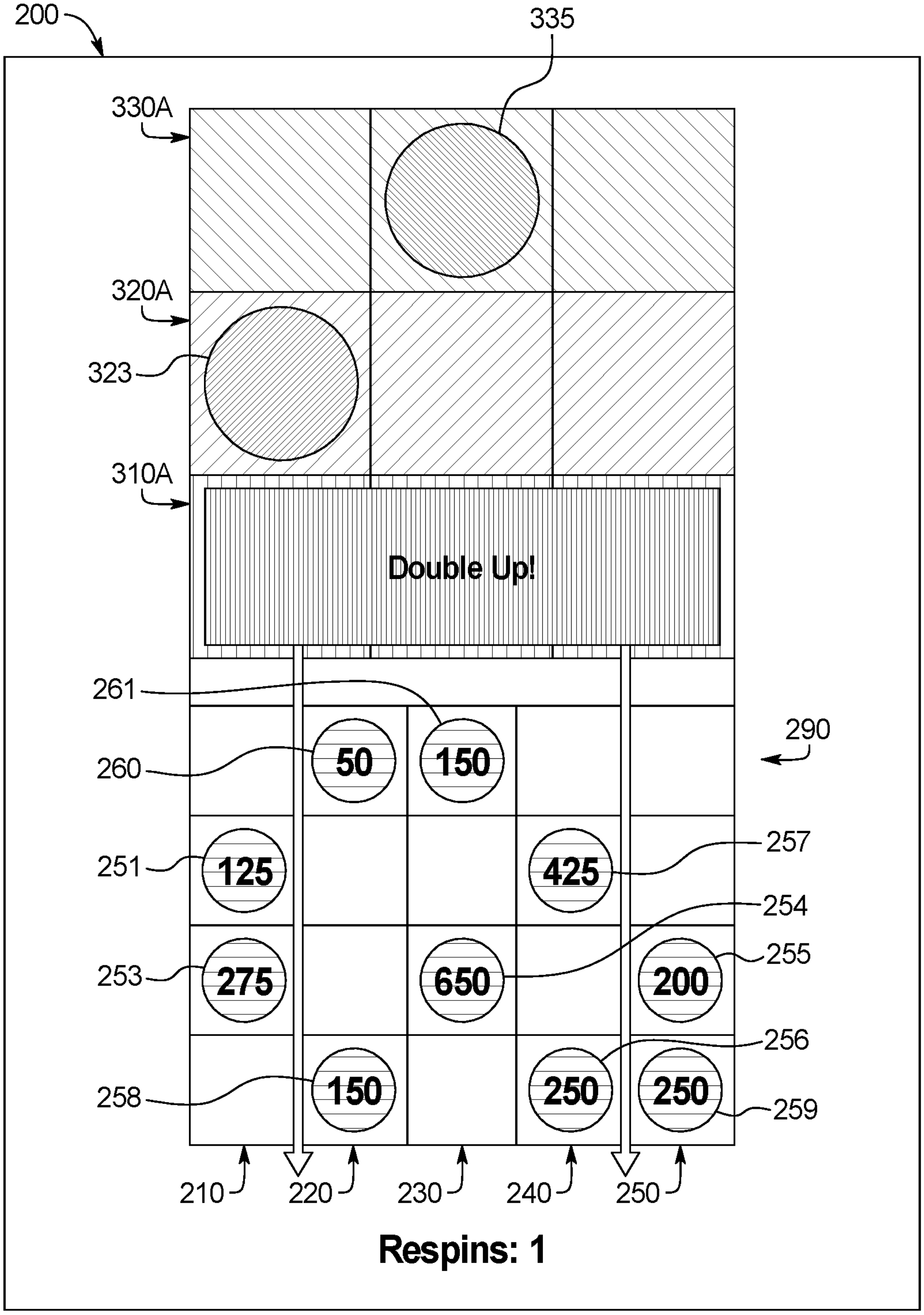
Figure 2X:
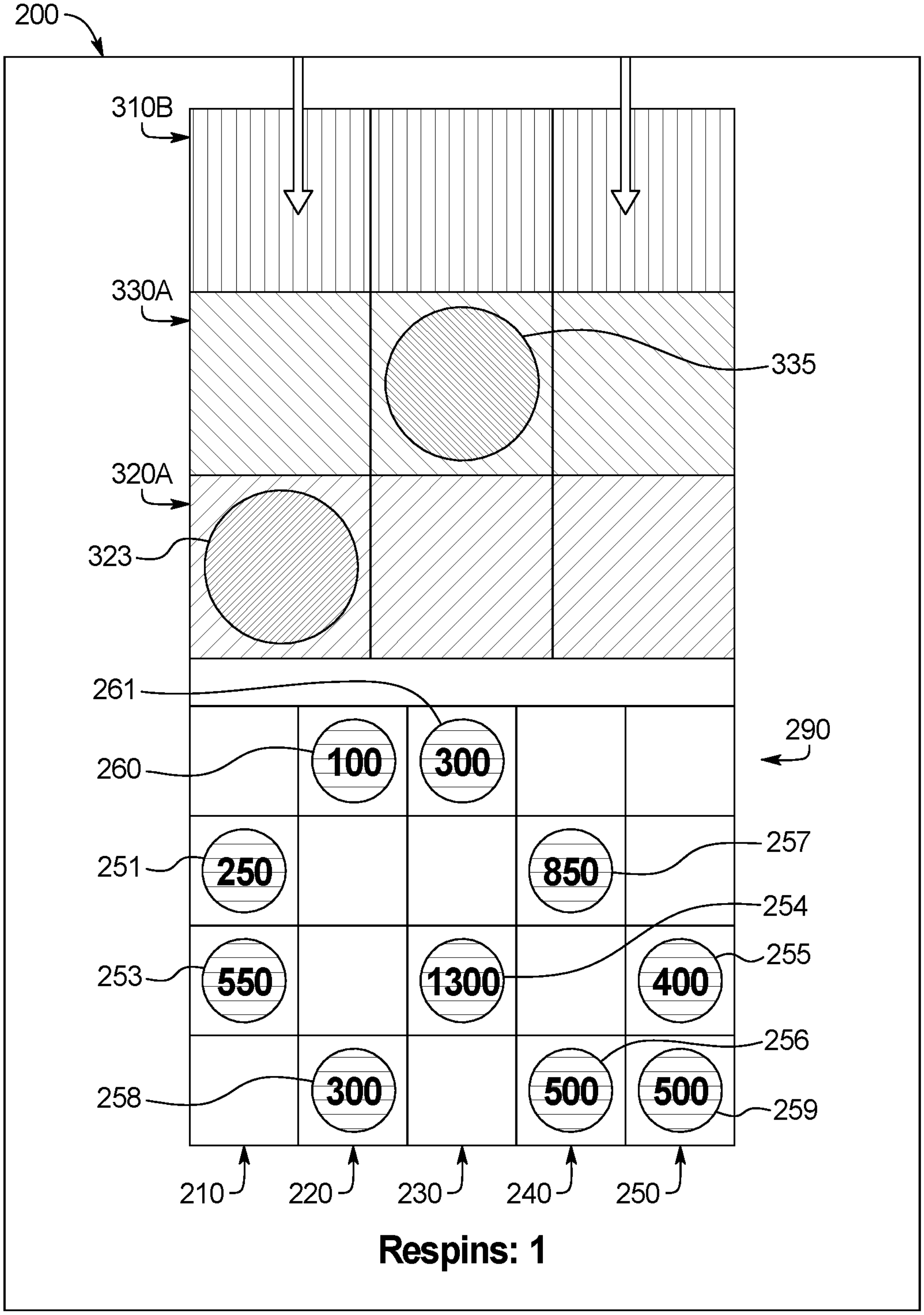
Figure 2Y:
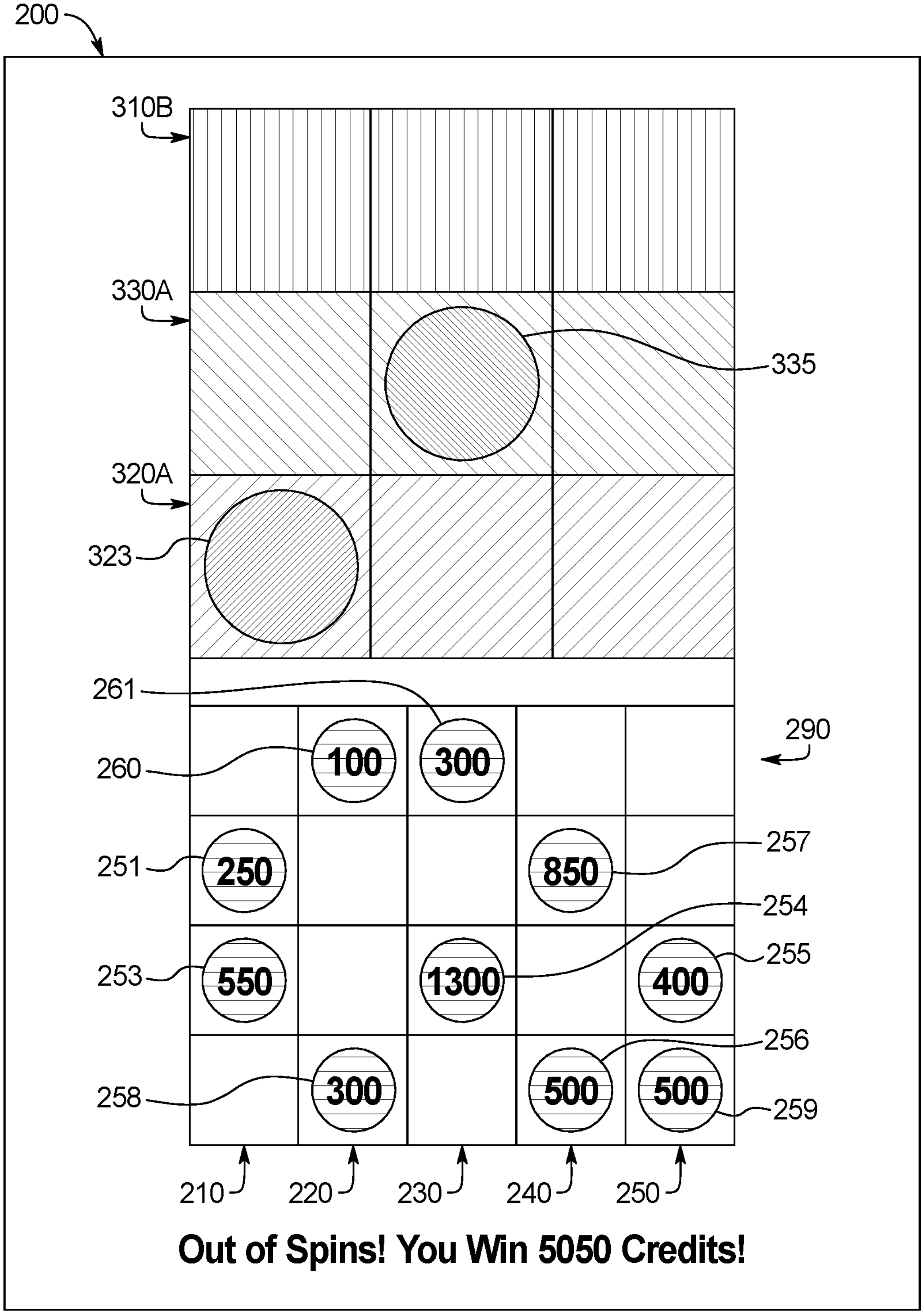

FIGS. 2A to 2Y illustrate screen shots of various points during an example plays of a primary wagering game and a symbol accumulation sequence triggered by one of the plays of the primary wagering game of one example embodiment of the present disclosure.

FIGS. 2A, 2B, 2C, and 2D first illustrate screen shots of various points during example plays of a primary wagering game of one example embodiment of the present disclosure on a gaming system such as an EGM. In this example, the EGM displays via display device 200 (such as a display device of an EGM described below), a plurality of adjacently arranged video reels configured to display a plurality of symbols (on those video reels) that are randomly determined by the processor of the EGM and that are displayed by the EGM at a plurality of symbol display positions respectively associated with the plurality of reels. More specifically, this example embodiment includes: (a) reel 210, reel 220, reel 230, reel 240, and reel 250; and (b) nine respective symbol display positions (not labeled) associated with each of the reels 210, 220, 230, 240, and 250. In this example, each of the reels 210, 220, 230, 240, and 250 includes a plurality of different symbols (not shown) and those different symbols include base symbols and two different types of symbol accumulation sequence triggering symbols including: (1) award symbols; and (2) enhancement feature triggering symbols. FIGS. 2A, 2B, 2C, and 2D show example award symbols 251, 252, 253, and 254; and (2) example enhancement feature triggering symbols 271, 272, 273, and 274. The quantities and positions of such symbols on the reels can vary in accordance with the present disclosure. The symbols on the reels in addition to the symbol accumulation sequence triggering symbols can be any suitable conventional or non-conventional reel symbols. These symbols are sometimes referred to herein as base symbols.

In this example embodiment, the EGM can also cause the display device 200 to display various other information such as but not limited to: (1) a credit meter (not shown) that displays the player's credit balance; (2) a wager display (not shown) that displays any wagers placed on any plays of the primary wagering game; (3) a win display (not shown) that displays any awards won for each play of the primary wagering game (and any plays of secondary games or the symbol accumulation sequence); and (4) a message display (not shown) configured to display messages to the player. The EGM can indicate the player's credit balance, the player's wager, and any awards available to be won or provided to the player in the form of amounts of credits. It should be appreciated that such indications can alternatively or additionally be made in the form of amounts of currency, points, or the like.

For the point of the play of the primary wagering game shown in FIG. 2A, the EGM has received a monetary amount from the player and established a credit balance (not shown) for the player. For the example of FIG. 2A, the EGM has also received a player input for the play of the primary wagering game and an associated wager of credits from the player for that play of the primary wagering game. For the example of FIG. 2A, responsive to this input and this wager (that function as an occurrence of a game triggering event in this example), the EGM has triggered the play of the primary wagering game. For the example of FIG. 2A, for this play of the primary wagering game, the EGM has also: (1) randomly determined a plurality of base symbols (not labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined base symbols at the symbol display positions associated with those reels 210, 220, 230, 240, and 250. FIG. 2A displays the play of the primary wagering game after this has occurred. At this point, the EGM evaluates the symbols displayed at the symbol display positions associated with each of the reels 210, 220, 230, 240, and 250.

In this example, the EGM also displays three symbol accumulation sequence triggering symbols including, in addition to the other displayed base symbols, two award symbols 251 and 252 and one enhancement feature triggering symbol 272 on the reels 210, 220, 230, 240, and 250. In this example, the enhancement feature triggering symbol 272 is a multi-function sequence triggering symbol enhancement feature for the sequence that can function with the award symbols to trigger the symbol accumulation sequence and also functions as a trigger for one of the bonus features as further described below. In this example, since the required quantity of six symbol accumulation sequence triggering symbols needed to trigger the symbol accumulation sequence has not occurred (e.g., only three have occurred), the symbol accumulation sequence has not been triggered from this play of the primary wagering game shown in FIG. 2A. The EGM can display any awards based on the rest of the base symbols on the reels 210, 220, 230, 240, and 250 such as in a conventional manner.

For the point of another play of the primary wagering game shown in FIG. 2B, the EGM has received a player input for that play of the primary wagering game and an associated wager of credits from the player for that play of the primary wagering game. For the example of FIG. 2B, responsive to this input and this wager (that function as an occurrence of a game triggering event in this example), the EGM has triggered this play of the primary wagering game. For the example of FIG. 2B, for this play of the primary wagering game, the EGM has also: (1) randomly determined a plurality of base symbols (not labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined base symbols at the symbol display positions associated with those reels 210, 220, 230, 240, and 250. FIG. 2B displays the play of the primary wagering game after this has occurred. At this point, the EGM evaluates the base symbols displayed at the symbol display positions associated with each of the reels 210, 220, 230, 240, and 250.

In this example, the EGM also displays six symbol accumulation sequence triggering symbols including three award symbols 251, 253, and 254 and three enhancement feature triggering symbols 271, 273, and 274 on the reels 210, 220, 230, 240, and 250. In this example, each of the enhancement feature triggering symbols 271, 273, and 274 is a multi-function sequence triggering symbol enhancement feature for the sequence that functions with the award symbols to trigger the symbol accumulation sequence and also functions as a trigger for one of the bonus enhancement features as further described below. In this example, since the required quantity of six symbol accumulation sequence triggering symbols needed to trigger the symbol accumulation sequence has occurred, the symbol accumulation sequence has been triggered from this play of the primary wagering game. The EGM can display any awards based on the rest of the symbols on the reels such as in a conventional manner.

The enhancement feature triggering symbols 271, 273, and 274 can each be a dedicated enhancement feature triggering symbol or a non-dedicated enhancement feature triggering symbol. A dedicated enhancement feature triggering symbol has a dedicated enhancement feature associated with it. A non-dedicated enhancement feature trigging symbol does not have a single enhancement feature specifically associated with it, but rather has a plurality of different enhancement features associated with it, and when it occurs, the EGM determines (such as randomly or in a predetermined order) which of those different enhancement feature that symbol triggers.

FIG. 2C shows the enhancement feature triggering symbols 271, 273, and 274 being non-dedicated enhancement feature triggering symbols (indicated by no cross-hatching) where the EGM randomly determines the enhancement feature that each non-dedicated enhancement feature will provide. Specifically in this case: (1) the enhancement feature triggering symbol 271 triggers the double-up enhancement feature for the trigger symbol accumulation sequence; (2) the enhancement feature triggering symbol 273 triggers the extra-row enhancement feature for the trigger symbol accumulation sequence; and (3) the enhancement feature triggering symbol 274 triggers the boost enhancement feature for the trigger symbol accumulation sequence.

FIG. 2D shows the enhancement feature triggering symbols 271, 273, and 274 being dedicated enhancement feature triggering symbols (indicated by the cross-hatching that corresponds to the cross-hatching of the optionally displayed enhancement feature indicators 290, 291, and 292) that each provide a dedicated enhancement feature. In this case: (1) the enhancement feature triggering symbol 271 triggers the double-up enhancement feature for the trigger symbol accumulation sequence; (2) the enhancement feature triggering symbol 273 triggers the extra-row enhancement feature for the trigger symbol accumulation sequence; and (3) the enhancement feature triggering symbol 274 triggers the boost enhancement feature for the trigger symbol accumulation sequence. It should be appreciated that the other enhancement features triggerable by the enhancement feature triggering symbols can include, for example, (a) a compression enhancement feature for the trigger symbol accumulation sequence; (b) a jackpot enhancement feature for the trigger symbol accumulation sequence; (c) an extra activation enhancement feature for the trigger symbol accumulation sequence; and (d) a collect enhancement feature for the trigger symbol accumulation sequence.

FIGS. 2E to 2Y illustrate screen shots of various points during the example symbol accumulation sequence triggered from the second play of the primary wagering game as described above. In this example, the EGM displays via display device 200, the plurality of adjacently arranged video reels configured to display award symbols at the plurality of symbol display positions respectively associated with the plurality of reels 210, 220, 230, 240, and 250. For the symbol accumulation sequence, in this example, each of the reels 210, 220, 230, 240, and 250 includes a plurality of different award symbols. In various embodiments, one or more of the reels 210, 220, 230, 240, and 250 can also include one or more additional enhancement feature triggering symbols that can trigger further enhancement features for the symbol accumulation sequence. These reels can be the same or different than the reels in the play of the primary wagering game.

FIG. 2E shows the plurality of reels 210, 220, 230, 240, and 250 for the symbol accumulation sequence before the first activation of the reels 210, 220, 230, 240, and 250 for the symbol accumulation sequence. FIG. 2E shows that the three award symbols 251, 253, and 254 (that along with the enhancement feature triggering symbols 271, 273, and 274 triggered the symbol accumulation sequence) have been accumulated and thus remain at the respective symbol display positions for the symbol accumulation sequence. FIG. 2E shows the enhancement feature triggering symbols 271, 273, and 274 have been removed because they are not award symbols for the symbol accumulation sequence. FIG. 2E shows the initial quantity of activations (labeled "Respins" in this example) are set at 3 for the symbol accumulation sequence. FIG. 2E shows the secondary symbol accumulation enhancement feature for each of the enhancement features triggered by the respective enhancement feature triggering symbols 271, 273, and 274 for the symbol accumulation sequence. Specifically, FIG. 2E shows: (1) a double-up symbol collection area 310 for the symbol accumulation sequence; (2) an extra-row symbol collection area 320 for the symbol accumulation sequence; and (3) a boost symbol collection area 330 for the symbol accumulation sequence. The double-up symbols, the extra-row symbols, and the boost symbols that are collectable in these areas are referred to herein as enhancement symbols. The present disclosure contemplates that other types of enhancement symbols can be employed in accordance with the present disclosure.

FIG. 2E shows that each such symbol collection area is associated with three independent secondary reels that can generate the respective symbols. Specifically, the double-up symbol collection area 310 is associated with three secondary reels 312, 314, and 316, the extra-row symbol collection area 320 is associated with three secondary reels 322, 324, and 326, and the boost symbol collection area 330 is associated with three secondary reels 332, 334, and 336. These secondary reels are only labeled in FIG. 2E in this example.

FIG. 2E shows: (1) the double-up symbol collection area 310 and that no double-up symbols have been accumulated in that collection area; (2) the extra-row symbol collection area 320 and that no extra-row symbols have been accumulated in that collection area; and (3) the boost symbol collection area 330 and that no boost symbols have been accumulated in that collection area. FIG. 2E shows that: (1) the double-up symbol collection area 310 is closest to the reels; (2) the extra-row symbol collection area 320 is next closest to the reels; and (3) the boost symbol collection area 330 is next closest to the reels. FIG. 2E shows that for each of the double-up enhancement feature, the extra-row enhancement feature, and the boost enhancement feature, a quantity (such as three) respective triggering symbols must be collected for the EGM to apply that feature. These quantities can vary and can but do not need to be the same in accordance with the present disclosure.

This configuration can be used to provide either the secondary symbol accumulation enhancement feature with a blocking or delay feature for the sequence, or to provide the secondary symbol accumulation enhancement feature without a blocking or delay feature for the sequence. The secondary symbol accumulation enhancement feature with a blocking or delay feature for the sequence requires the double-up enhancement feature, the extra-row enhancement feature, and the boost enhancement feature to be provided in a specific order. Specifically in this example, the double-up enhancement feature (which has a collection area closest to the reels) must be provided before the extra row enhancement feature and the boost enhancement feature can be provided, and the extra-row enhancement feature (which has a collection area next closest to the reels) must be provided before the boost enhancement feature (which has a collection area furthest from the reels) can be provided. In other words, in this example, the double-up enhancement feature functions as a blocking feature for the extra-row enhancement feature and the boost enhancement feature, and the extra-row enhancement feature functions as a blocking feature for the boost enhancement feature. It should be appreciated that the arrangements and blocking features for two or more enhancements can be provided in any suitable manner in accordance with the present disclosure. Alternatively, the secondary symbol accumulation enhancement feature without a blocking or delay feature for the sequence enables any of the double-up enhancement feature, the extra-row enhancement feature, and the boost enhancement feature to be provided in any order.

FIG. 2F shows the plurality of reels 210, 220, 230, 240, and 250 for the symbol accumulation sequence for a first activation of the reels for the symbol accumulation sequence. FIG. 2F shows the additional award symbol 255 occurred on reel 250 and the EGM accumulates this additional award symbol for the symbol accumulation sequence. FIG. 2F shows the quantity of activations reset to 3 for the symbol accumulation sequence because this additional award symbol has been accumulated in this activation of the reels. FIG. 2F shows that the double-up symbol 313 has occurred on the first secondary reel 312 and has been accumulated in the double-up symbol collection area 310, and the boost symbol 337 has occurred on the third secondary reel 336 and has been accumulated in the boost symbol collection area 330. FIG. 2F thus shows at this point in the symbol accumulation sequence that: (1) one double-up symbol has been accumulated in the double-up symbol collection area 310; (2) zero extra-row symbols have been accumulated in the extra-row symbol collection area 320; and (3) one boost symbol has been accumulated in the boost symbol collection area 330.

FIG. 2G shows the plurality of reels 210, 220, 230, 240, and 250 for the symbol accumulation sequence for a second activation of the reels for the symbol accumulation sequence. FIG. 2G shows no additional award symbols occurred on reels for the symbol accumulation sequence. FIG. 2G shows the quantity of activations as 2 for the symbol accumulation sequence. FIG. 2G shows that the double-up symbol 317 has occurred on the third secondary reel 316 and has been accumulated in the double-up symbol collection area 310. FIG. 2G thus shows at this point in the symbol accumulation sequence that: (1) two double-up symbols have been accumulated in the double-up symbol collection area 310; (2) zero extra-row symbols have been accumulated in the extra-row symbol collection area 320; and (3) one boost symbol has been accumulated in the boost symbol collection area 330.

FIG. 2H shows the plurality of reels 210, 220, 230, 240, and 250 for the symbol accumulation sequence for a third activation of the reels for the symbol accumulation sequence. FIG. 2H shows that the additional award symbol 256 occurred on reel 240 and the EGM accumulates this additional award symbol for the symbol accumulation sequence. FIG. 2H shows the quantity of activations reset to 3 for the symbol accumulation sequence because this additional award symbol has been accumulated in this activation of the reels. FIG. 2H shows that the extra-row symbol 325 has occurred on the second secondary reel 324 and has been accumulated in the extra-row symbol collection area 320. FIG. 2H shows that the boost symbol 335 has occurred on the second secondary reel 334 and has been accumulated in the boost symbol collection area 330. FIG. 2H thus shows at this point in the symbol accumulation sequence that: (1) two double-up symbols have been accumulated in the double-up symbol collection area 310; (2) one extra-row symbol has been accumulated in the extra-row symbol collection area 320; and (3) two boost symbols have been accumulated in the boost symbol collection area 330.

FIG. 2I shows the plurality of reels 210, 220, 230, 240, and 250 for the symbol accumulation sequence for a fourth activation of the reels for the symbol accumulation sequence. FIG. 2I shows that the additional award symbol 257 occurred on reel 240 and the EGM accumulates this additional award symbol for the symbol accumulation sequence. FIG. 2I shows the quantity of activations reset to 3 for the symbol accumulation sequence because this additional award symbol has been accumulated in this activation of the reels. FIG. 2I shows that the double-up symbol 315 has occurred on the second secondary reel 314 and has been accumulated in the double-up symbol collection area 310. FIG. 2I thus shows at this point in the symbol accumulation sequence that: (1) three double-up symbols have been accumulated in the double-up symbol collection area 310; (2) one extra-row symbol has been accumulated in the extra-row symbol collection area 320; and (3) two boost symbols have been accumulated in the boost symbol collection area 330.

FIGS. 2J and 2K shows that since three double-up symbols have been accumulated in the double-up symbol collection area 310, the EGM now applies this double-up enhancement feature to the award symbols accumulated on the reels in the symbol accumulation sequence. Specifically, the EGM doubles the values of all of the award symbols 251, 253, 254, 255, 256, and 257 accumulated on the reels 210, 220, 230, 240, and 250 in the symbol accumulation sequence. FIG. 2K also shows that since three double-up symbols have been accumulated in the double-up symbol collection area 310 and been applied by the EGM, the EGM now adds a new double-up symbol collection area 310A in the symbol accumulation sequence. FIG. 2K also shows that the extra-row symbol collection area 320 and the boost symbol collection area 330 have both moved downwardly toward the reels.

FIG. 2L shows the plurality of reels 210, 220, 230, 240, and 250 for the symbol accumulation sequence for a fifth activation of the reels for the symbol accumulation sequence. FIG. 2L shows no additional award symbols occurred on reels for the symbol accumulation sequence. FIG. 2L shows the quantity of activations as 2 for the symbol accumulation sequence. FIG. 2L shows that the boost symbol 333 has occurred on the first secondary reel 332 and has been accumulated in the boost symbol collection area 330. FIG. 2L thus shows at this point in the symbol accumulation sequence that: (1) one extra-row symbol has been accumulated in the extra-row symbol collection area 320; (2) three boost symbols have been accumulated in the boost symbol collection area 330; and (3) zero double-up symbols have been accumulated in the new double-up symbol collection area 310A.

FIG. 2M shows that even though three double-up symbols have been accumulated in the boost symbol collection area 330, the EGM does not yet apply this boost enhancement feature to the award symbols accumulated 251, 253, 254, 255, 256, and 257 on the reels 210, 220, 230, 240, and 250 in the symbol accumulation sequence because the boost enhancement feature is blocked by the uncompleted extra-row symbol collection area 320.

FIG. 2N shows the plurality of reels 210, 220, 230, 240, and 250 for the symbol accumulation sequence for a sixth activation of the reels for the symbol accumulation sequence. FIG. 2N shows no additional award symbols occurred on reels for the symbol accumulation sequence. FIG. 2N shows the quantity of activations as 1 for the symbol accumulation sequence. FIG. 2N shows that the extra-row symbol 327 has occurred on the third secondary reel 326 and has been accumulated in the extra-row symbol collection area 320. FIG. 2N also shows that the double-up symbol 313 has occurred on the first secondary reel 312 and has been accumulated in the double-up symbol collection area 310A. FIG. 2N thus shows at this point in the symbol accumulation sequence that: (1) two extra-row symbols have been accumulated in the extra-row symbol collection area 320; (2) three boost symbols have been accumulated in the boost symbol collection area 330 and the boost enhancement is ready to apply but is blocked by the extra-row symbol collection area 320; and (3) one double-up symbol has been accumulated in the new double-up symbol collection area 310A.

FIG. 2O shows the plurality of reels 210, 220, 230, 240, and 250 for the symbol accumulation sequence for a seventh activation of the reels for the symbol accumulation sequence. FIG. 2O shows that two additional award symbol 258 and 259 occurred on reels for the symbol accumulation sequence. FIG. 2O shows the quantity of activations reset to 3 for the symbol accumulation sequence because these additional award symbols have been accumulated in this activation of the reels. FIG. 2O shows that the extra-row symbol 323 has occurred on the first secondary reel 322 and has been accumulated in the extra-row symbol collection area 320. FIG. 2O also shows that the double-up symbol 315 has occurred on the second secondary reel 314 and has been accumulated in the double-up symbol collection area 310A. FIG. 2O thus shows at this point in the symbol accumulation sequence that: (1) three extra-row symbols have been accumulated in the extra-row symbol collection area 320 and the extra-row enhancement is ready to apply; (2) three boost symbols have been accumulated in the boost symbol collection area 330 and the boost enhancement is ready to apply; and (3) two double-up symbols have been accumulated in the double-up symbol collection area 310A.

FIGS. 2P and 2Q show that since three extra-row symbols have been accumulated in the extra-row symbol collection area 320, the EGM now applies this extra-row enhancement feature to the reels in the symbol accumulation sequence. FIG. 2Q shows this extra row 290. FIG. 2Q also shows that a new extra row collection area 320A has been added above the double-up symbol collection area 310A.

FIGS. 2Q and 2R shows that since three boost symbols have been accumulated in the boost symbol collection area 330 which is no longer at this point blocked by the extra-row symbol collection area 320, the EGM now applies this boost enhancement feature to the accumulated award symbol reels in the symbol accumulation sequence. Specifically, the EGM adds a separately and independently randomly determined amount to each of the values of the award symbols 251, 253, 254, 255, 256, 257, 258, and 259 accumulated on the reels 210, 220, 230, 240, and 250 in the symbol accumulation sequence. In this example, a plurality of the added amounts are different, although two or more of the added values can be the same in accordance with the present disclosure. The new values for the award symbols 251, 253, 254, 255, 256, 257, 258, and 259 are shown in FIG. 2R.

FIG. 2R also shows that the EGM now adds a new boost symbol collection area 330A in the symbol accumulation sequence. FIG. 2R also shows that the double-up symbol collection area 310A and the extra-row symbol collection area 320A have both moved downwardly toward the reels 210, 220, 230, 240, and 250.

FIG. 2S shows the plurality of reels 210, 220, 230, 240, and 250 for the symbol accumulation sequence for an eighth activation of the reels for the symbol accumulation sequence. FIG. 2S shows no additional award symbols occurred on reels for the symbol accumulation sequence. FIG. 2S shows the quantity of activations as 2 for the symbol accumulation sequence. FIG. 2S shows that the boost symbol 335 has occurred on the second secondary reel 334 and has been accumulated in the boost symbol collection area 330A. FIG. 2S thus shows at this point in the symbol accumulation sequence that: (1) two double-up symbols have been accumulated in the double-up symbol collection area 310A; (2) zero extra-row symbols have been accumulated in the new extra-row symbol collection area 320A; and (3) one boost symbol has been accumulated in the new boost symbol collection area 330A.

FIG. 2T shows the plurality of reels 210, 220, 230, 240, and 250 for the symbol accumulation sequence for a ninth activation of the reels for the symbol accumulation sequence. FIG. 2T shows two additional award symbol 260 and 261 occurred on reels for the symbol accumulation sequence. Specifically, these two award symbols have occurred and been accumulated in the extra row 290. FIG. 2T shows the quantity of activations reset to 3 for the symbol accumulation sequence because these additional award symbols have been accumulated in this activation of the reels. FIG. 2T shows that no additional boost, double-up, or extra-row symbols have occurred in this activation. FIG. 2T thus shows at this point in the symbol accumulation sequence that: (1) two double-up symbols have been accumulated in the double-up symbol collection area 310A; (2) zero extra-row symbols have been accumulated in the extra-row symbol collection area 320A; and (3) one boost symbol has been accumulated in the boost symbol collection area 330A.

FIG. 2U shows the plurality of reels 210, 220, 230, 240, and 250 for the symbol accumulation sequence for a tenth activation of the reels for the symbol accumulation sequence. FIG. 2U shows no additional award symbols occurred on reels for the symbol accumulation sequence. FIG. 2U shows the quantity of activations as 2 for the symbol accumulation sequence. FIG. 2U shows that no additional boost, double-up, or extra-row symbols have occurred in this activation. FIG. 2U thus shows at this point in the symbol accumulation sequence that: (1) two double-up symbols have been accumulated in the double-up symbol collection area 310A; (2) zero extra-row symbols have been accumulated in the extra-row symbol collection area 320A; and (3) one boost symbol has been accumulated in the boost symbol collection area 330A.

FIG. 2V shows the plurality of reels 210, 220, 230, 240, and 250 for the symbol accumulation sequence for a tenth activation of the reels for the symbol accumulation sequence. FIG. 2U shows no additional award symbols occurred on reels for the symbol accumulation sequence. FIG. 2V shows the quantity of activations as 1 for the symbol accumulation sequence. FIG. 2V shows that the double-up symbol 317 has occurred on the third secondary reel 316 and has been accumulated in the double-up symbol collection area 310A. FIG. 2V shows that the extra-row symbol 323 has occurred on the first secondary reel 322 and has been accumulated in the extra-row symbol collection area 320A. FIG. 2V thus shows at this point in the symbol accumulation sequence that: (1) three double-up symbols have been accumulated in the double-up symbol collection area 310A; (2) one extra-row symbol has been accumulated in the extra-row symbol collection area 320A; and (3) one boost symbol has been accumulated in the boost symbol collection area 330A.

FIGS. 2W and 2X show that since three double-up symbols have been accumulated in the double-up symbol collection area 310A, the EGM now applies the double-up enhancement feature again to the award symbols accumulated on the reels in the symbol accumulation sequence. Specifically, the EGM doubles the values of all of the award symbols 251, 253, 254, 255, 256, 257, 258, 259, 260, and 261 accumulated on the reels 210, 220, 230, 240, and 250 in the symbol accumulation sequence. FIG. 2X also shows that the EGM now adds a new double-up symbol collection area 310B in the symbol accumulation sequence. FIG. 2X also shows that the extra-row symbol collection area 320A and the boost symbol collection area 330A have both moved downwardly toward the reels 210, 220, 230, 240, and 250.

FIG. 2Y shows the plurality of reels 210, 220, 230, 240, and 250 for the symbol accumulation sequence for an eleventh activation of the reels for the symbol accumulation sequence. FIG. 2Y shows no additional award symbols occurred on reels for the symbol accumulation sequence. FIG. 2Y indicates that the quantity of activations is now 0 for the symbol accumulation sequence and thus there are no remaining activations of the reels for the symbol accumulation sequence. FIG. 2Y shows that no additional boost, double-up, or extra-row symbols have occurred in this activation. FIG. 2Y thus shows at this point in the symbol accumulation sequence that: (1) one extra-row symbol has been accumulated in the extra-row symbol collection area 320A; (2) one boost symbol has been accumulated in the boost symbol collection area 330A; and (3) no double-up symbols have been accumulated in the double-up symbol collection area 310B. FIG. 2Y shows that the total award as 5050 credits which is the sum values of the accumulated award symbols 251, 253, 254, 255, 256, 257, 258, 259, 260, and 261.

Figure 2Z:
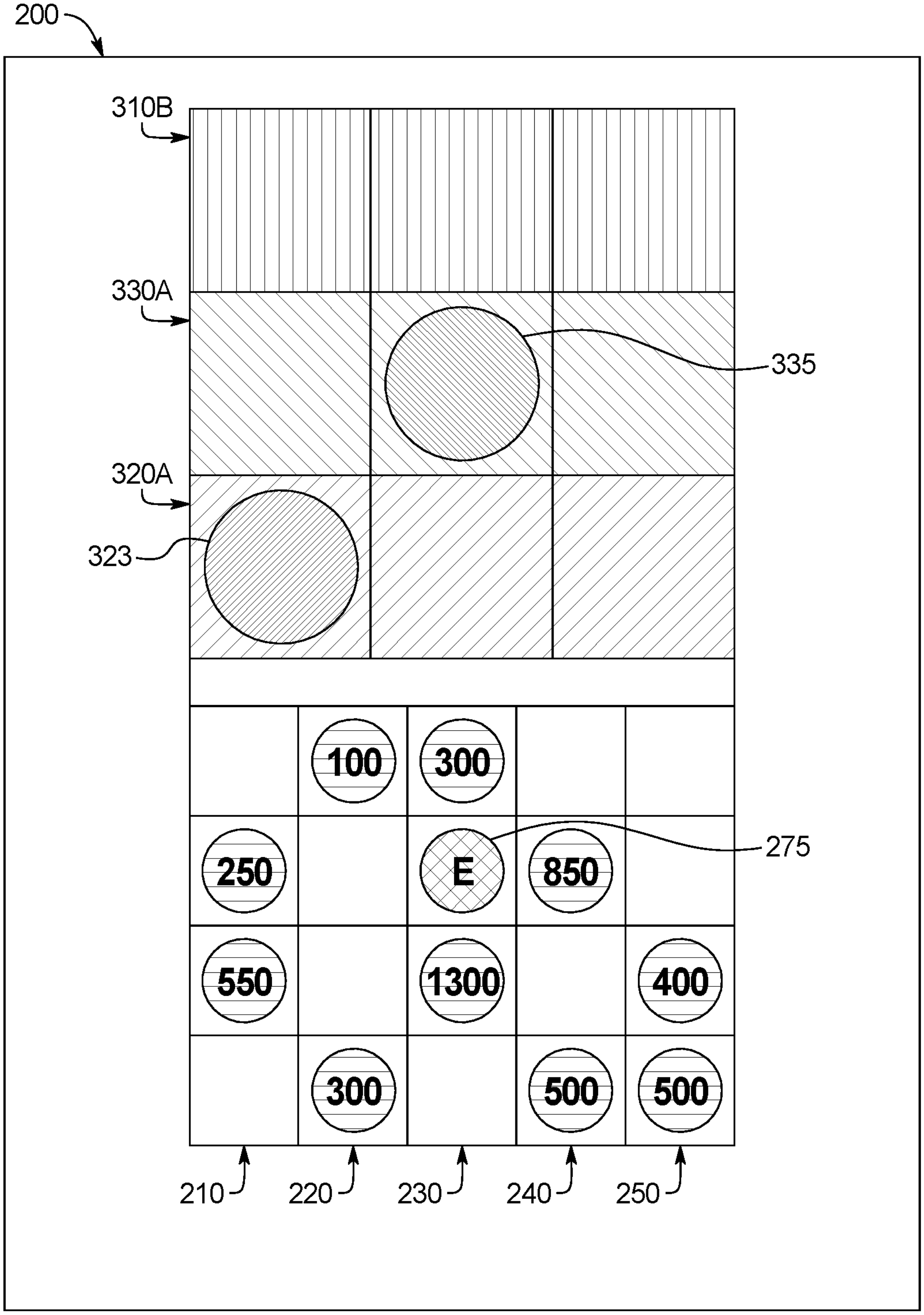
Figure 2Z:
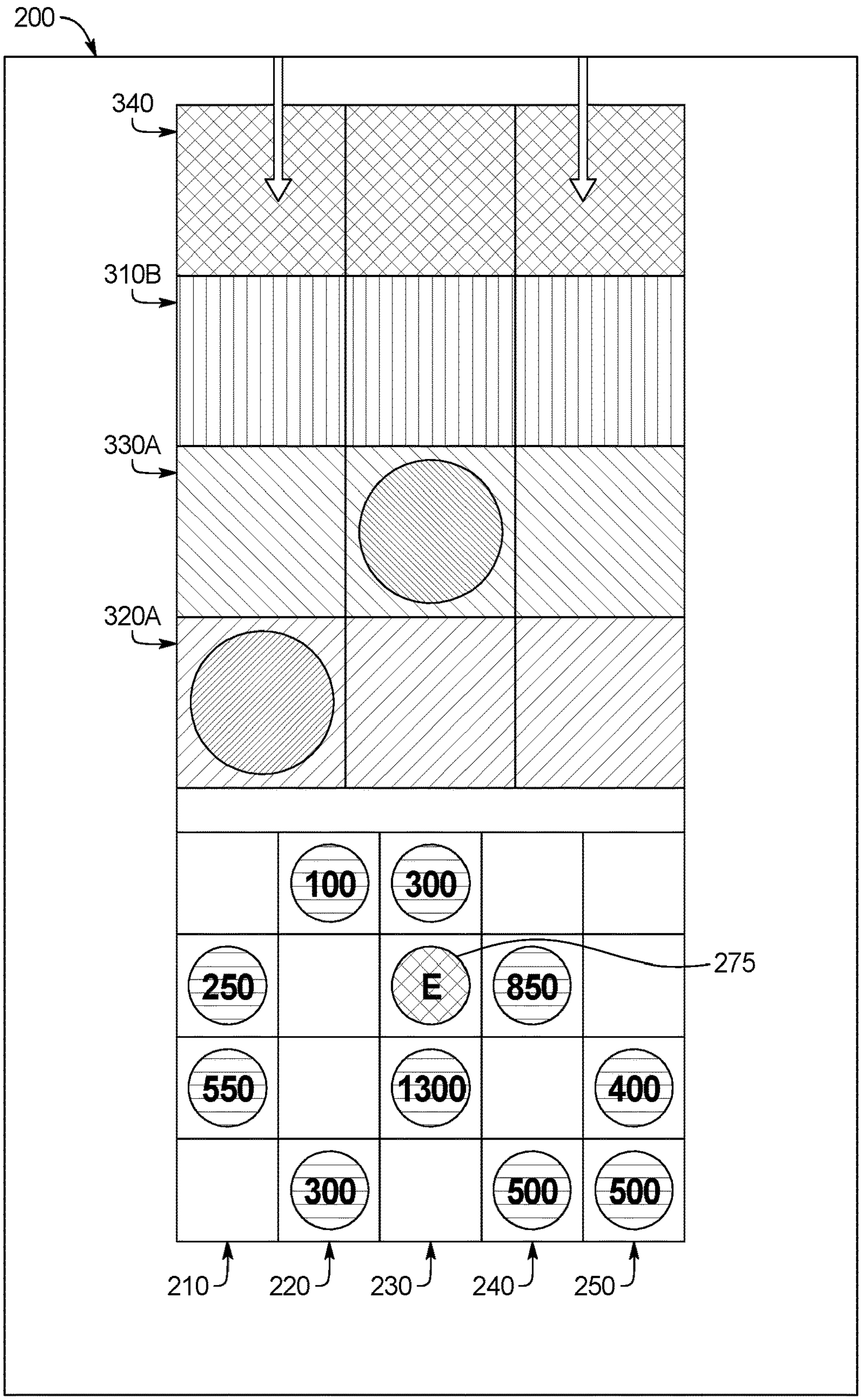

FIGS. 2Z and 2ZZ show an alternative embodiment where an enhancement feature triggering symbol 275 occurs on the plurality of reels 210, 220, 230, 240, and 250 during the symbol accumulation sequence. In this example embodiment, FIG. 2ZZ shows that the EGM adds an additional collection area 340 corresponding to the enhancement feature triggering symbol 275 and for collecting enhancement symbols that can trigger an additional enhancement feature during the symbol accumulation sequence.

It should be appreciated from the examples described above as well as the examples described below that various embodiments of the gaming system and method of the present disclosure provide various enhancement features related to the two different types of symbol accumulation sequence triggering symbols including the award symbols and enhancement feature triggering symbols.

In an example embodiment with enhancement feature triggering symbols, the gaming system and method: (1) cause a display of a plurality of symbol displays configured to display symbols at symbol display positions associated with the symbol displays, wherein the symbols include base symbols and two different types of symbol accumulation sequence triggering symbols including award symbols and enhancement feature triggering symbols; (2) cause a display of a symbol accumulation sequence triggering event including a predetermined quantity of the symbol accumulation sequence triggering symbols; (3) after a display of the symbol accumulation sequence triggering event, cause a display of a symbol accumulation sequence that includes, for each enhancement feature triggering symbol that is part of the symbol accumulation sequence triggering event, an enhancement feature corresponding to that enhancement feature triggering symbol; and (4) for the symbol accumulation sequence: (i) cause a display of an activation counter that indicates a remaining quantity of activations of the symbol displays for the symbol accumulation sequence; and (ii) for a plurality of activations of the symbol displays: (a) cause a display of one or more randomly determined additional award symbols on the symbol displays at the symbol display positions, wherein each of the additional award symbols indicates an award amount associated with that award symbol, and (b) cause a display of a reset of the activation counter. In various such embodiments, the gaming system and method cause a display of the award symbols on the symbol displays that are part of the symbol accumulation sequence triggering event but not the enhancement feature triggering symbols that are part of the symbol accumulation sequence triggering event. In various such embodiments, the gaming system and method cause each of the enhancement feature triggering symbols to be one of a dedicated enhancement feature triggering symbol and a non-dedicated enhancement feature triggering symbol.

In another example embodiment with enhancement feature triggering symbols, the gaming system and method: (1) cause a display of a plurality of symbol displays configured to display symbols at symbol display positions associated with the symbol displays, wherein the symbols include base symbols and enhancement feature triggering symbols; (2) cause a display of a symbol accumulation sequence triggering event including a quantity of enhancement feature triggering symbols; (3) after a display of the symbol accumulation sequence triggering event, cause a display of a symbol accumulation sequence that includes, for each displayed enhancement feature triggering symbol, an enhancement feature corresponding to the enhancement feature triggering symbol; and (4) for the symbol accumulation sequence: (i) cause a display of an activation counter that indicates a remaining quantity of activations of the symbol displays for the symbol accumulation sequence; and (ii) for a plurality of activations of the symbol displays: (a) cause a display of one or more randomly determined award symbols on the symbol displays at the symbol display positions, wherein each of the award symbols indicates an award amount associated with that award symbol, and (b) cause a display of a reset of the activation counter. In various such embodiments, the gaming system and method cause a display of the symbol accumulation sequence without any of the enhancement feature triggering symbols that are part of the symbol accumulation sequence triggering event. In various such embodiments, the gaming system and method cause each of the enhancement feature triggering symbols to be one of a dedicated enhancement feature triggering symbol and a non-dedicated enhancement feature symbol.

In another example embodiment with enhancement feature triggering symbols, the gaming system and method: (1) cause a display of a plurality of symbol displays configured to display symbols at symbol display positions associated with the symbol displays, wherein the symbols include different base symbols, different award symbols, and different enhancement feature triggering symbols, wherein each of the award symbols indicates an award amount associated with that award symbol, and wherein each different enhancement feature triggering symbol is associated with a different enhancement feature; (2) cause a display of a symbol accumulation sequence triggering event including a first quantity of different award symbols and a second quantity of different enhancement feature triggering symbols, wherein the first quantity and the second quantity are each at least one; (3) after a display of the symbol accumulation sequence triggering event, cause a display of a symbol accumulation sequence that includes for each enhancement feature triggering symbol that is part of the symbol accumulation sequence triggering event, the different enhancement feature corresponding to the enhancement feature triggering symbol; and (4) for the symbol accumulation sequence: (a) cause a display of an activation counter that indicates a remaining quantity of activations of the symbol displays for the symbol accumulation sequence; (b) cause a display of the first quantity of award symbols at the symbol display positions and a removal of the second quantity of enhancement feature triggering symbols from the symbol display positions; and (c) for a plurality of activations of the symbol displays: (i) cause a display of one or more randomly determined additional award symbols on the symbol displays at the symbol display positions, wherein each of the additional award symbols indicates an award amount associated with that award symbol, and (ii) cause a display of a reset of the activation counter. In various such embodiments, the gaming system and method cause a display of a symbol collection area associated with one of the enhancement feature triggering symbols. In various such embodiments, the gaming system and method cause a display of a plurality of different symbol collection areas respectively associated with the enhancement feature triggering symbols.

It should further be appreciated from the example described above as well as the example described below that various embodiments of the gaming system and method of the present disclosure provide an enhancement feature that includes one or more extra rows of symbol display positions.

In an example embodiment with an extra row enhancement feature, the gaming system and method: (1) cause a display of a plurality of symbol displays configured to display award symbols at symbol display positions associated with the symbol displays and arranged in rows and columns; (2) cause a display of a plurality of randomly determined initial award symbols on the symbol displays at a plurality of the symbol display positions, wherein each of the award symbols indicates an award amount associated with that award symbol; (3) cause a display of an activation counter that indicates a remaining quantity of activations of the symbol displays for the symbol accumulation sequence; (4) for each of a plurality of activations of the symbol displays: (i) cause a display of one or more randomly determined additional award symbols on the symbol displays at the symbol display positions, wherein each of the additional award symbols indicates an award amount associated with that award symbol, and (ii) cause a display of a reset of the activation counter; (5) cause a display of a randomly determined extra row triggering event; (6) after the display of the extra row triggering event, cause a display of an extra row of symbol display positions; and (7) after the display of the extra row of symbol display positions: (a) cause a display of a randomly determined additional award symbol on the symbol displays at one of the symbol display positions of the extra row, wherein the additional award symbol indicates an award amount associated with that award symbol, and (b) cause a display of a reset of the activation counter. In various such embodiments, the gaming system and method cause a display of additional accumulated award symbols in the symbol display positions associated with the extra row.

In another example embodiment with an extra row enhancement feature, the gaming system and method: (1) cause a display of a plurality of symbol displays configured to display award symbols at symbol display positions associated with the symbol displays and arranged in rows and columns; (2) cause a display of a plurality of randomly determined initial award symbols on the symbol displays at a plurality of the symbol display positions, wherein each of the award symbols indicates an award amount associated with that award symbol; (3) for each of a plurality of activations of the symbol displays, cause a display of one or more randomly determined additional award symbols on the symbol displays at the symbol display positions, wherein each of the additional award symbols indicates an award amount associated with that award symbol; (4) cause a display of a randomly determined extra row triggering event; (5) after the display of the extra row triggering event, cause a display of an extra row of symbol display positions; and (6) after the display of the extra row of symbol display positions, cause a display of a randomly determined additional award symbol on one of the symbol displays at one of the symbol display positions of the extra row, wherein said additional award symbol indicates an award amount associated with that award symbol.

In another example embodiment with an extra row enhancement feature, the gaming system and method: (1) cause a display of a plurality of symbol displays configured to display award symbols at symbol display positions associated with the symbol displays and arranged in rows and columns; (2) cause a display of an activation counter that indicates a remaining quantity of activations of the symbol displays for the symbol accumulation sequence; (3) for each of a plurality of activations of the symbol displays: (a) cause a display of one or more randomly determined additional award symbols on the symbol displays at the symbol display positions, wherein each of the additional award symbols indicates an award amount associated with that award symbol and is accumulated at that symbol display position for a rest of the symbol accumulation sequence, and (b) cause a display of a reset of the activation counter; (4) cause a display of a randomly determined extra row triggering event; (5) after the display of the extra row triggering event, cause a display of an extra row of symbol display positions; and (6) after the display of the extra row of symbol display positions: (i) cause a display of a randomly determined additional award symbol on one of the symbol displays at one of the symbol display positions of the extra row, wherein the additional award symbol indicates an award amount associated with that award symbol and is accumulated at that symbol display position for a rest of the symbol accumulation sequence, and (ii) cause a display of a reset of the activation counter.

In various such embodiments, the gaming system and method cause a display of an end of the symbol accumulation sequence responsive to the award symbols being accumulated at all of the symbol display positions including the symbol display positions associated with the extra row. This enables longer play of the sequence because more award symbols need to be generated in the symbol display positions of the extra row to end the sequence. In various other embodiments, the gaming system and method cause a display of the extra row such that the extra row does not decrease a probability of ending of the symbol accumulation sequence.

In various alternative embodiments, the gaming system and method cause a display of an end of the symbol accumulation sequence responsive to the award symbols being accumulated at all of the symbol display positions excluding the symbol display positions associated with the extra row. This enables extra awards to be accumulated during the sequence but and can cause a longer play of the sequence because more for each such additional award symbol accumulated in a symbol display positions of the extra row, the activation counter is reset. Thus, in various such embodiments, the gaming system and method cause a display of the extra row such that the extra row increases a probability of causing a display of a reset of the activation counter. In various other embodiments, the gaming system and method cause a display of the extra row such that the extra row decreases a probability of ending the symbol accumulation sequence.

In various other embodiments, the gaming system and method cause a display of the extra row such that the extra row does not increase a probability of causing a display of a reset of the activation counter. In other words, the activation counter is not reset by an award symbol displayed in the extra row, but the gaming system can still provide the player the awards associated with such award symbols.

In various such embodiments, the gaming system and method cause a display of only one award symbol at each symbol display positions associated with the symbol displays including the symbol display positions associated with the extra row. In various alternative embodiments, the gaming system and method cause a display of only one award symbol at each symbol display position associated with the symbol displays excluding the symbol display positions associated with the extra row.

In various such embodiments, the gaming system or method cause a display of the extra row triggering event includes a collection of a plurality of extra-row symbols in an extra-row symbol collection area.

It should further be appreciated from the examples described above the examples described below that various embodiments of the gaming system and method of the present disclosure provide blocking feature for one or more of the enhancement features.

In an example embodiment with a blocking feature, the gaming system and method: (1) cause a display of randomly determined accumulated award symbols at symbol display positions of a symbol accumulation area, each of the accumulated award symbols indicating an award amount associated with that accumulated award symbol; (2) cause a display of a first enhancement symbol collection area adjacent to the symbol accumulation area; (3) cause a display of a second enhancement symbol collection area adjacent to the first enhancement symbol collection area, and such that the first enhancement symbol collection area is between the second first enhancement symbol collection area and the symbol accumulation area; (4) cause a display of an indication of an unavailability of applying a first enhancement feature associated with the first enhancement symbol collection area based on an insufficient first quantity of first symbols collected in the first enhancement collection area, wherein the first enhancement feature is applicable to the accumulated award symbols at the symbol display positions of the symbol accumulation area; (5) cause a display of an indication of an availability of applying a second enhancement feature associated with the second enhancement symbol collection area based on a sufficient second quantity of second symbols collected in the second enhancement collection area, wherein the second enhancement feature is applicable to the accumulated award symbols at the symbol display positions of the symbol accumulation area; and (6) cause a display of an indication that application of the second enhancement feature is blocked by the first enhancement symbol collection area.

In another example embodiment with an blocking feature, the gaming system and method: (1) cause a display of randomly determined accumulated award symbols at symbol display positions of a symbol accumulation area, each of the accumulated award symbols indicating an award amount associated with that accumulated award symbol; (2) cause a display of a first enhancement symbol collection area adjacent to the symbol accumulation area, wherein a first enhancement feature is associated with the first enhancement symbol collection area; (3) cause a display of a second enhancement symbol collection area adjacent to the first enhancement symbol collection area, and such that the first enhancement symbol collection area is between the second first enhancement symbol collection area and the symbol accumulation area, and wherein a second enhancement feature is associated with the second enhancement symbol collection area; and (4) cause a display of an indication that application of the second enhancement feature is blocked by the first enhancement symbol collection area.

In another example embodiment with an blocking feature, the gaming system or method: (1) cause a display of randomly determined accumulated award symbols at symbol display positions of a symbol accumulation area, each of the accumulated award symbols indicating an award amount associated with that accumulated award symbol; (2) cause a display of a first enhancement symbol collection area adjacent to the symbol accumulation area, and wherein a first enhancement feature is associated with the first enhancement symbol collection area; (3) cause a display of a second enhancement symbol collection area adjacent to the first enhancement symbol collection area, and such that the first enhancement symbol collection area is between the second first enhancement symbol collection area and the symbol accumulation area, and wherein a second enhancement feature is associated with the second enhancement symbol collection area; and (4) cause a display of a third enhancement symbol collection area adjacent to the second enhancement symbol collection area, and such that the second enhancement symbol collection area is between the first enhancement symbol collection area and the third enhancement symbol collection area, and wherein a third enhancement feature is associated with the third enhancement symbol collection area; and (5) cause a display of an indication that the first enhancement feature must be applied before the second enhancement symbol feature is applied, and that the second enhancement feature must be applied before the third enhancement symbol feature is applied.

In various embodiments, the gaming system and method: (a) cause a display, by the display device, of an indication of an availability of applying the first enhancement feature associated with the first enhancement symbol collection area based on the sufficient first quantity of first symbols collected in the first enhancement collection area; (b) cause a display of an application of the first enhancement feature to at least one of the accumulated award symbols at the symbol display positions of the symbol accumulation area; and (c) thereafter cause a display of an application of the second first enhancement feature to at least one of the accumulated award symbols at the symbol display positions of the symbol accumulation area.

In various embodiments, the gaming system and method: (a) cause a display of an indication of an availability of applying the first enhancement feature associated with the first enhancement symbol collection area based on the sufficient first quantity of first symbols collected in the first enhancement collection area; (b) cause a display of an application of the first enhancement feature to at least one of the accumulated award symbols at the symbol display positions of the symbol accumulation area; cause a display of a removal of the first enhancement symbol collection; cause a display of the second enhancement symbol collection being adjacent to the accumulated symbol collection area; and (c) thereafter cause a display of an application of the second first enhancement feature to at least one of the accumulated award symbols at the symbol display positions of the symbol accumulation area.

In various embodiments, the gaming system and method cause a display of the first enhancement symbol collection area adjacent to the second enhancement symbol collection area and such that the second enhancement symbol collection area is between the first enhancement symbol collection area and the symbol accumulation area.

In various embodiments, the gaming system and method cause a display of a third enhancement symbol collection area adjacent to the second enhancement symbol collection area, and such that the second enhancement symbol collection area is between the first enhancement symbol collection area and the third enhancement symbol collection area.

In various embodiments, the gaming system and method cause a display of an indication of an availability of applying a third enhancement feature associated with the third enhancement symbol collection area based on a third quantity of third symbols collected in the third enhancement collection area, wherein the third enhancement feature is applicable to the accumulated award symbols at the symbol display positions of the symbol accumulation area; and cause a display of an indication that application of the third enhancement feature is blocked by the first enhancement symbol collection area.

In various embodiments, a quantity of second symbols need to be collected in the second enhancement collection area to make the second enhancement feature available to apply is a same quantity of first symbols need to be collected in the first enhancement collection area to make the first enhancement feature available to apply. In various embodiments, a quantity of third symbols need to be collected in the third enhancement collection area to make the third enhancement feature available to apply is a same quantity of one or both of the first and second symbols that need to be respectively collected in the first and second enhancement collection areas to make the first and second enhancement features available to apply.

In various embodiments, the gaming system or method: (a) cause a display of an application of the first enhancement feature to the accumulated award symbols at symbol display positions of the symbol accumulation area; (b) cause a display of a removal of the first enhancement symbol collection; (c) cause a display of the second enhancement symbol collection being adjacent to the accumulated symbol collection area; and (d) thereafter cause a display of an application of the second first enhancement feature to at least one of the accumulated award symbols at the symbol display positions of the symbol accumulation area.

In various embodiments, the gaming system and method cause a display of an indication that application of the third enhancement feature is blocked by the first and/or second enhancement symbol collection area.

Figure 3A:
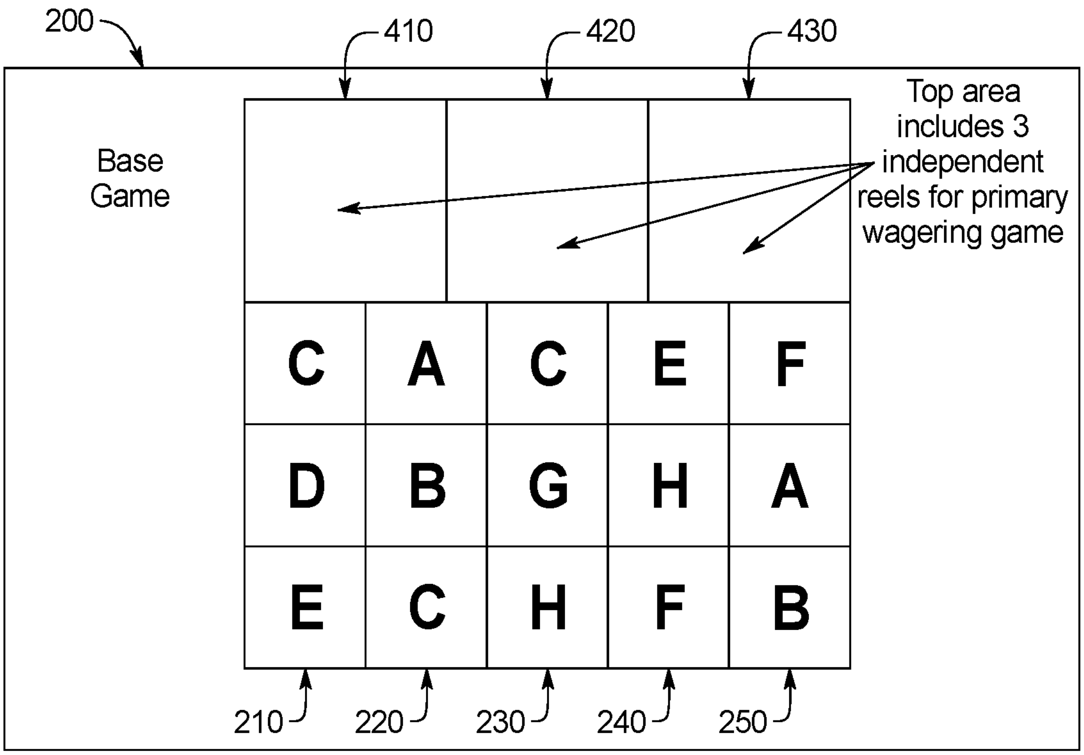
FIGS. 3A to 3Z are front views of screen shots of parts of plays of a primary wagering game and a symbol accumulation sequence triggered from the play of the primary wagering game, wherein the symbol accumulation sequence includes a plurality of different enhancement features of various embodiments of the present disclosure.
Figure 3B:
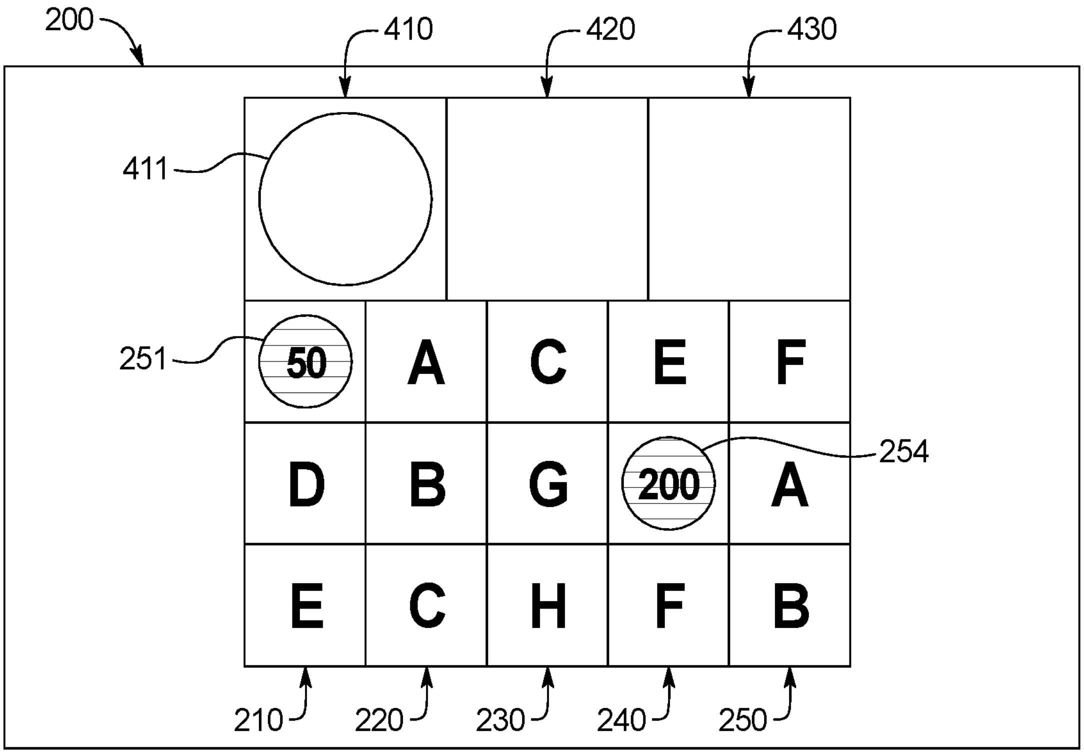
Figure 3C:
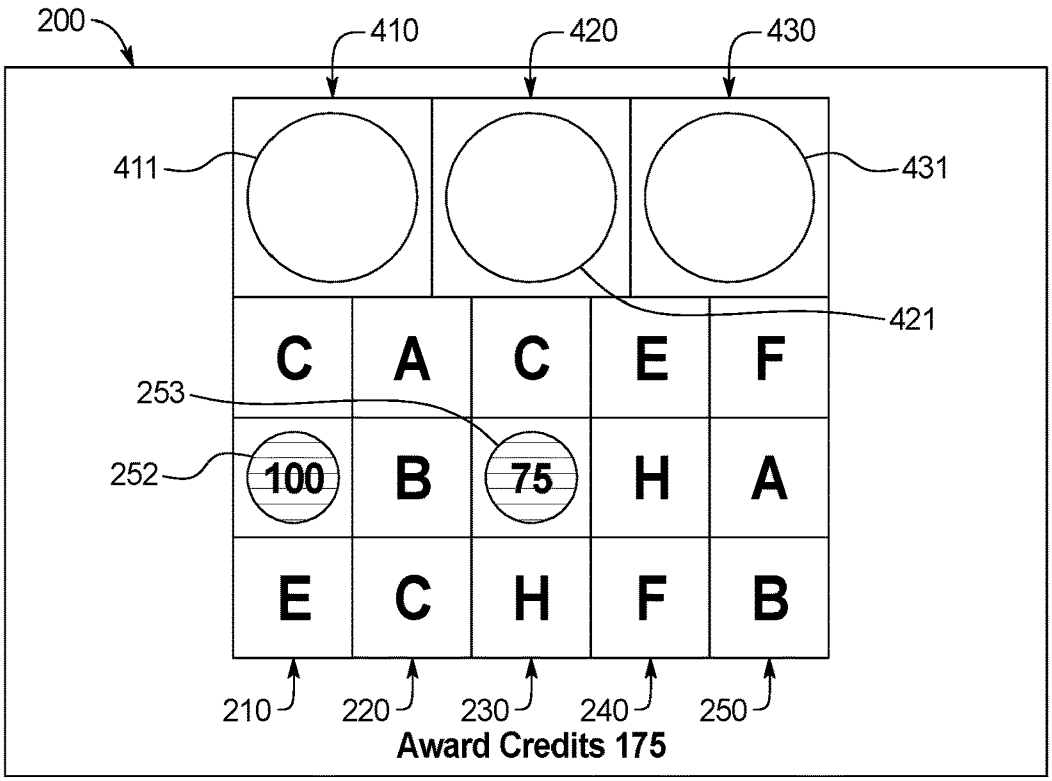
Figure 3D:
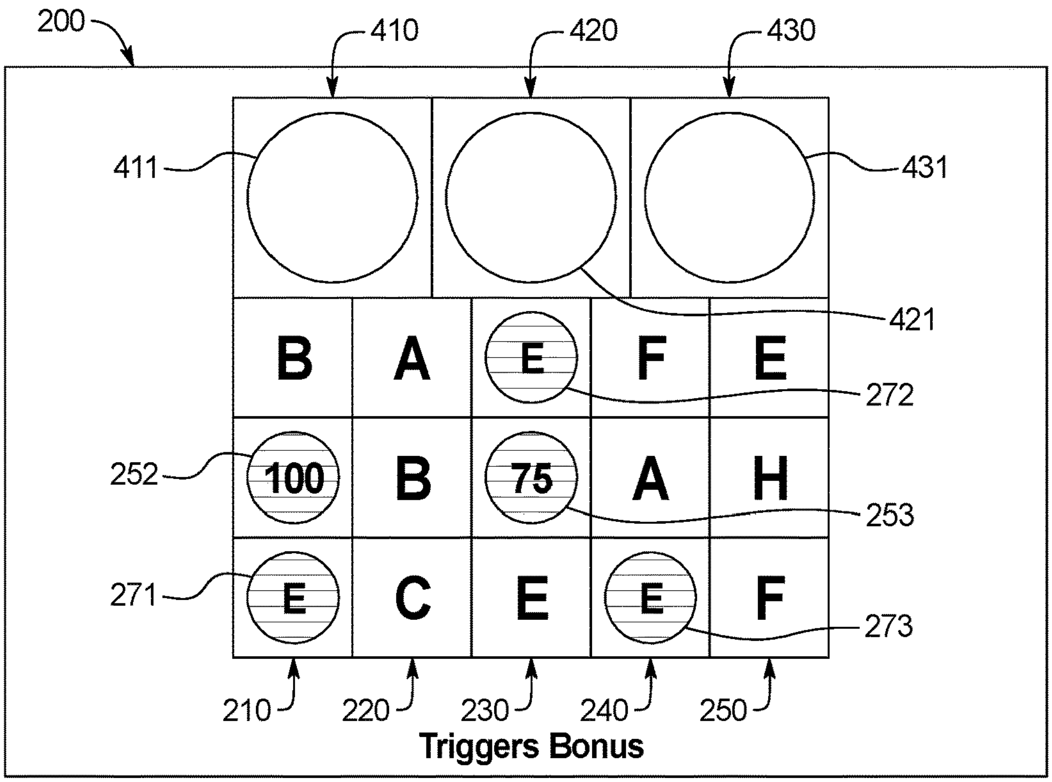
Figure 3E:
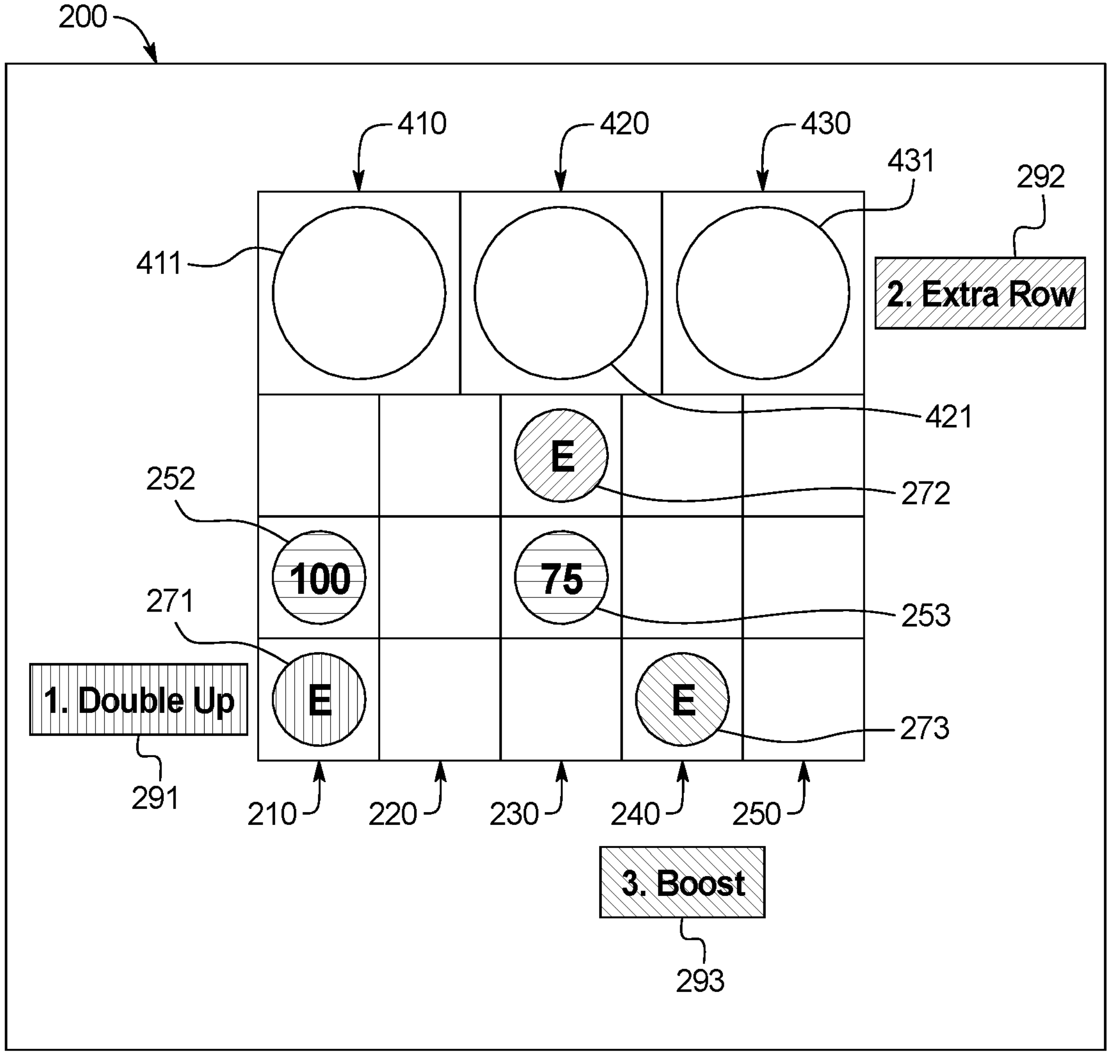
Figure 3F:
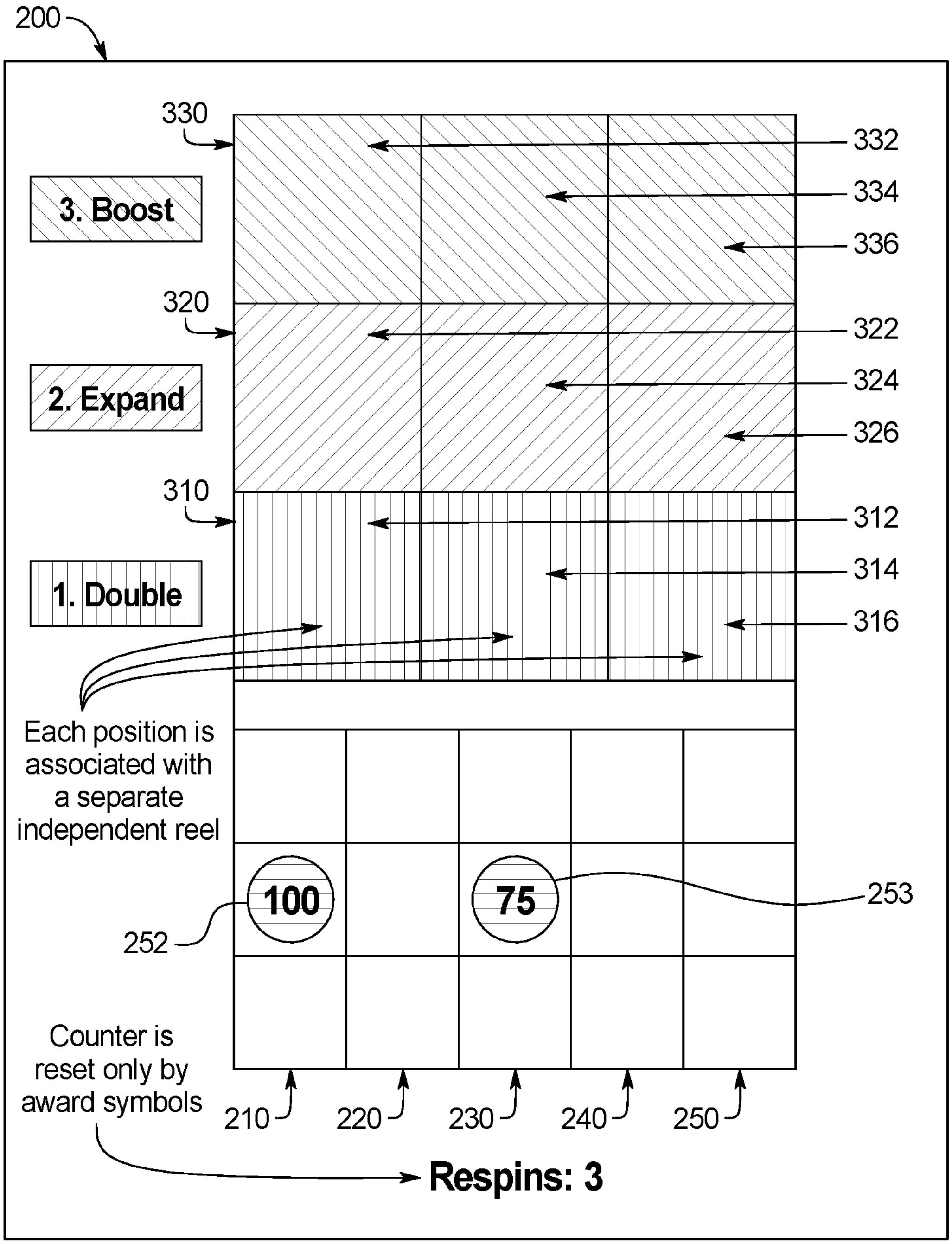
Figure 3G:
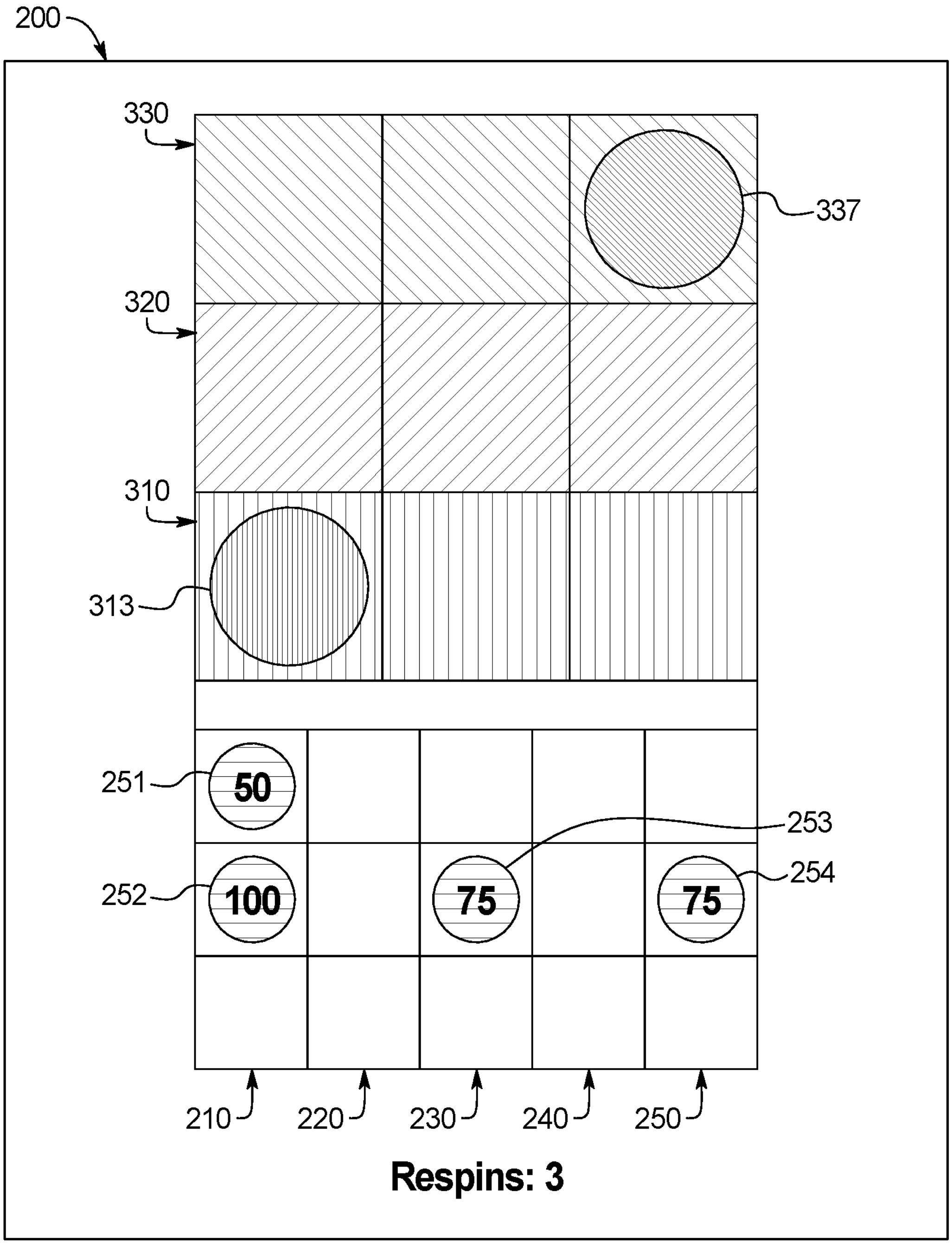
Figure 3H:
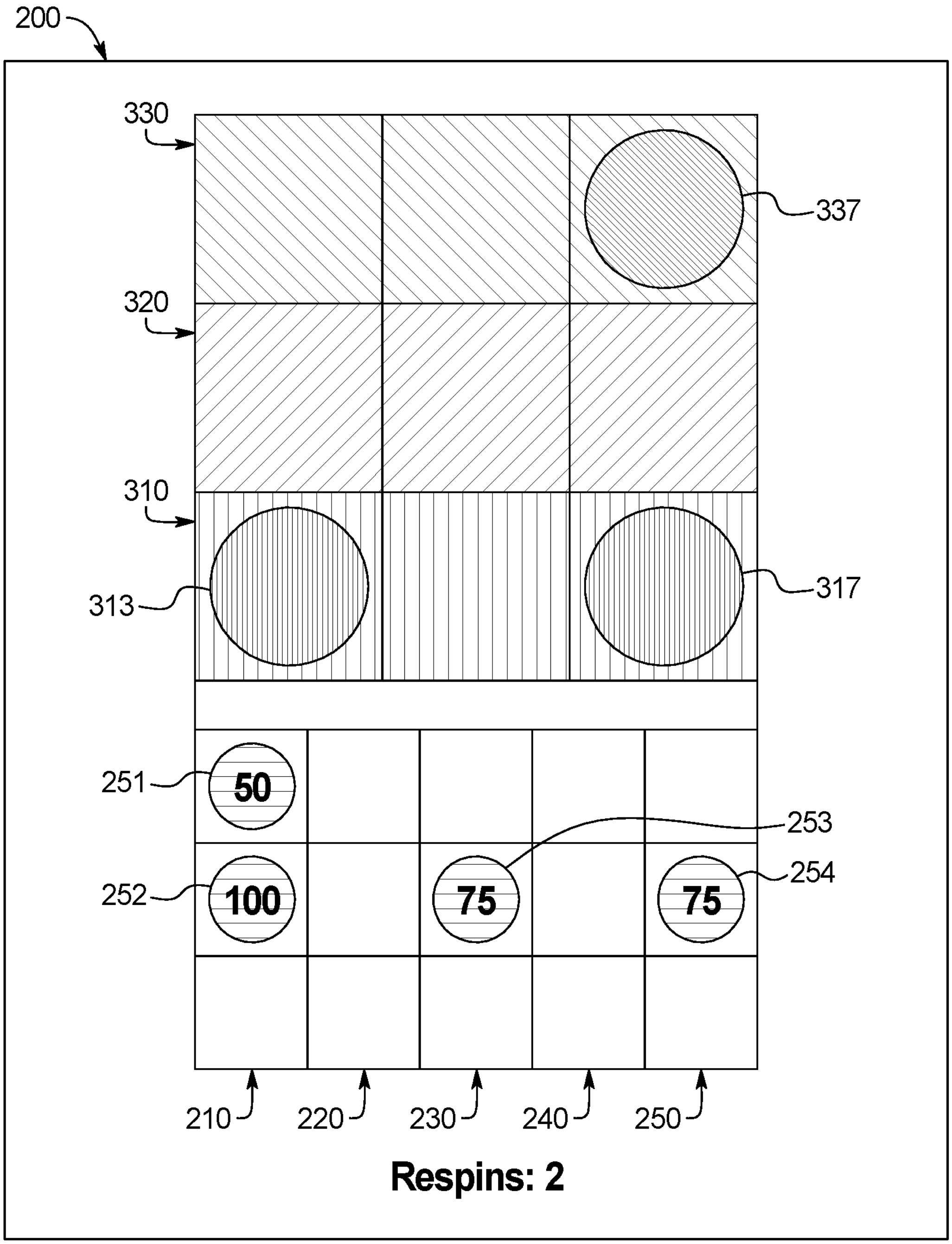
Figure 3I:
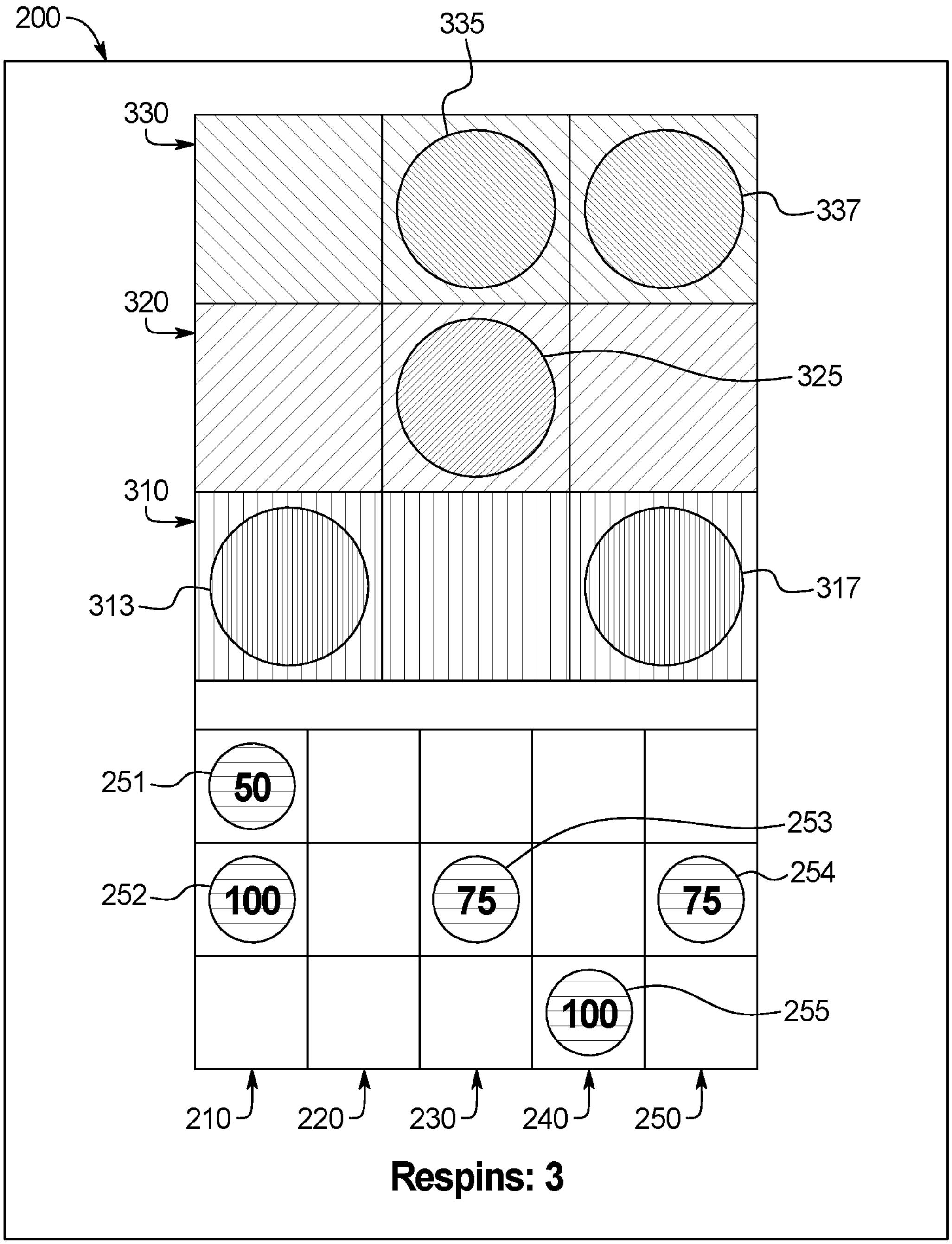
Figure 3J:
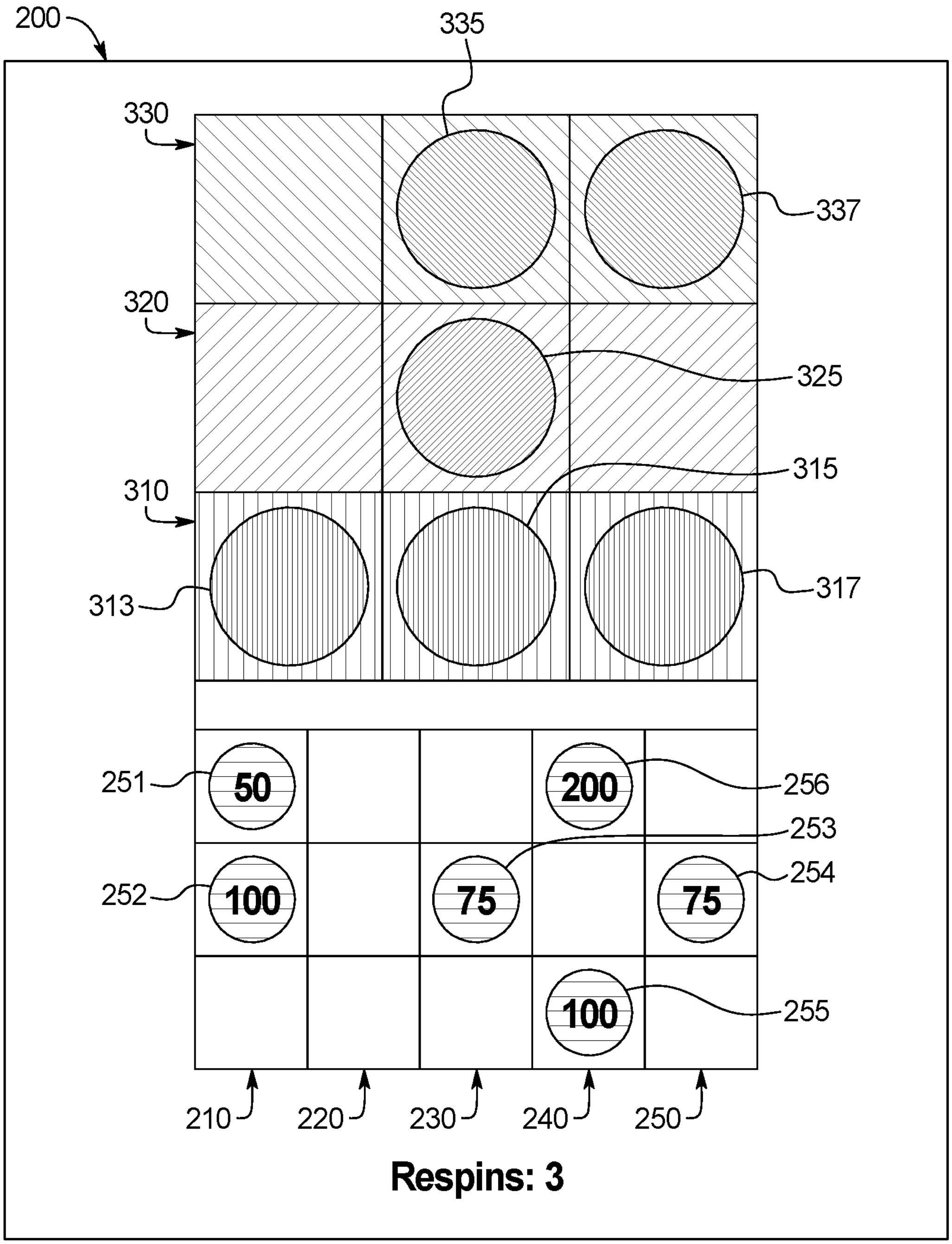
Figure 3K:
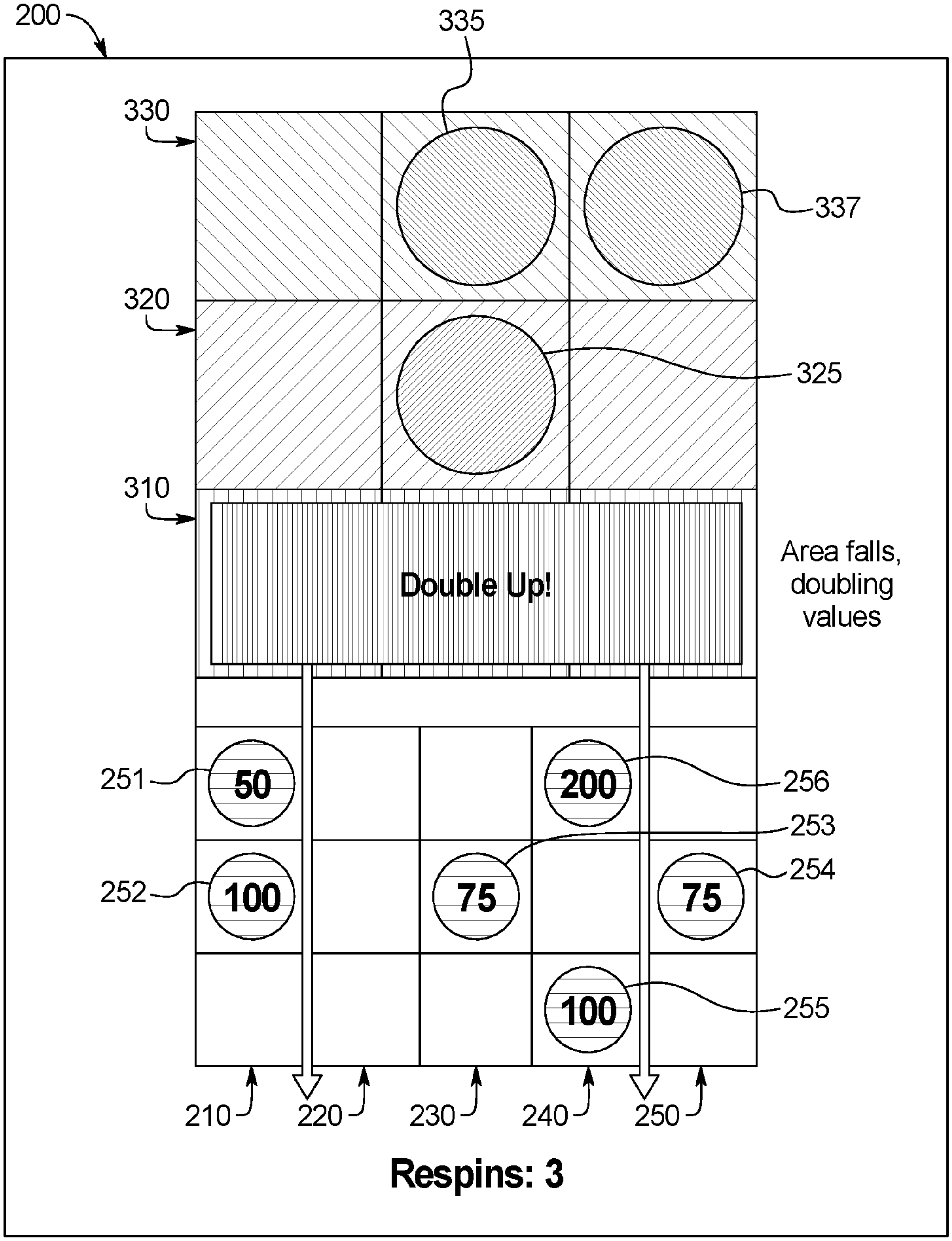
Figure 3L:
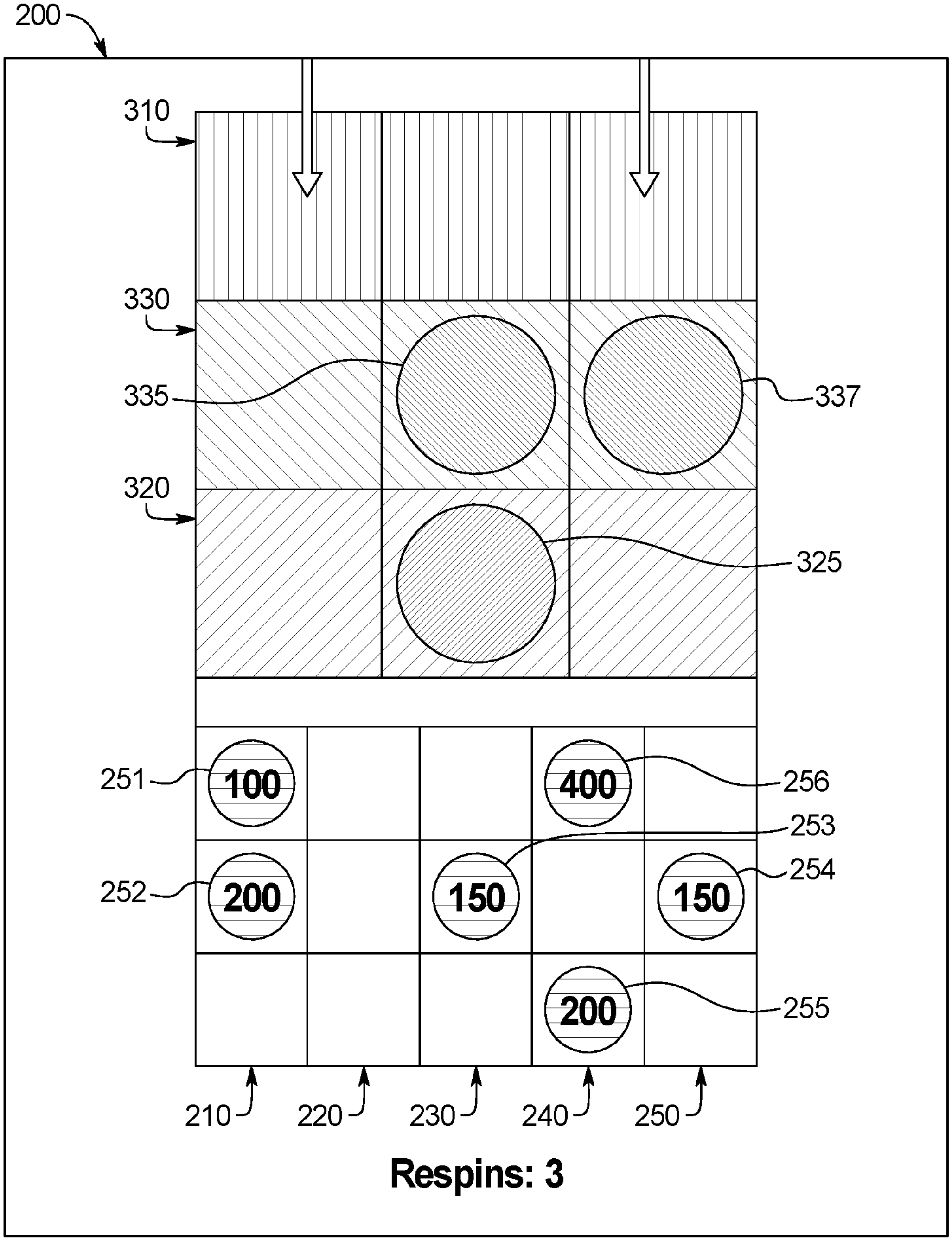
Figure 3M:
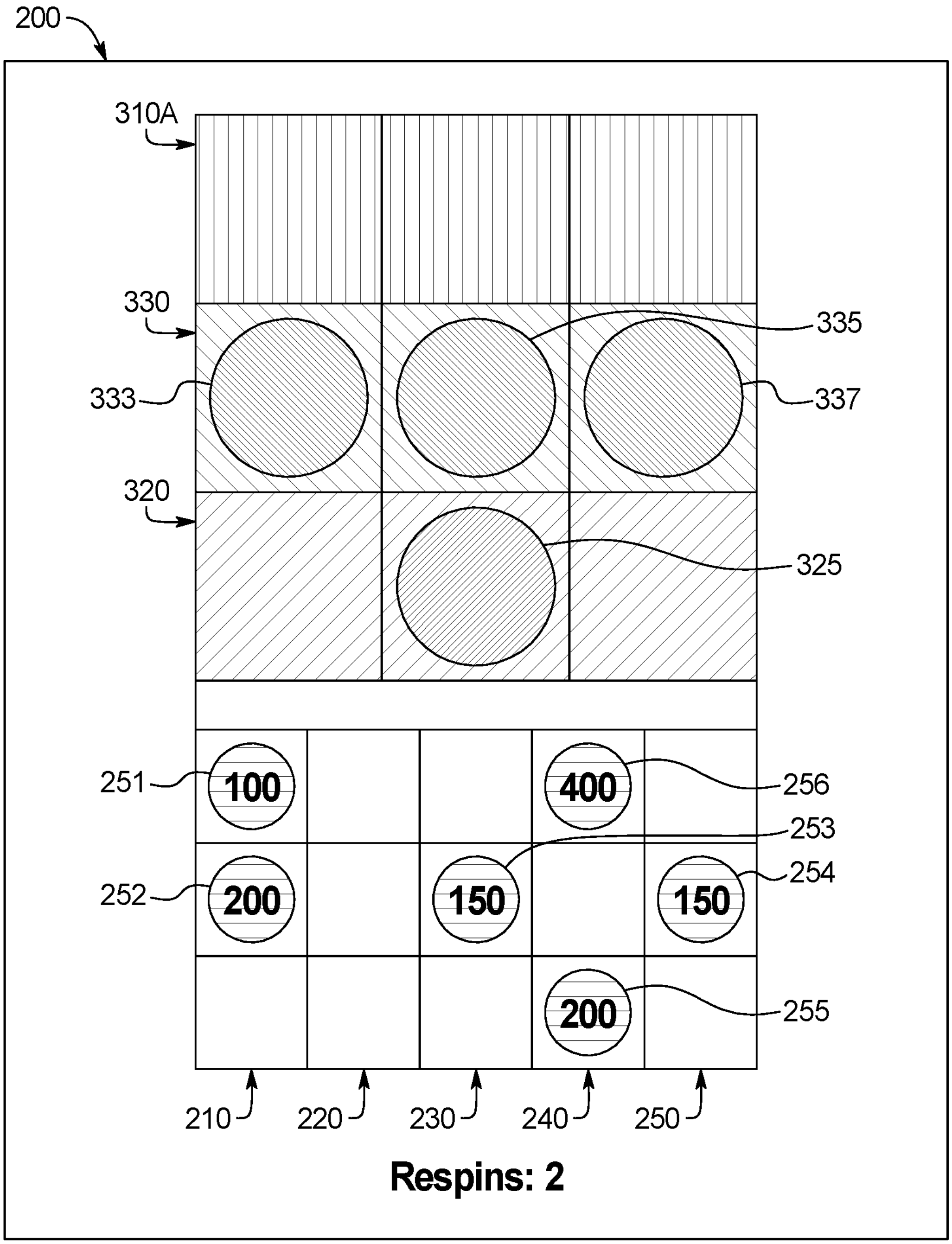
Figure 3N:
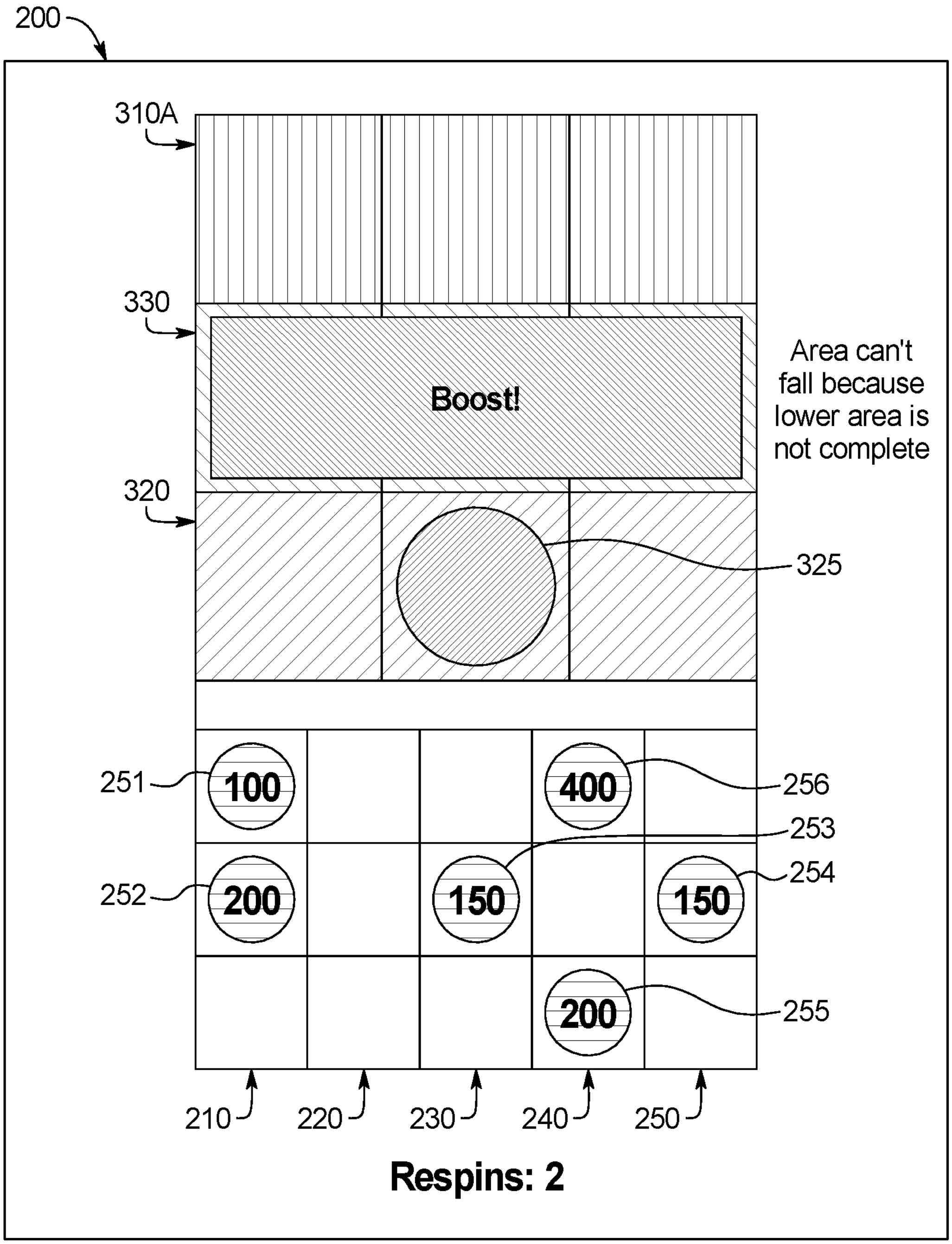
Figure 3O:
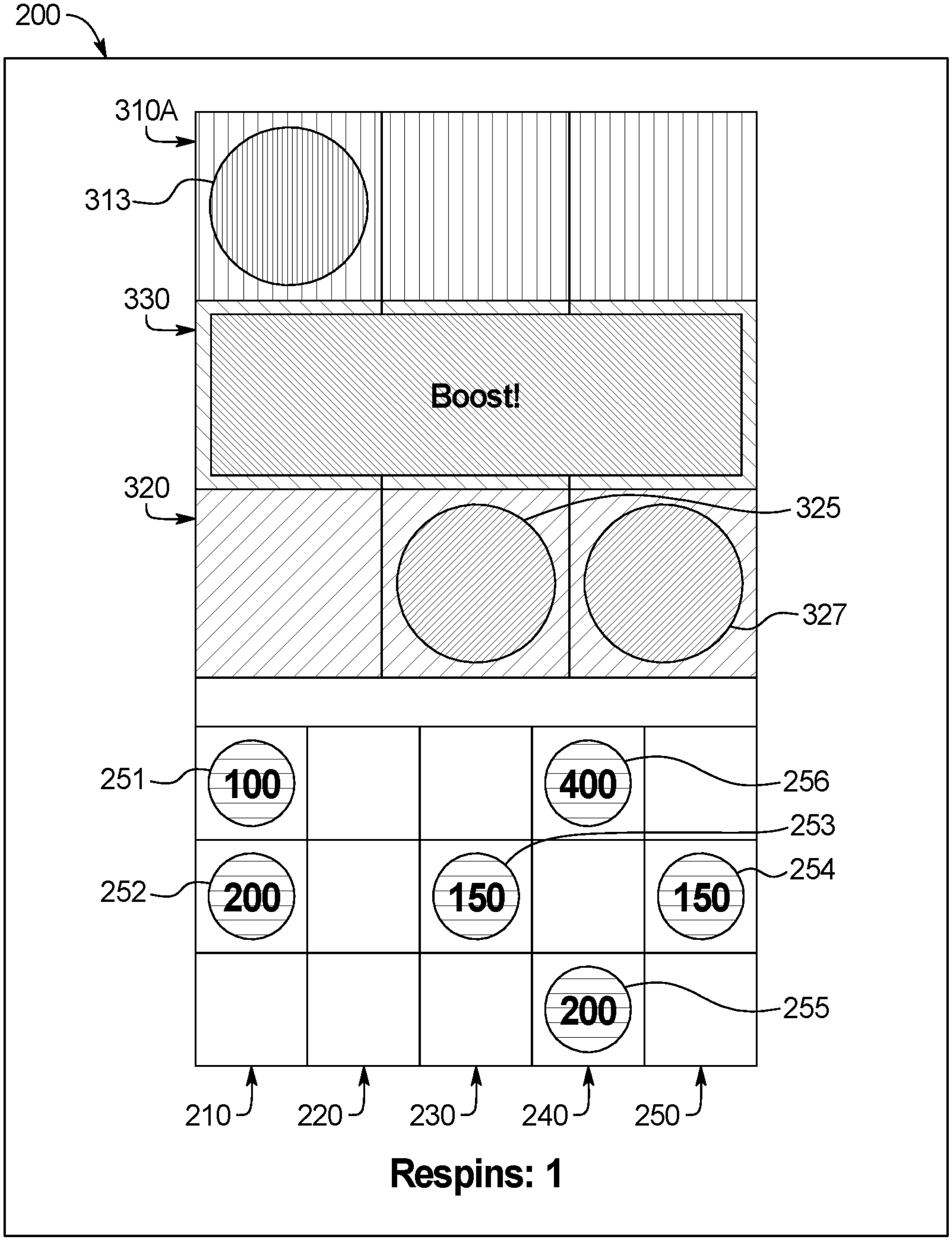
Figure 3P:
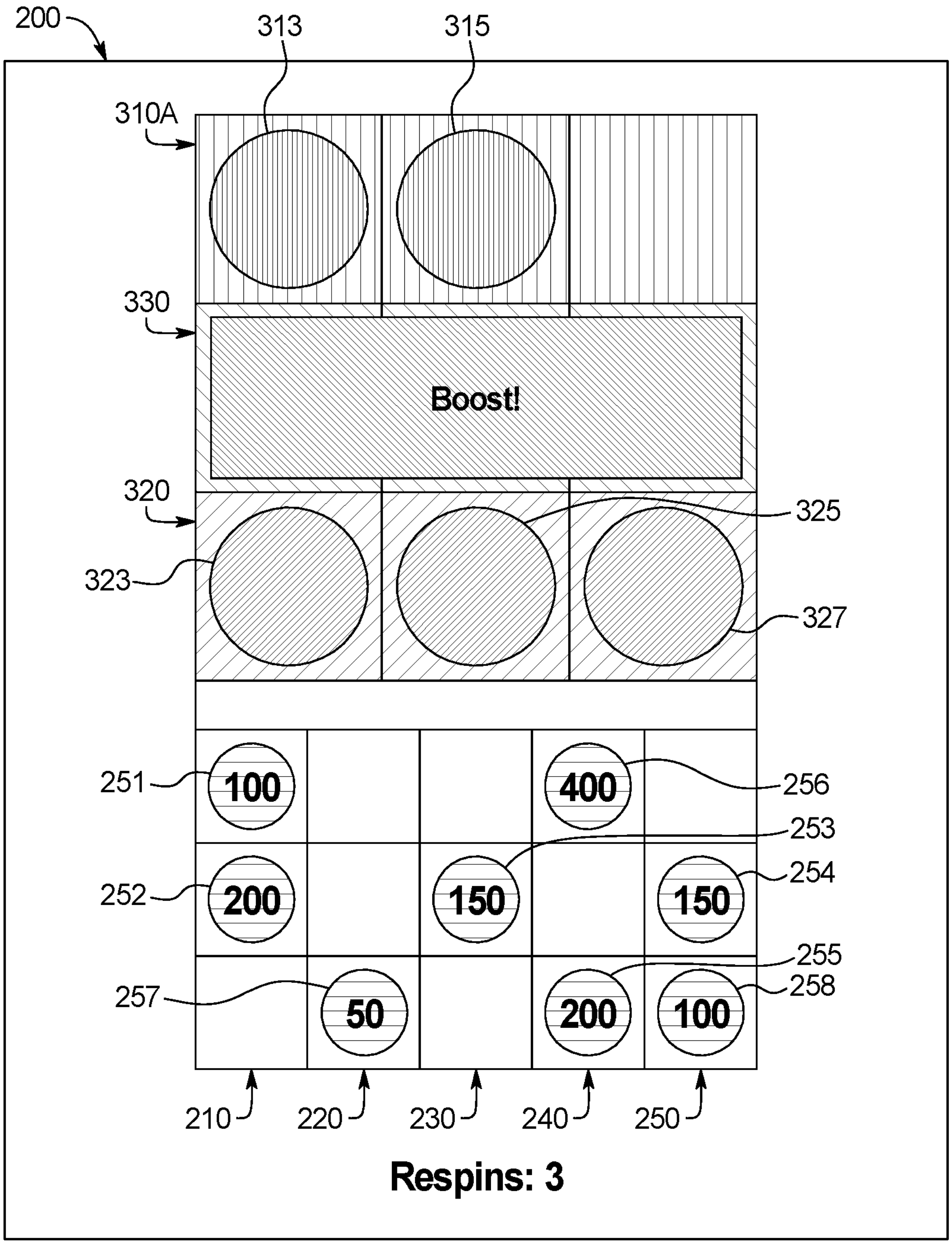
Figure 3Q:
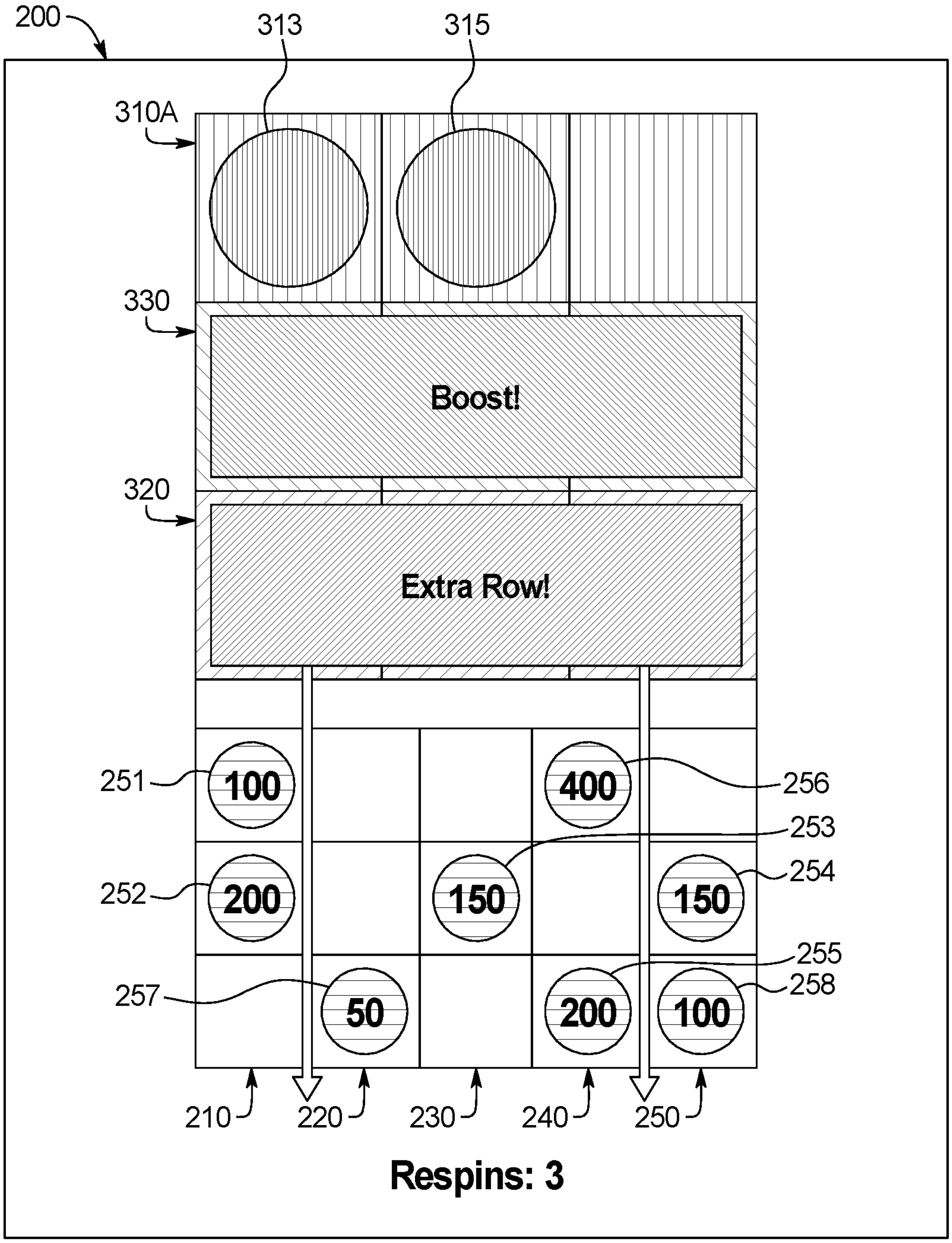
Figure 3R:
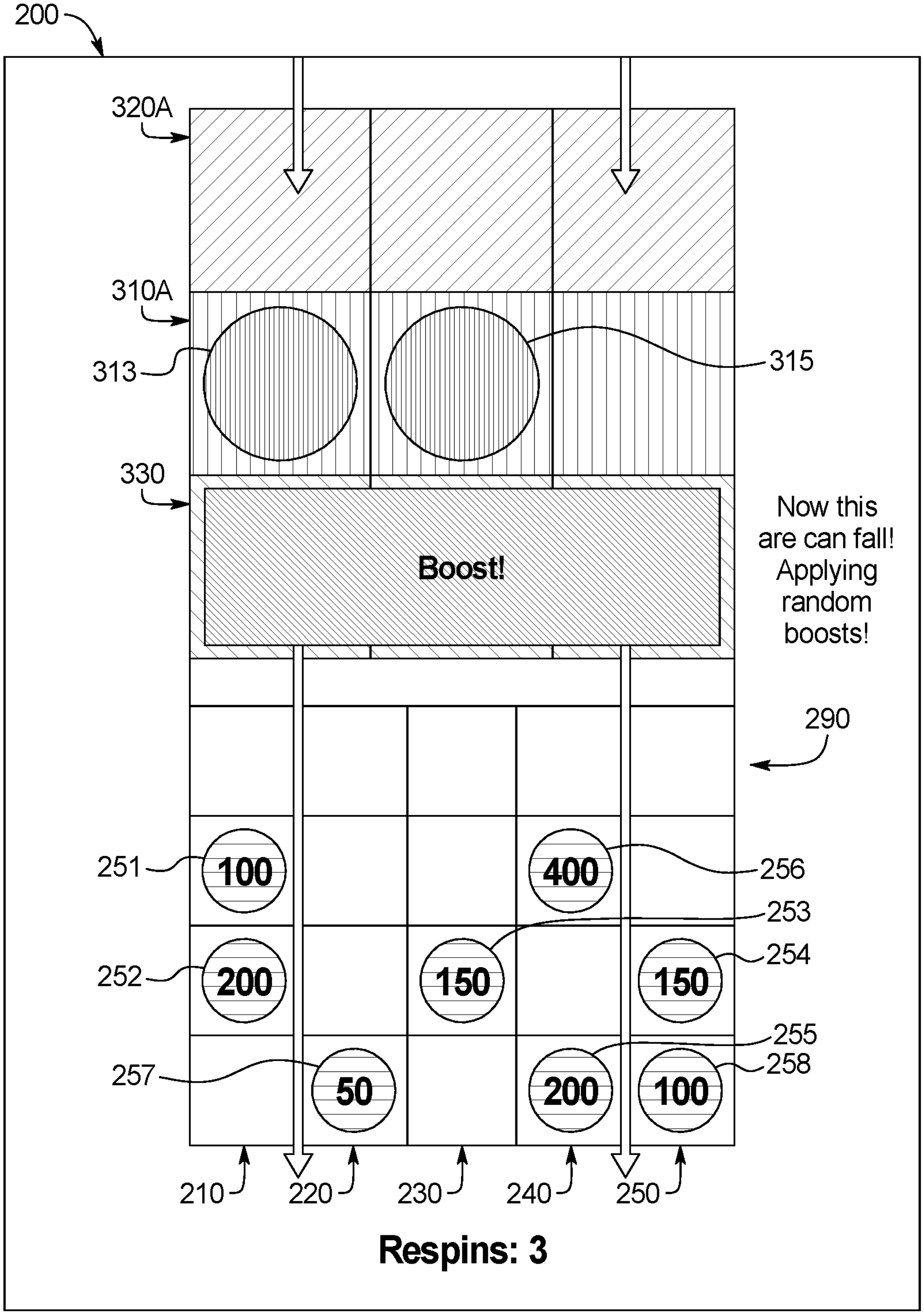
Figure 3S:
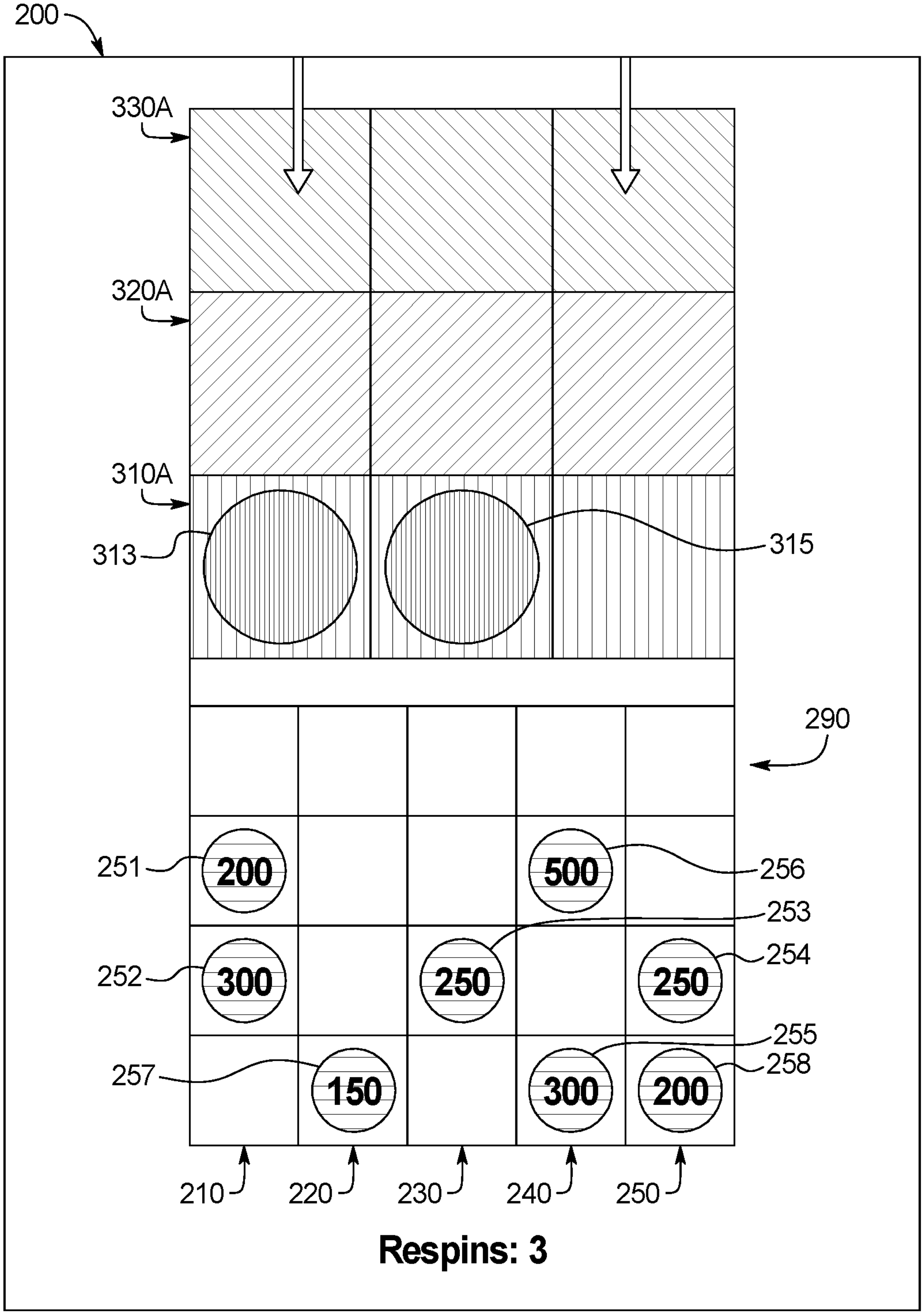
Figure 3T:
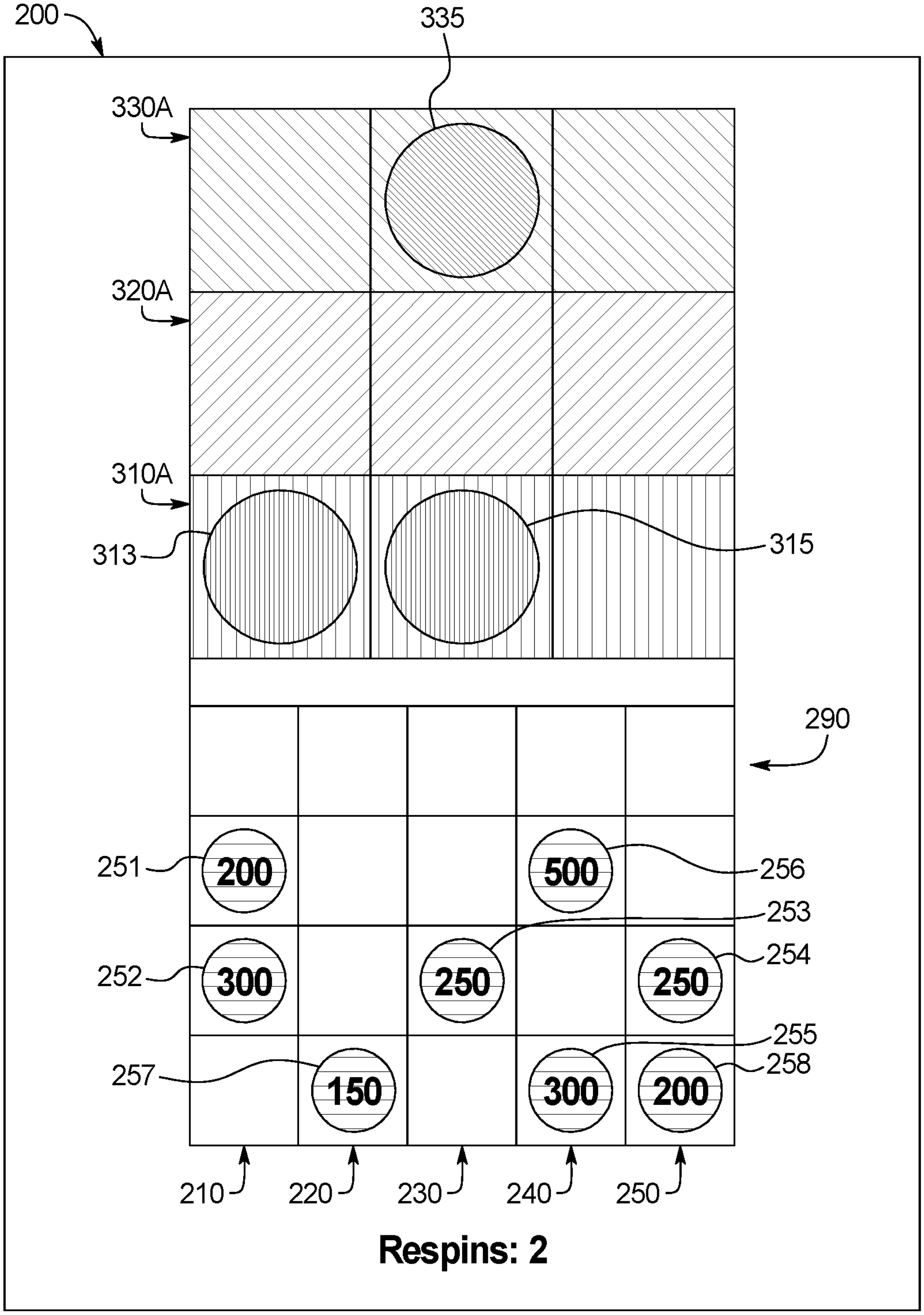
Figure 3U:
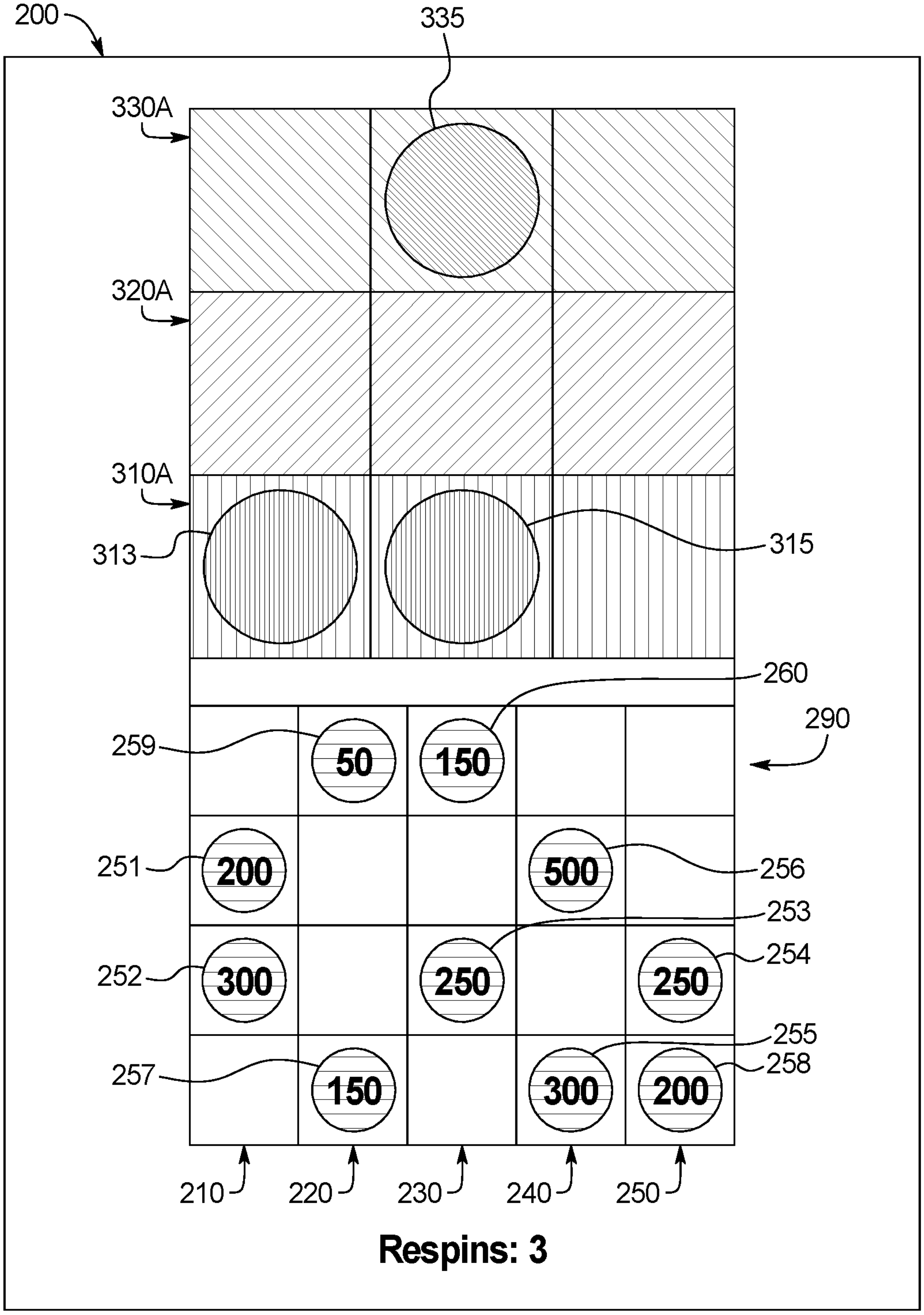
Figure 3V:
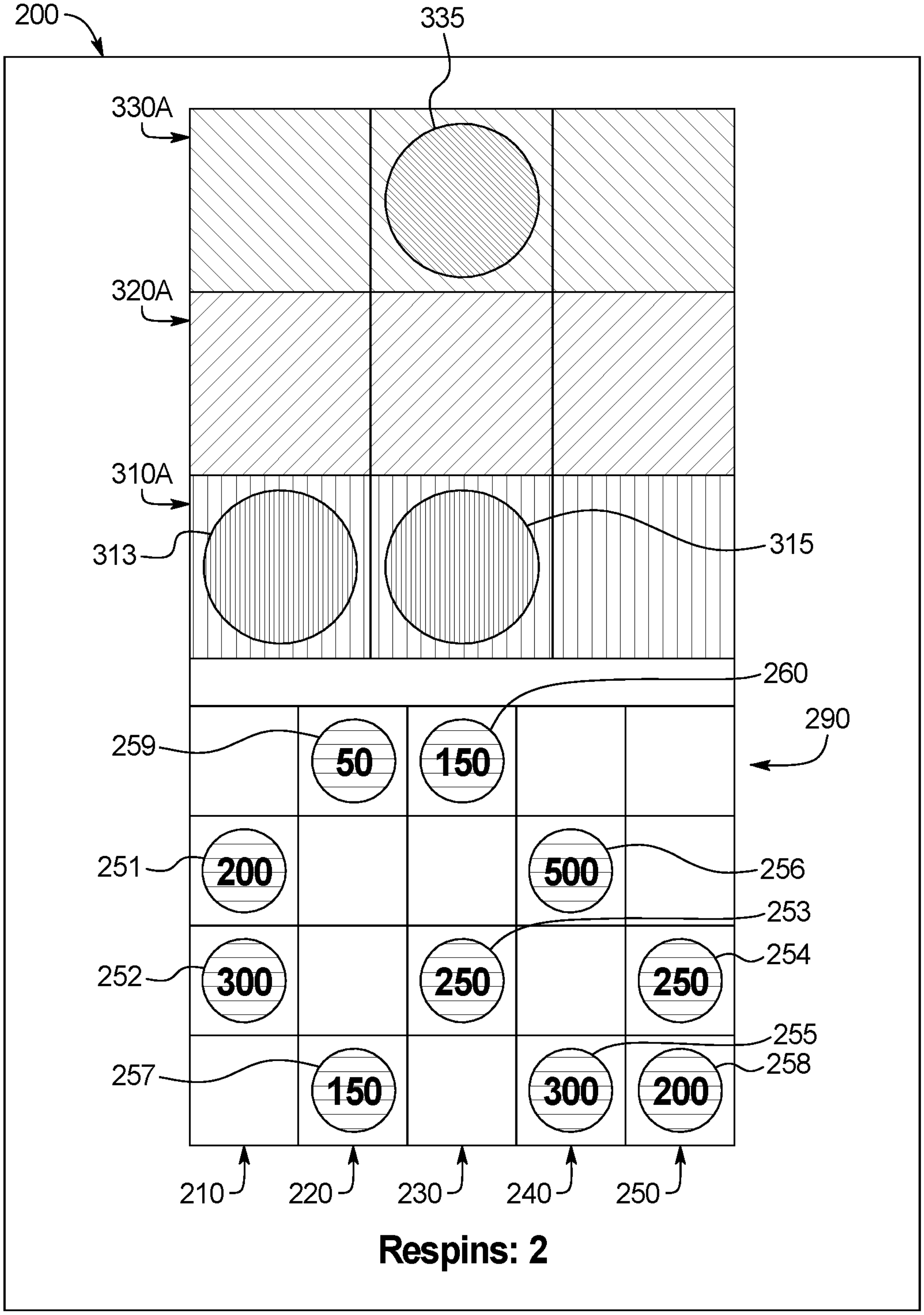
Figure 3W:
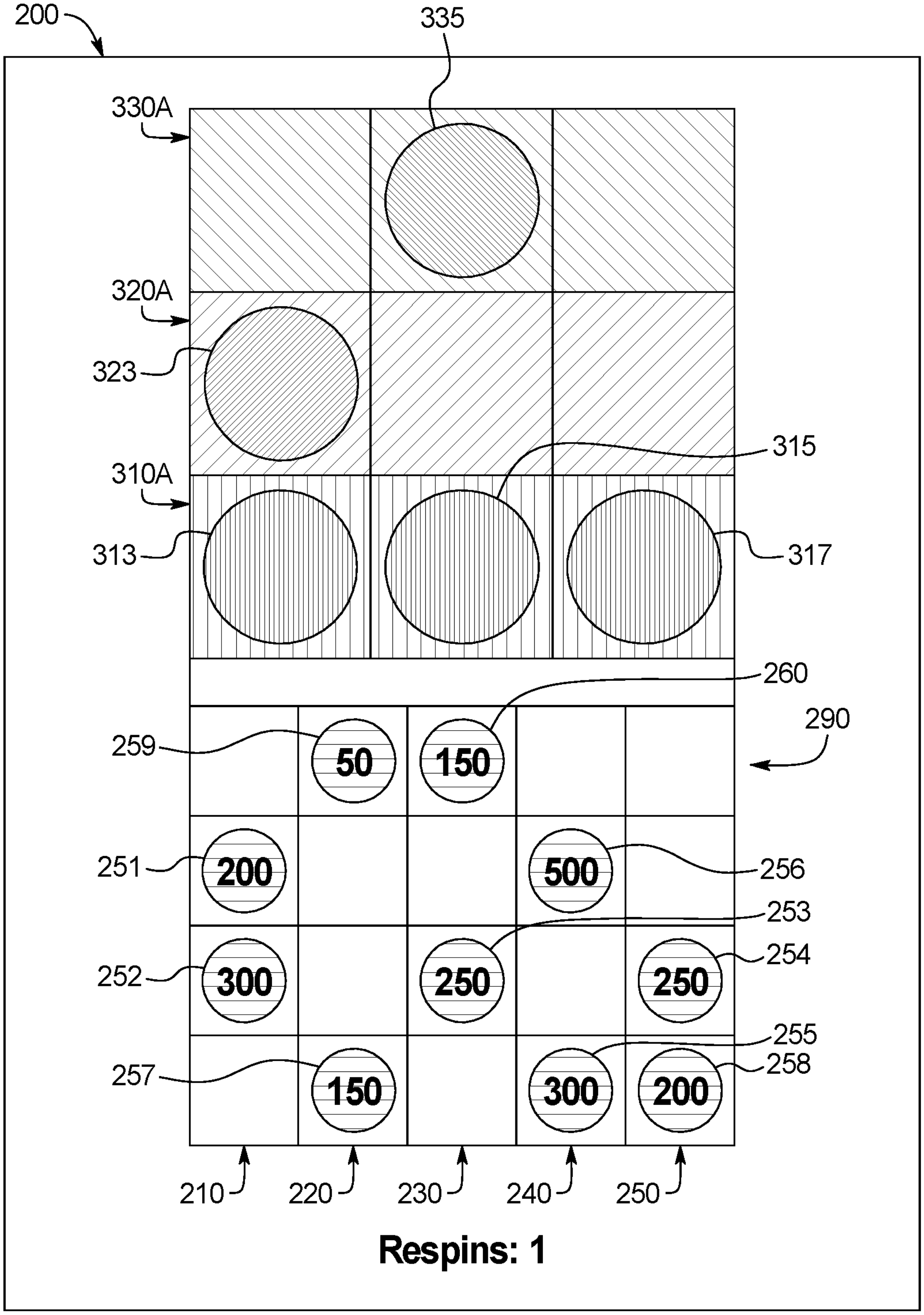
Figure 3X:
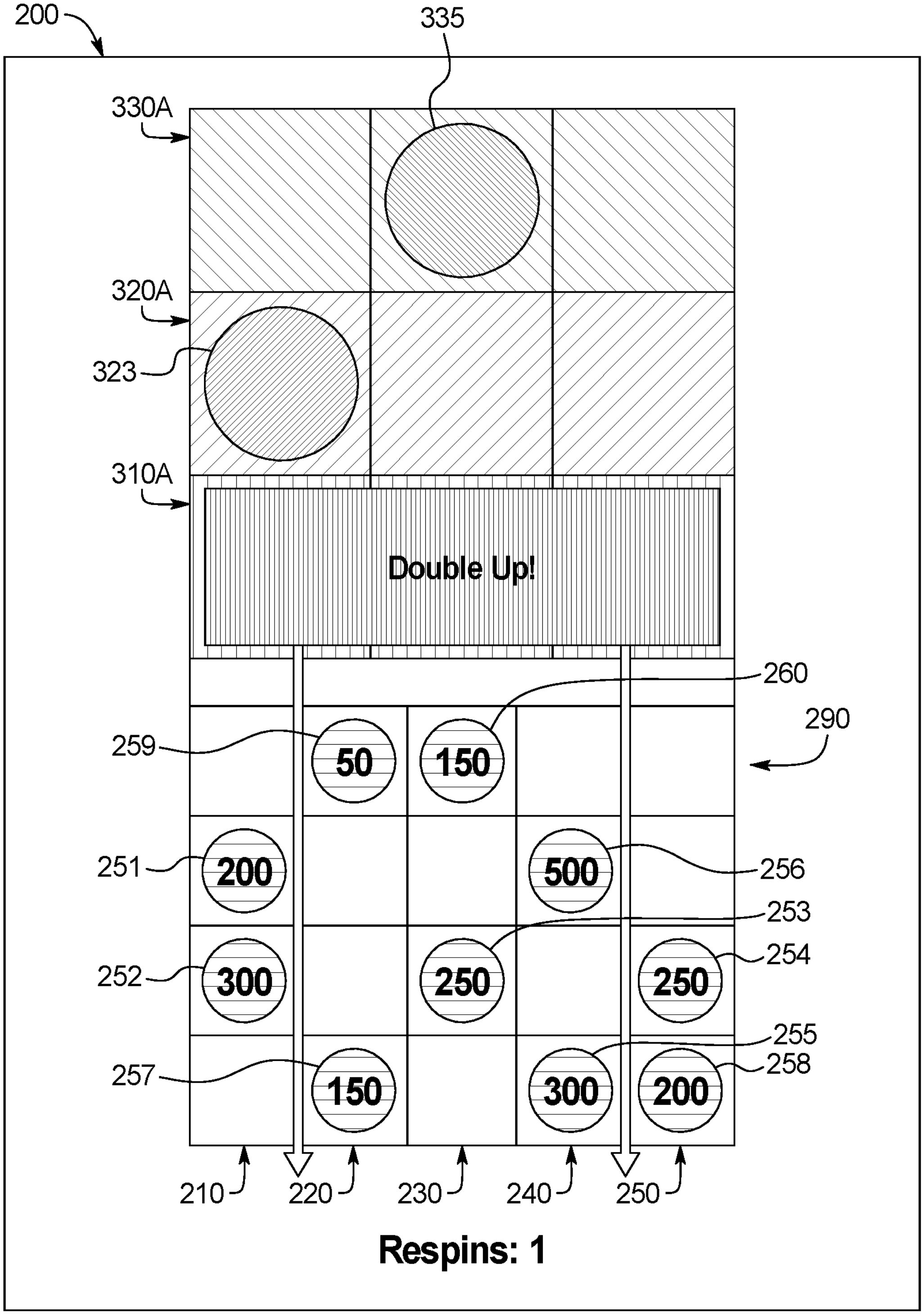
Figure 3Y:
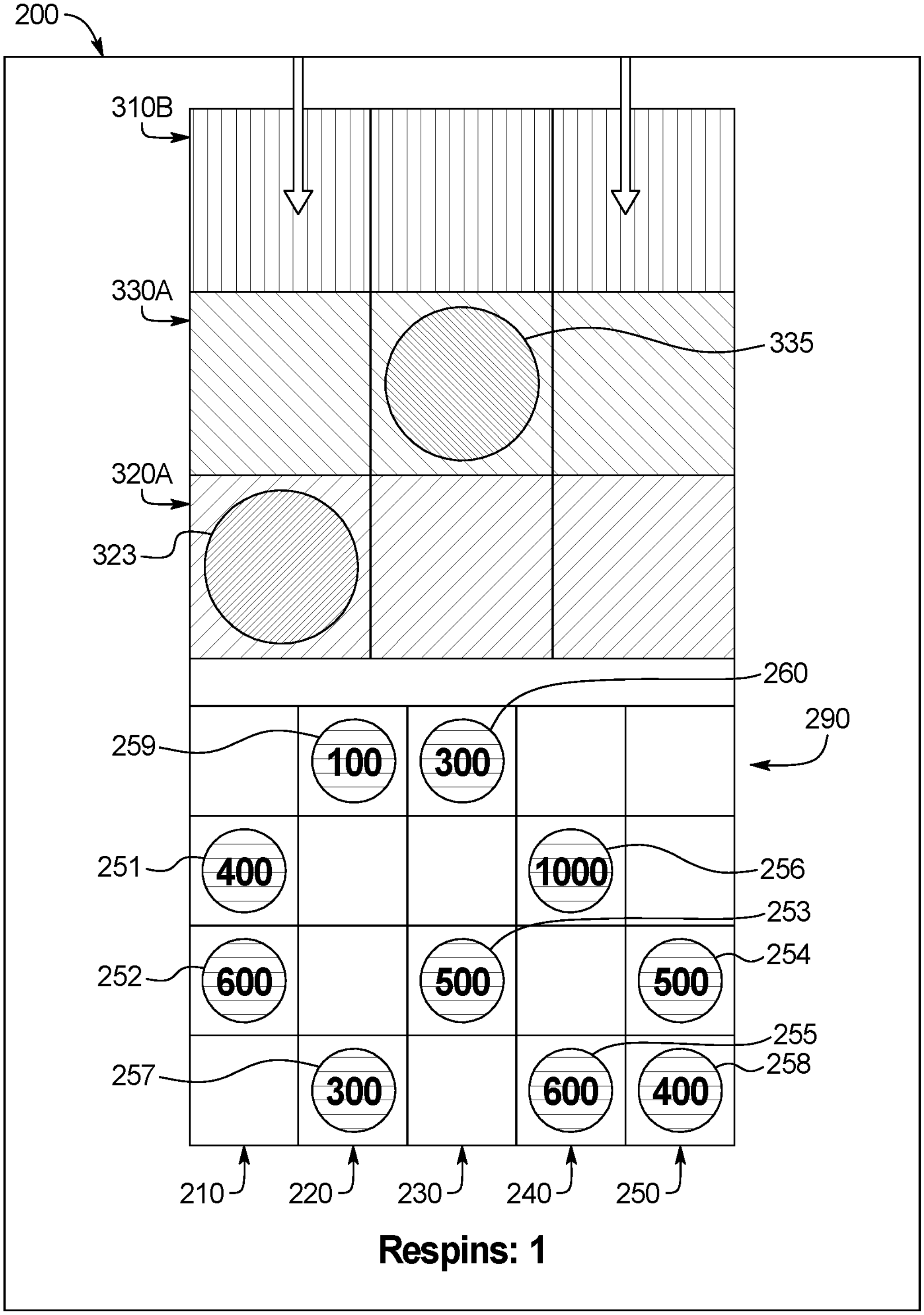
Figure 3Z:
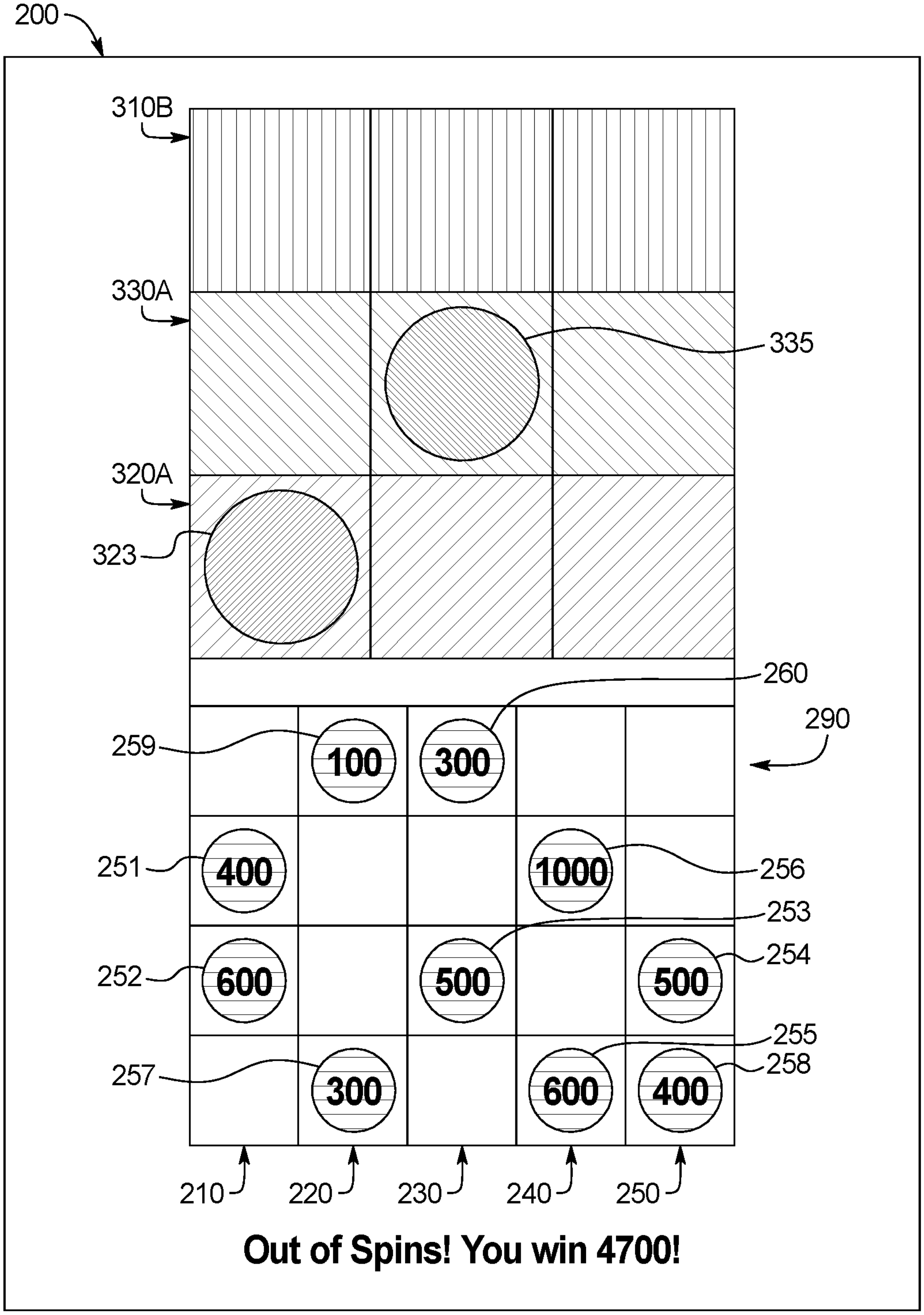
Figure 3A:
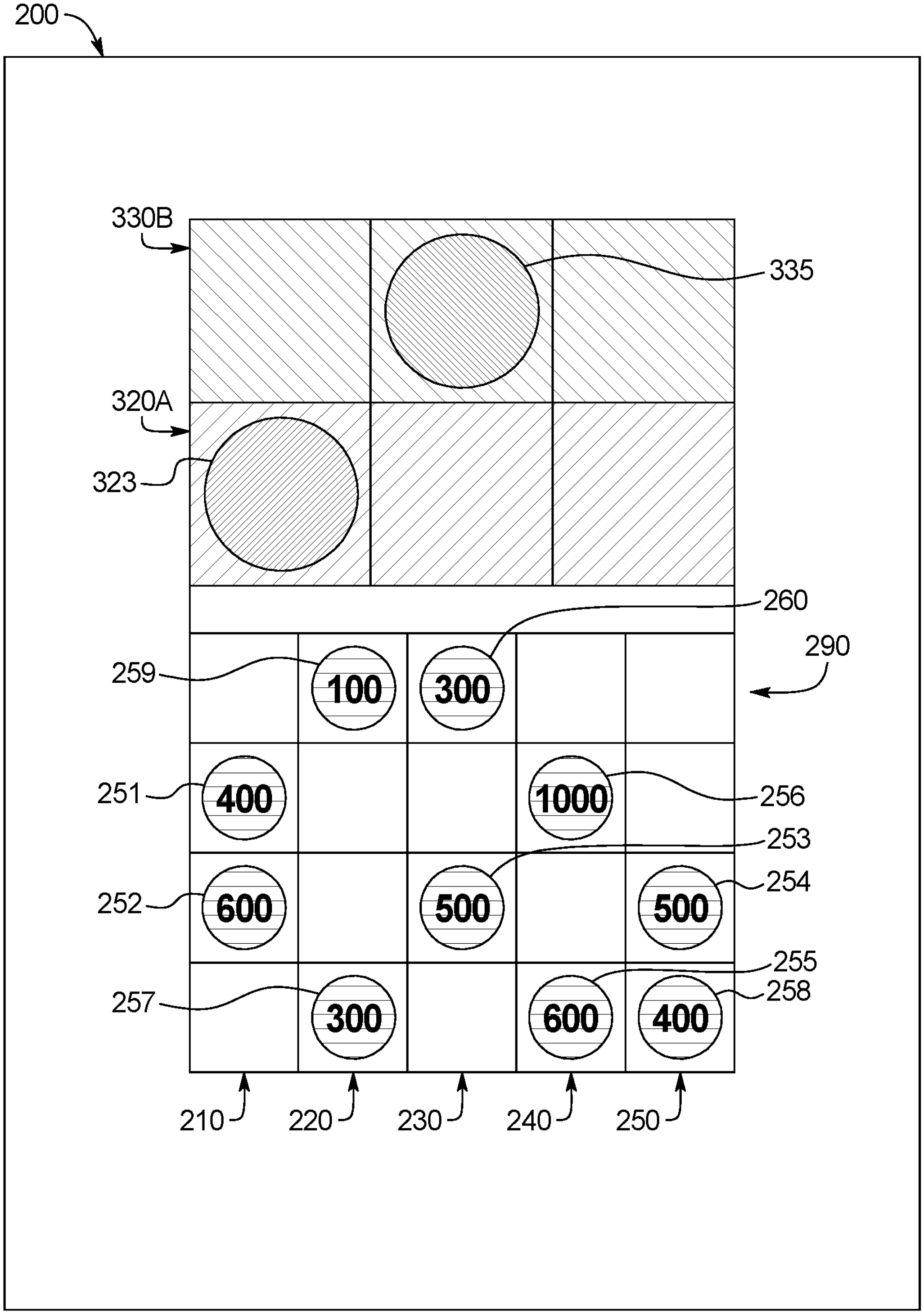
Figure 3B:
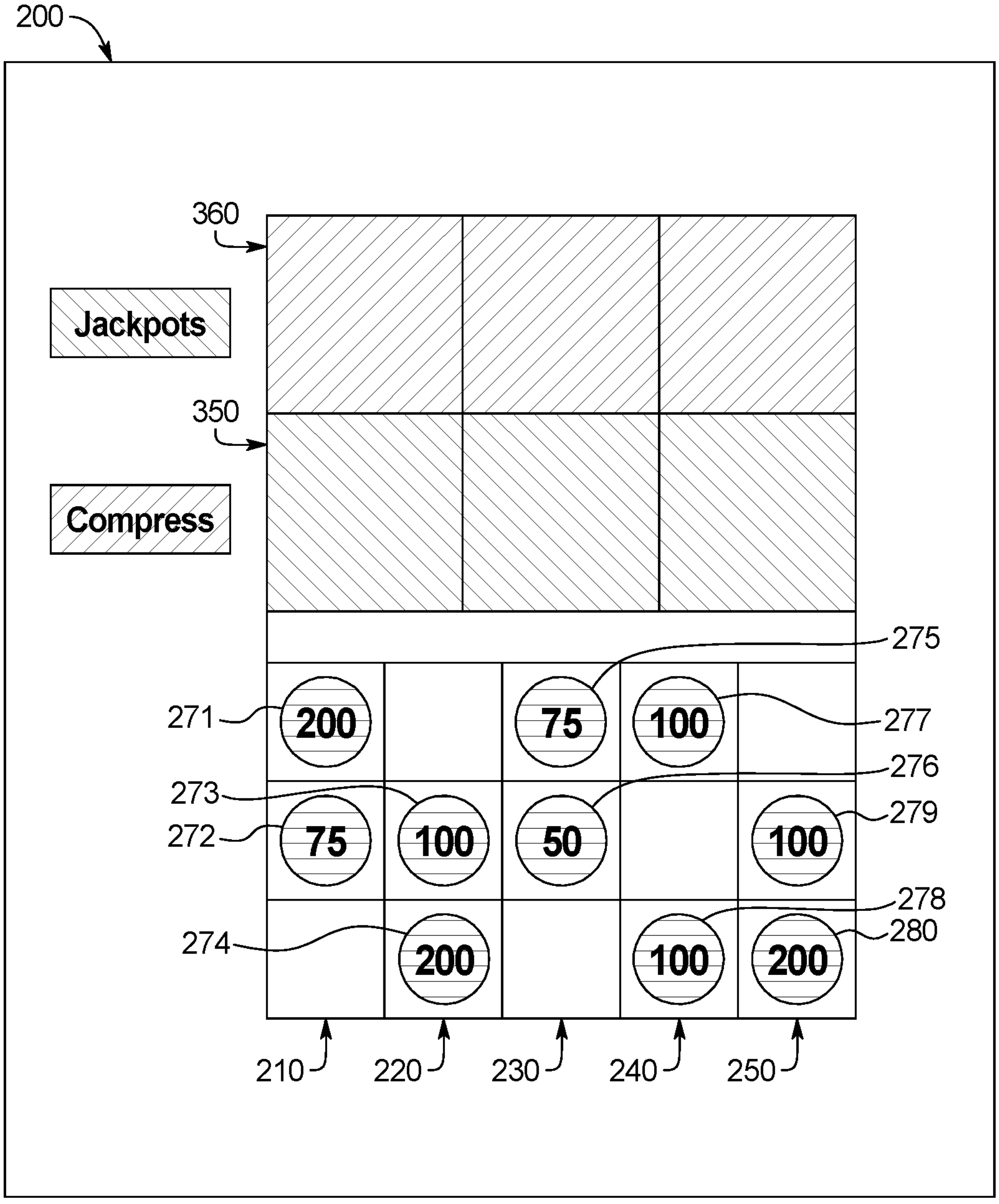
Figure 3C:
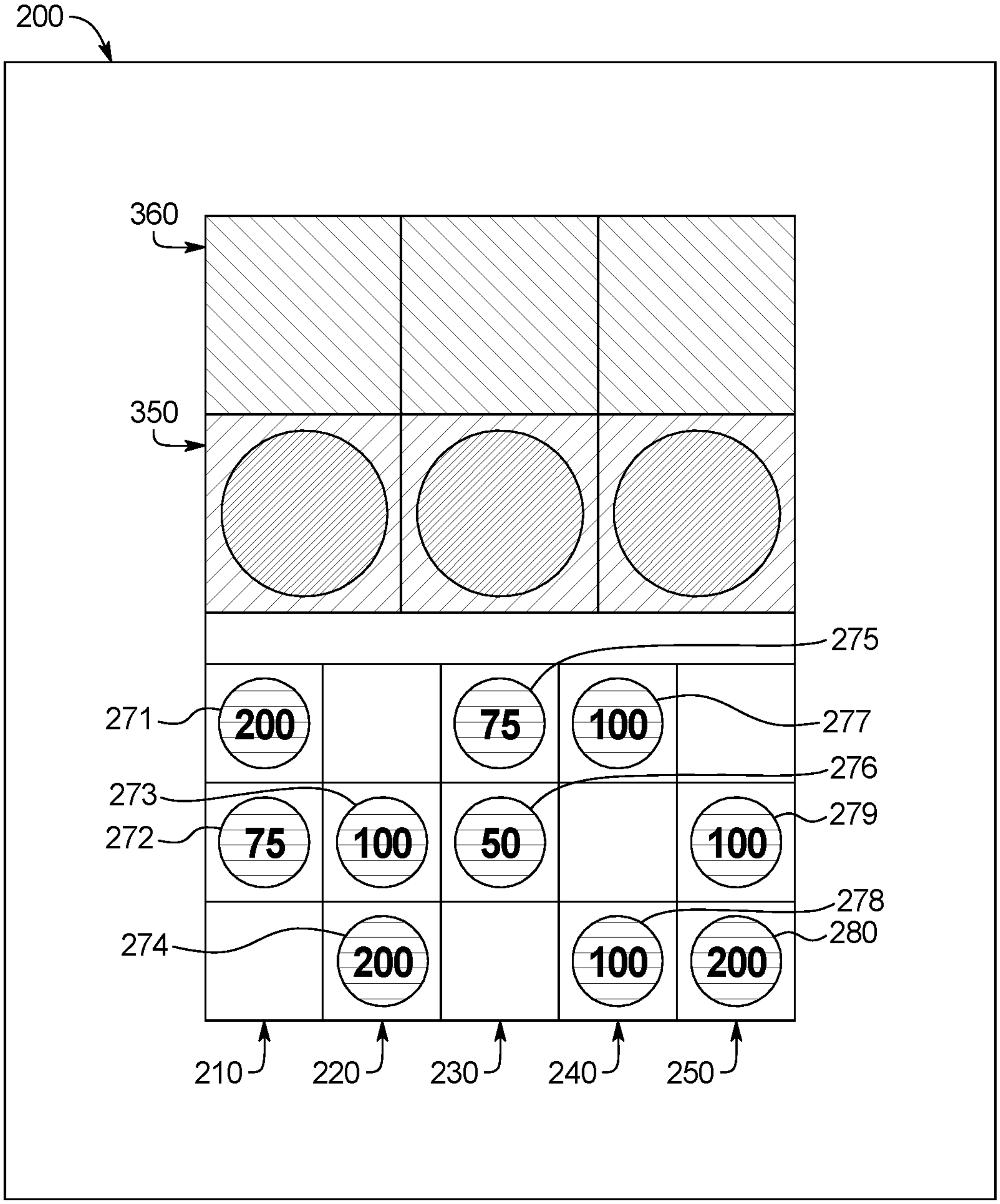
Figure 3D:
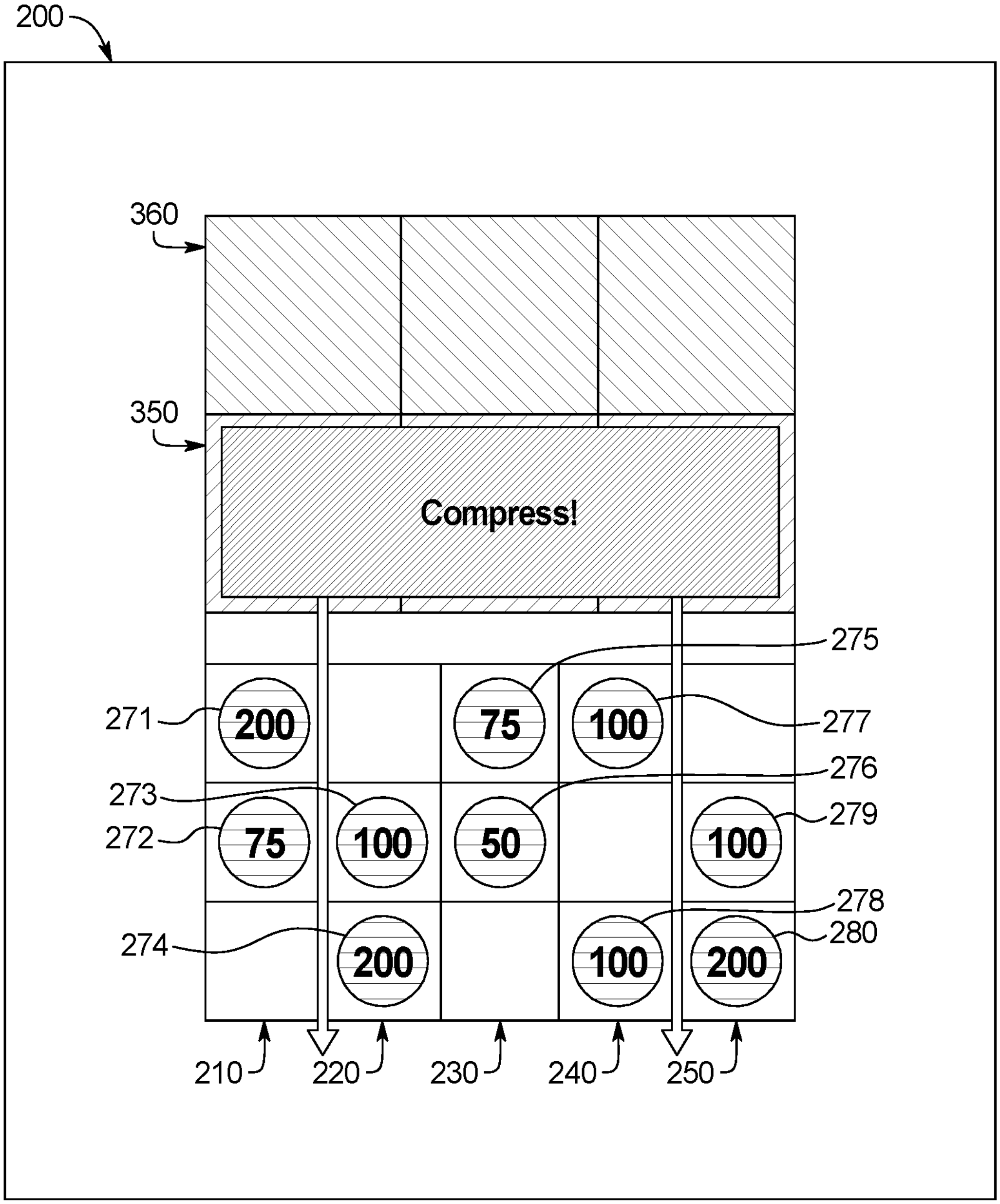
Figure 3E:
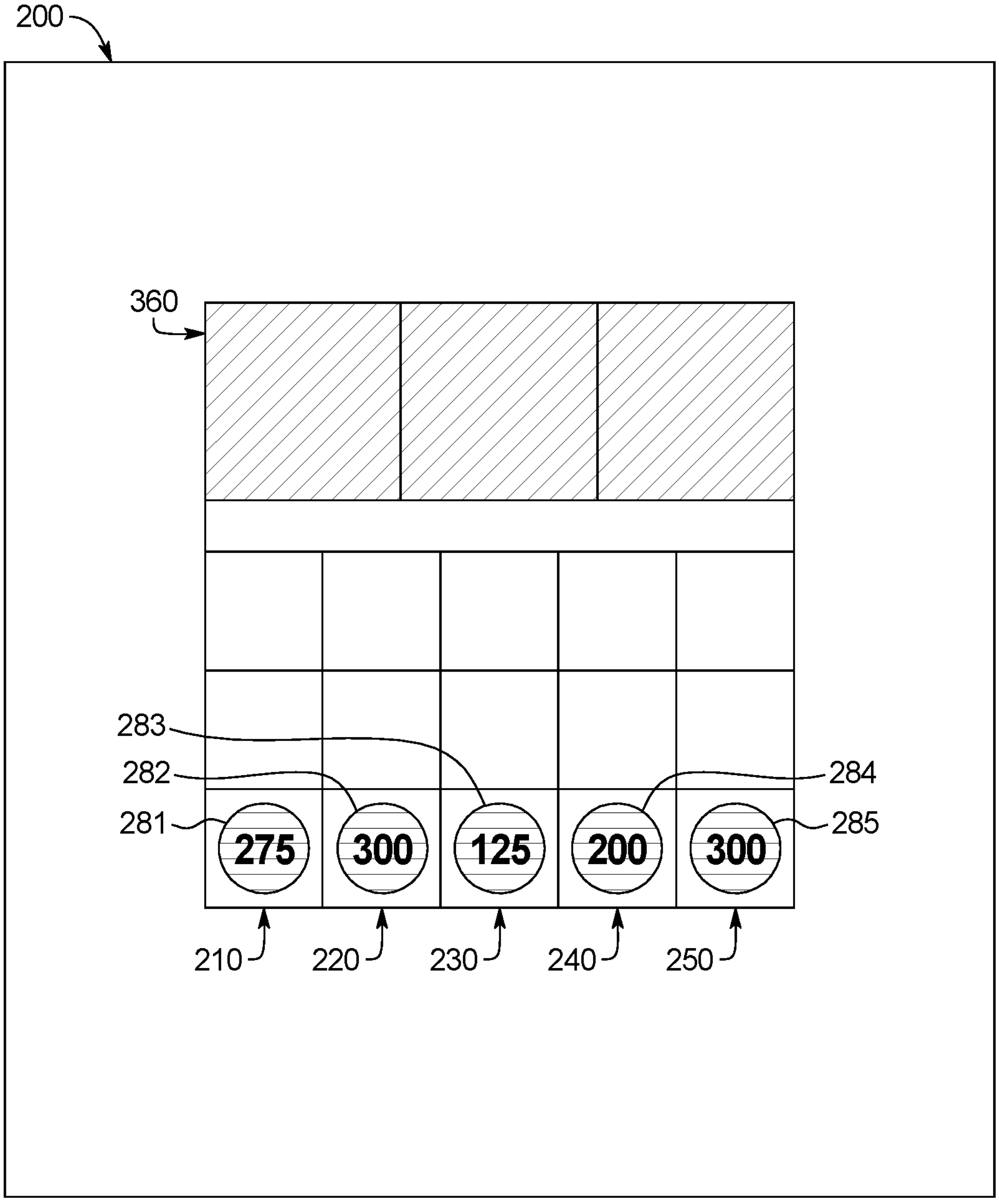
Figure 3F:
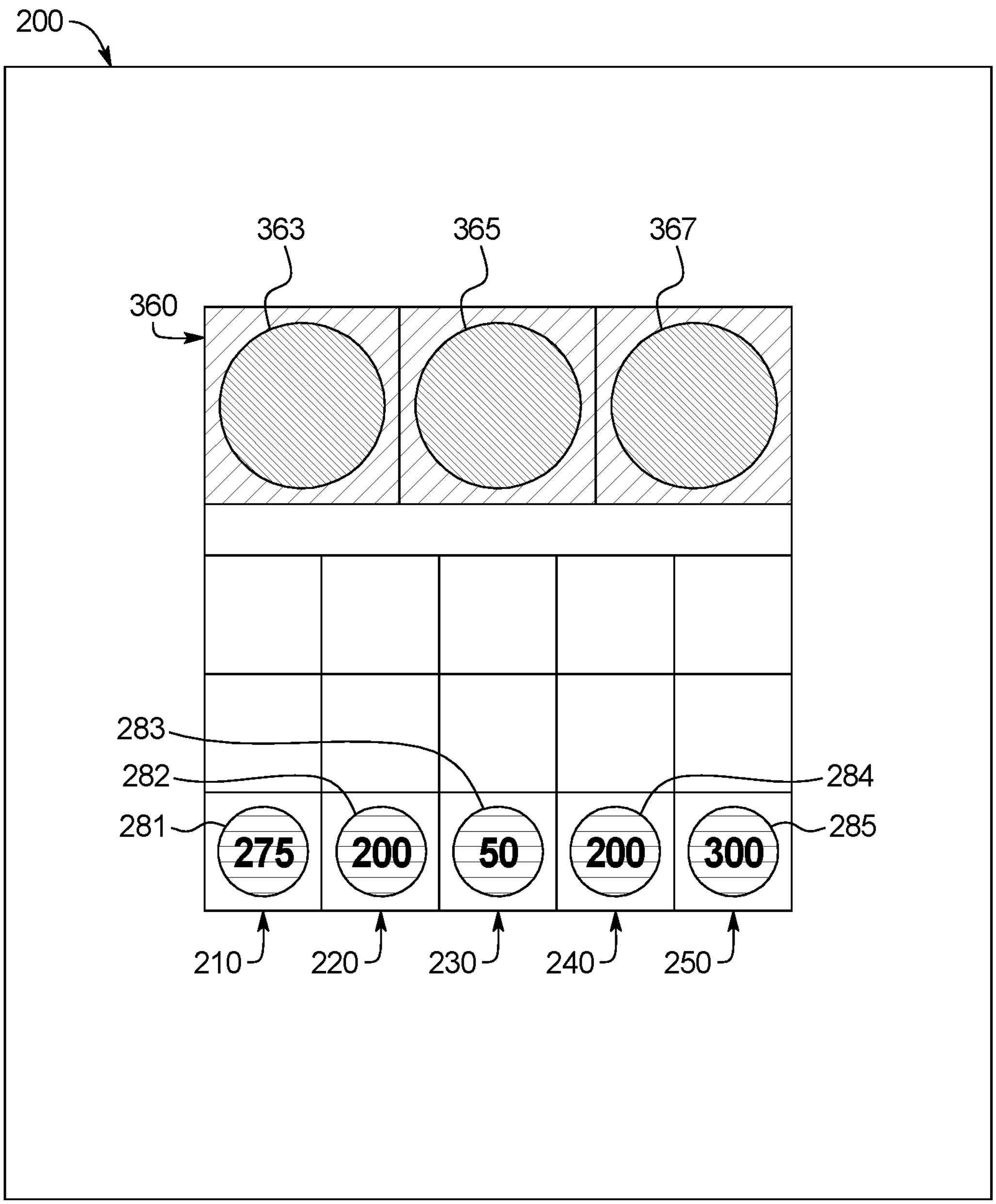
Figure 3G:
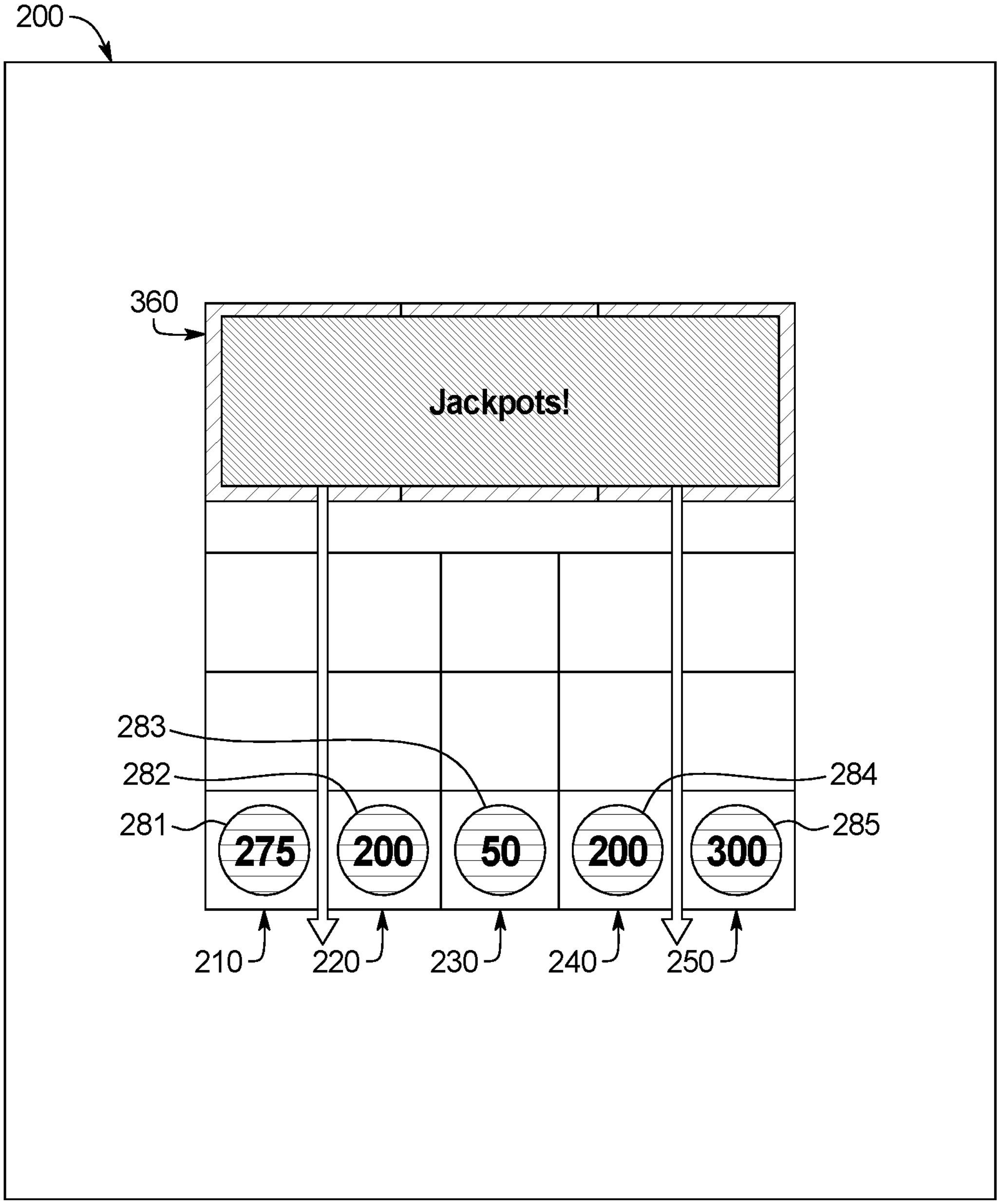
Figure 3H:
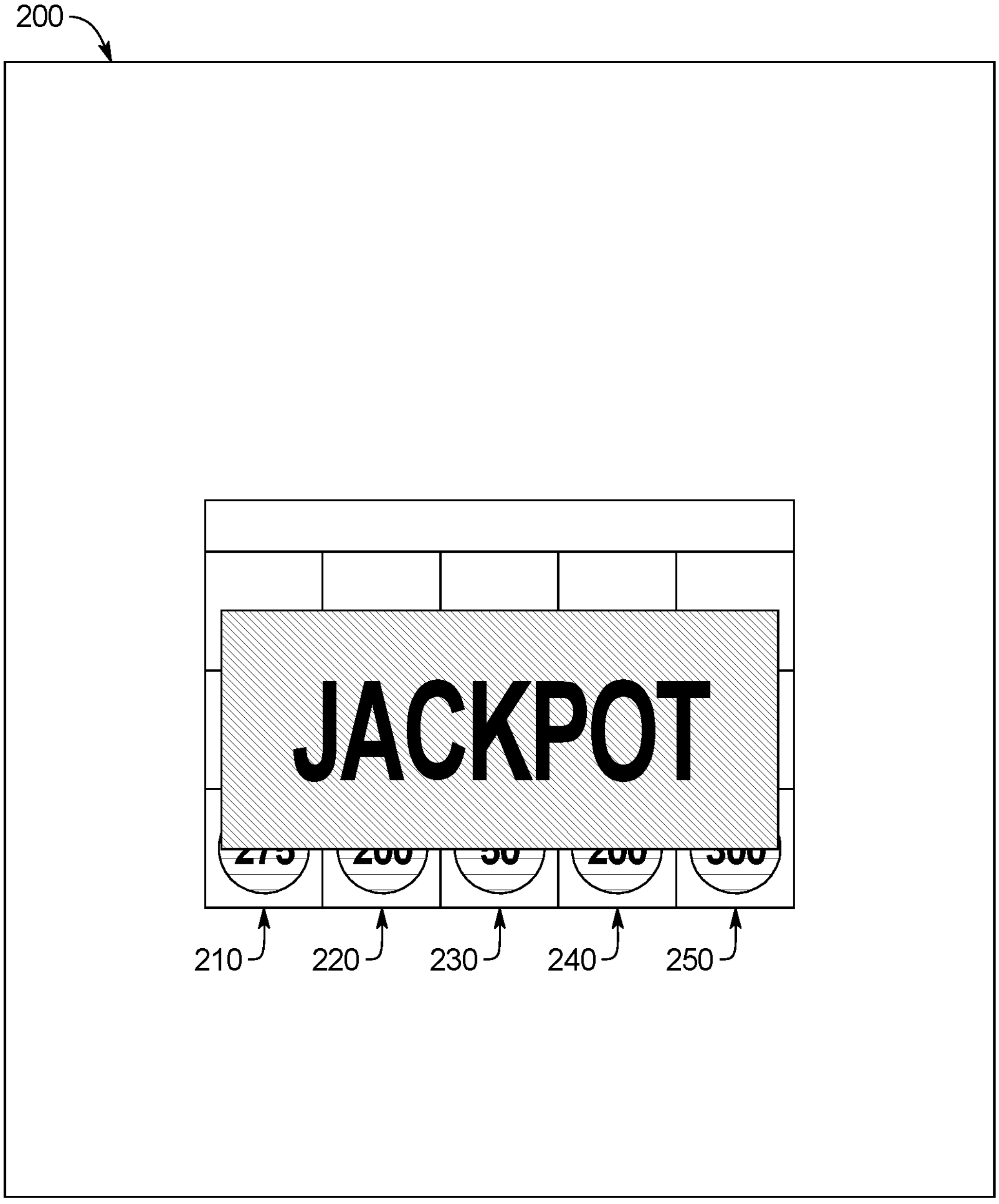
Figure 3I:
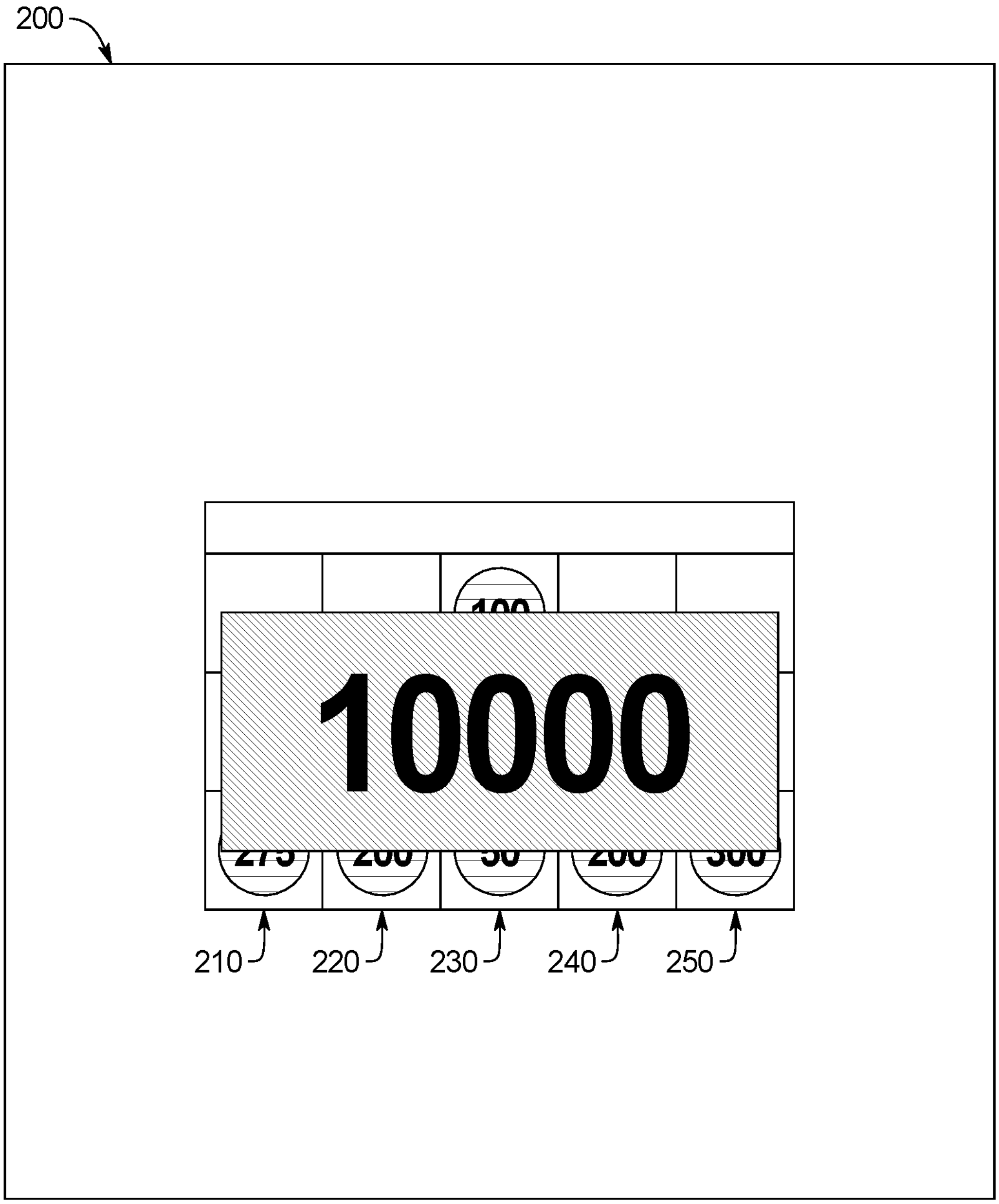
Figure 3J:
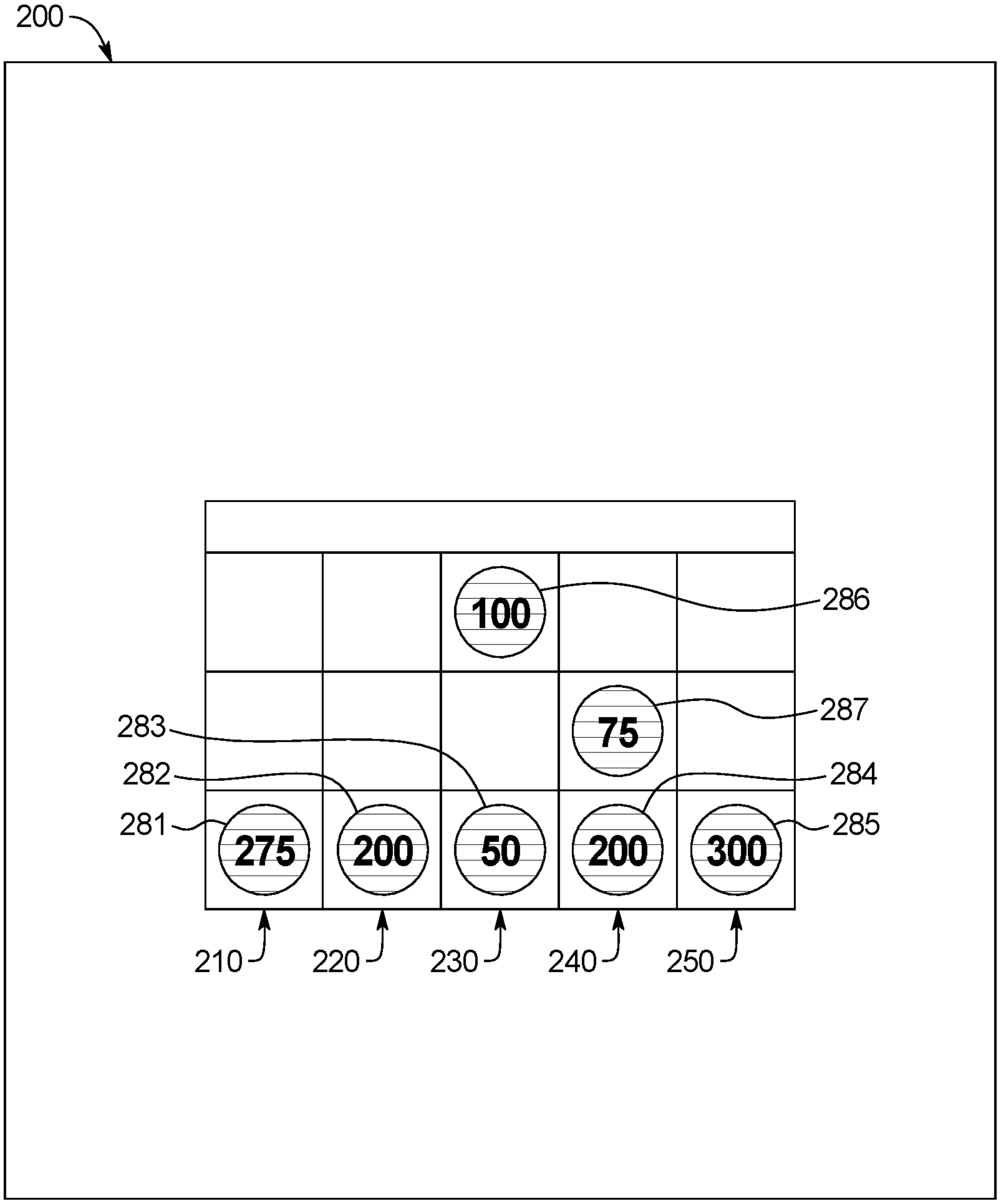

Turning back to the Figures, FIGS. 3A to 3Z illustrate screen shots of various points during example plays of a primary wagering game and a symbol accumulation sequence triggered by one of the plays of the primary wagering game in accordance with another example embodiment of the present disclosure.

FIGS. 3A, 3B, 3C, 3D, and 3E first illustrate screen shots of various points during example plays of a primary wagering game of one example embodiment of the present disclosure on a gaming system such as an EGM. In this example, the EGM displays via display device 200 (such as a display device of an EGM described below), a plurality of adjacently arranged video reels configured to display a plurality of symbols (on those video reels) that are randomly determined by the process of the EGM and that are displayed by the EGM at a plurality of symbol display positions respectively associated with the plurality of reels. More specifically, this example embodiment includes: (a) reel 210, reel 220, reel 230, reel 240, and reel 250; and (b) respective symbol display positions (not labeled) associated with each of the reels 210, 220, 230, 240, and 250. In this example, each of the reels includes a plurality of different symbols and those symbols include different base symbols and different symbol accumulation sequence triggering symbols such as: (1) award symbols such as award symbols 251, 252, 253, and 254; and (2) enhancement feature triggering symbols such as enhancement feature triggering symbols 271, 272, 273, and 274.

This example embodiment also includes three additional independent reels 410, 420, and 430 and associated with respective symbol display positions (not labeled) adjacent to the reels 210, 220, 230, 240, and 250 (such as above the reels in this example embodiment). In this example primary wagering game, in each play of the primary wagering game, the additional independent reels 410, 420, and 430 are spun and stopped. If a quantity such as three activator symbols (such as example activator symbols 411, 421, and 431) are displayed on the reels 410, 420, and 430 at the symbol display positions associated with the reels 410, 420, and 430, the EGM provides one or more additional features based on the symbol accumulation sequence triggering symbols displayed on the reels 210, 220, 230, 240, and 250 at the respective associated symbol display positions for that play of the primary wagering game.

In one such example embodiment, if there are only one or more award symbols appearing on the reels 210, 220, 230, 240, and 250 and displayed at the symbol display positions associated with those reels 210, 220, 230, 240, and 250 in that play of the primary wagering game (i.e., there are no displayed enhancement feature triggering symbols), the EGM provides the player all of the awards associated with those displayed award symbols.

In one such example embodiment, if there are any enhancement feature triggering symbols appearing on the reels 210, 220, 230, 240, and 250 and displayed at the symbol display positions associated with those reels 210, 220, 230, 240, and 250 in that play of the primary wagering game, the EGM triggers the symbol accumulation sequence, and for each enhancement feature triggering symbol, includes the respective enhancement feature for that symbol accumulation sequence. The EGM uses and accumulates any award symbols displayed on the reels 210, 220, 230, 240, and 250 at any of the symbol display positions in the symbol accumulation sequence.

Thus, in various embodiments, this enhancement feature provides: (1) an additional mechanism to generate awards; (2) an additional mechanism for triggering the symbol accumulation sequence (without requiring the predetermined quantity of symbol accumulation sequence triggering symbols); and (3) an additional way to trigger one or more of the different enhancement features.

In this example embodiment, the EGM can also cause the display device 200 to display various other information such as but not limited to: (1) a credit meter (not shown) that displays the player's credit balance; (2) a wager display (not shown) that displays any wagers placed on any plays of the primary wagering game; (3) a win display (not shown) that displays any awards won for each play of the primary wagering game (and any plays of secondary games or the symbol accumulation sequence); and (4) a message display (not shown) configured to display messages to the player. The EGM can indicate the player's credit balance, the player's wager, and any awards available to be won or provided to the player in the form of amounts of credits. It should be appreciated that such indications can alternatively or additionally be made in the form of amounts of currency, points, or the like.

For the point of the play of the primary wagering game shown in FIG. 3A, the EGM has received a monetary amount from the player and established a credit balance. For the example of FIG. 3A, the EGM has also received a player input for the play of the primary wagering game and an associated wager of credits from the player for that play of the primary wagering game. For the example of FIG. 3A, responsive to this input and this wager (that function as an occurrence of a game triggering event in this example), the EGM has triggered the play of the primary wagering game. For the example of FIG. 3A, for this play of the primary wagering game, the EGM has also: (1) randomly determined a plurality of symbols (not labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined base symbols at the symbol display positions associated with those reels 210, 220, 230, 240, and 250. For this play of the primary wagering game, the EGM has also: (1) randomly determined any symbols of each of the reels 410, 420, and 430 to display at the respective symbol display positions associated with those reels; and (2) caused each of the reels 410, 420, and 430 to spin and to stop spinning to display those randomly determined symbols at the symbol display positions associated with those reels 410, 420, and 430. FIG. 3A displays the play of the primary wagering game after this has occurred. At this point, the EGM evaluates the symbols displayed at the symbol display positions associated with each of the reels 210, 220, 230, 240, and 250 and on reels 410, 420, and 430.

In this example, EGM displays no symbol accumulation sequence triggering symbols on the reels 210, 220, 230, 240, and 250 and no activator symbols on the reels 410, 420, and 430. In this example, since no activator symbols have occurred at the symbol display positions associated with those reels 410, 420, and 430, the symbol accumulation sequence has not been triggered from this play of the primary wagering game. Thus, the EGM does not provide any accumulation sequence or any enhancement features for this play.

In various embodiments, the EGM can also enable the required quantity (such as of six) symbol accumulation sequence triggering symbols to trigger the symbol accumulation sequence. In this example, since that has also not occurred, the symbol accumulation sequence has not been triggered from this play of the primary wagering game. Thus, the EGM does not provide any accumulation sequence or any enhancement features for this play.

For the point of another play of the primary wagering game shown in FIG. 3B, the EGM has received a player input for the next play of the primary wagering game and an associated wager of credits from the player for that play of the primary wagering game. For the example of FIG. 3B, responsive to this input and this wager (that function as an occurrence of a game triggering event in this example), the EGM has triggered this next play of the primary wagering game. For the example of FIG. 3B, for this play of the primary wagering game, the EGM has also: (1) randomly determined a plurality of symbols (not labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined symbols at the symbol display positions associated with those reels 210, 220, 230, 240, and 250. For this play of the primary wagering game, the EGM has also: (1) randomly determined any symbols of each of the reels 410, 420, and 430 to display at the respective symbol display positions associated with those reels; and (2) caused each of the reels 410, 420, and 430 to spin and to stop spinning to display those randomly determined symbols at the symbol display positions associated with those reels 410, 420, and 430. FIG. 3B displays the play of the primary wagering game after this has occurred. At this point, the EGM evaluates the symbols displayed at the symbol display positions associated with each of the reels 210, 220, 230, 240, and 250 and on reels 410, 420, and 430.

In this example, the EGM displays a plurality of base symbols (not labeled) and two award symbols 251 and 254 on the reels 210, 220, 230, 240, and 250, and one activator symbol on the reels 410, 420, and 430. In this example, since the required quantity of activator symbols needed to trigger the symbol accumulation sequence has not occurred, the symbol accumulation sequence has not been triggered from this play of the primary wagering game. Thus, the EGM does not provide any accumulation sequence or any enhancement features for this play.

For the point of another play of the primary wagering game shown in FIG. 3C, the EGM has received a player input for the next play of the primary wagering game and an associated wager of credits from the player for that play of the primary wagering game. For the example of FIG. 3C, responsive to this input and this wager (that function as an occurrence of a game triggering event in this example), the EGM has triggered this next play of the primary wagering game. For the example of FIG. 3C, for this play of the primary wagering game, the EGM has also: (1) randomly determined a plurality of symbols (not all labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined symbols at the symbol display positions associated with those reels 210, 220, 230, 240, and 250. For this play of the primary wagering game, the EGM has also: (1) randomly determined any symbols of each of the reels 410, 420, and 430 to display at the respective symbol display positions associated with those reels; and (2) caused each of the reels 410, 420, and 430 to spin and to stop spinning to display those randomly determined symbols at the symbol display positions associated with those reels 410, 420, and 430. FIG. 3C displays the play of the primary wagering game after this has occurred. At this point, the EGM evaluates the symbols displayed at the symbol display positions associated with each of the reels 210, 220, 230, 240, and 250 and on reels 410, 420, and 430.

In this example, EGM displays a plurality of base symbols (not labeled) and two award symbol 252 and 253 on the reels 210, 220, 230, 240, and 250, and three activator symbols 411, 421, and 431 on the reels 410, 420, and 430. In this example, since the three activator symbols 411, 421, and 431 have occurred but no enhancement feature triggering symbols have occurred, the symbol accumulation sequence has not been triggered from this play of the primary wagering game. Thus, the EGM does not provide any accumulation sequence. Since the three activator symbols 411, 421, and 431 occurred on the reels 411, 421, and 431, the EGM displays and provides the player an award of 175 credits based on the values displayed on the award symbols 252 and 253. The EGM thus provides this enhancement feature based on the occurrence of the three activator symbols 411, 421, and 431.

For the point of another play of the primary wagering game shown in FIG. 3D, the EGM has received a player input for the next play of the primary wagering game and an associated wager of credits from the player for that play of the primary wagering game. For the example of FIG. 3D, responsive to this input and this wager (that function as an occurrence of a game triggering event in this example), the EGM has triggered this next play of the primary wagering game. For the example of FIG. 3D, for this play of the primary wagering game, the EGM has also: (1) randomly determined a plurality of symbols (not all labeled) of each of the reels 210, 220, 230, 240, and 250 to display at the respective symbol display positions associated with those reels; and (2) caused each of the reels 210, 220, 230, 240, and 250 to spin and to stop spinning to display those randomly determined symbols at the symbol display positions associated with those reels 210, 220, 230, 240, and 250. For this play of the primary wagering game, the EGM has also: (1) randomly determined any symbols of each of the reels 410, 420, and 430 to display at the respective symbol display positions associated with those reels; and (2) caused each of the reels 410, 420, and 430 to spin and to stop spinning to display those randomly determined symbols at the symbol display positions associated with those reels 410, 420, and 430. FIG. 3D displays the play of the primary wagering game after this has occurred. At this point, the EGM evaluates the symbols displayed at the symbol display positions associated with each of the reels 210, 220, 230, 240, and 250 and on reels 410, 420, and 430.

In this example, the EGM displays a plurality of base symbols (not labeled), two award symbol 252 and 253, and three enhancement feature triggering symbols 271, 272, and 273 on the reels 210, 220, 230, 240, and 250, and three activator symbols 411, 421, and 431. In this example, since the three enhancement feature triggering symbols 271, 272, and 273 and the three activator symbols 411, 421, and 431 occurred, the EGM triggers the symbol accumulation sequence from this play of the primary wagering game (even though only two award symbols occurred and even though less than six symbol accumulation sequence triggering symbols occurred). The EGM provides the accumulation sequence with three enhancement features. In this example, each of the enhancement feature triggering symbols 271, 272, and 273 is a multi-function sequence triggering symbol for the sequence that functions as a trigger for one of the bonus features. As with the above described embodiment, the enhancement feature triggering symbols 271, 272, and 273 can each be a dedicated enhancement feature triggering symbol or a non-dedicated enhancement feature triggering symbol. As described above, a dedicated enhancement feature triggering symbol has a dedicated enhancement feature associated with it, and a non-dedicated enhancement feature triggering symbol does not have a single enhancement feature specifically associated with it, but rather has a plurality of different enhancement features associated with it, and when it occurs, the EGM randomly determines which of those different enhancement feature it triggers.

FIG. 3E shows the enhancement feature triggering symbols 271, 272, and 273 being a non-dedicated enhancement feature triggering symbols, and the EGM randomly determines the enhancement feature associated with each such symbol.

In this example, the EGM randomly determines that: (1) the enhancement feature triggering symbol 271 triggers the double-up enhancement feature for the symbol accumulation sequence; (2) the enhancement feature triggering symbol 272 triggers the extra-row enhancement feature for the symbol accumulation sequence; and (3) the enhancement feature triggering symbol 273 triggers the boost enhancement feature for the symbol accumulation sequence (indicated by the cross-hatching that corresponds to the cross-hatching of the optionally displayed enhancement feature indicators 290, 291, and 292). It should be appreciated that the other enhancement features triggerable by the enhancement feature triggering symbols can include, for example: (a) a compression enhancement feature for the trigger symbol accumulation sequence; (b) a jackpot enhancement feature for the trigger symbol accumulation sequence; (c) an extra activation enhancement feature for the trigger symbol accumulation sequence; and (d) a collect enhancement feature for the trigger symbol accumulation sequence.

FIGS. 3F to 3Z illustrate screen shots of various points during the example symbol accumulation sequence triggered from the third play of the primary wagering game as described above. In this example, the EGM displays via display device 200, the plurality of adjacently arranged video reels configured to display award symbols at the plurality of symbol display positions respectively associated with the plurality of reels 210, 220, 230, 240, and 250. For the symbol accumulation sequence, in this example, each of the reels includes a plurality of different award symbols. In various embodiments, one or more of the reels can also include one or more additional enhancement feature triggering symbols that can trigger further enhancement features for the symbol accumulation sequence.

FIG. 3F shows the plurality of reels 210, 220, 230, 240, and 250 for the symbol accumulation sequence before the first activation of the reels 210, 220, 230, 240, and 250 for the symbol accumulation sequence. FIG. 3F shows that the two award symbols 252 and 253 have been accumulated and thus remain at the respective symbol display positions for the symbol accumulation sequence. FIG. 3F shows the enhancement feature triggering symbols 271, 272, and 273 have been removed because they are not award symbols for the symbol accumulation sequence. FIG. 3F shows the initial quantity of activations (labeled "Respins" in this example) are set at 3 for the symbol accumulation sequence. FIG. 3F shows the secondary symbol accumulation enhancement feature for each of the enhancement features randomly determined based on the enhancement feature triggering symbols 271, 272, and 273 for the symbol accumulation sequence. Specifically, FIG. 3F shows: (1) a double-up symbol collection area 310 for the symbol accumulation sequence; (2) an extra-row symbol collection area 320 for the symbol accumulation sequence; and (3) a boost symbol collection area 330 for the symbol accumulation sequence. FIG. 3F also shows that each such symbol collection area is associated with three independent secondary reels that can generate the respective symbols. Specifically, the double-up symbol collection area 310 is associated with three secondary reels 312, 314, and 316, the extra-row symbol collection area 320 is associated with three secondary reels 322, 324, and 326, and the boost symbol collection area 330 is associated with three secondary reels 332, 334, and 336 (which are only labeled in FIG. 3F in this example). FIG. 3F shows: (1) the double-up symbol collection area 310 and that no double-up symbols have been accumulated in that collection area 310; (2) the extra-row symbol collection area 320 and that no extra-row symbols have been accumulated in that collection area 320; and (3) the boost symbol collection area 330 and that no boost symbols have been accumulated in that collection area 330. FIG. 3F shows that: (1) the double-up symbol collection area 310 is closest to the reels 210, 220, 230, 240, and 250; (2) the extra-row symbol collection area 320 is next closest to the reels 210, 220, 230, 240, and 250; and (3) the boost symbol collection area 330 is next closest to the reels 210, 220, 230, 240, and 250. FIG. 3F shows that for each of the double-up enhancement feature, the extra-row enhancement feature, and the boost enhancement feature, a quantity (such as three) respective triggering symbols must be collected for the EGM to apply that enhancement feature. These quantities can vary and can but do not need to be the same in accordance with the present disclosure.

FIG. 3G shows the plurality of reels 210, 220, 230, 240, and 250 for the symbol accumulation sequence for a first activation of the reels for the symbol accumulation sequence. FIG. 3G shows the additional award symbols 251 and 254 occurred on reels 210 and 250 and the EGM accumulates these additional award symbols for the symbol accumulation sequence. FIG. 3G shows the quantity of activations reset to 3 for the symbol accumulation sequence because these additional award symbols have been accumulated in this activation of the reels. FIG. 3G shows that the double-up symbol 313 has occurred on the secondary reel 312 and has been accumulated in the double-up symbol collection area 310, and the boost symbol 337 has occurred on the secondary reel 336 and been accumulated in the boost symbol collection area 330. FIG. 3G thus shows at this point in the symbol accumulation sequence that: (1) one double-up symbol has been accumulated in the double-up symbol collection area 310; (2) zero extra-row symbols have been accumulated in the extra-row symbol collection area 320; and (3) one boost symbol has been accumulated in the boost symbol collection area 330.

FIG. 3H shows the plurality of reels 210, 220, 230, 240, and 250 for the symbol accumulation sequence for a second activation of the reels for the symbol accumulation sequence. FIG. 3H shows no additional award symbols occurred on reels for the symbol accumulation sequence. FIG. 3H shows the quantity of activations as 2 for the symbol accumulation sequence. FIG. 3H shows that the double-up symbol 317 has occurred on the third secondary reel and has been accumulated in the double-up symbol collection area 310. FIG. 3H thus shows at this point in the symbol accumulation sequence that: (1) two double-up symbols have been accumulated in the double-up symbol collection area 310; (2) zero extra-row symbols have been accumulated in the extra-row symbol collection area 320; and (3) one boost symbol has been accumulated in the boost symbol collection area 330.

FIG. 3I shows the plurality of reels 210, 220, 230, 240, and 250 for the symbol accumulation sequence for a third activation of the reels for the symbol accumulation sequence. FIG. 3I shows that the additional award symbol 255 occurred on reel 240 and the EGM accumulates this additional award symbol for the symbol accumulation sequence. FIG. 3I shows the quantity of activations reset to 3 for the symbol accumulation sequence because this additional award symbol has been accumulated in this activation of the reels. FIG. 3I shows that the extra-row symbol 325 has occurred on the secondary reel 324 and has been accumulated in the extra-row symbol collection area 320. FIG. 3I shows that the boost symbol 335 has occurred on the secondary reel 334 and has been accumulated in the boost symbol collection area 330. FIG. 3I thus shows at this point in the symbol accumulation sequence that: (1) two double-up symbols have been accumulated in the double-up symbol collection area 310; (2) one extra-row symbol has been accumulated in the extra-row symbol collection area 320; and (3) two boost symbols have been accumulated in the boost symbol collection area 330.

FIG. 3J shows the plurality of reels 210, 220, 230, 240, and 250 for the symbol accumulation sequence for a fourth activation of the reels for the symbol accumulation sequence. FIG. 3J shows that the additional award symbol 256 occurred on reel 240 and the EGM accumulates this additional award symbol for the symbol accumulation sequence. FIG. 3J shows the quantity of activations reset to 3 for the symbol accumulation sequence because this additional award symbol has been accumulated in this activation of the reels. FIG. 3J shows that the double-up symbol 315 has occurred on the secondary reel 314 and has been accumulated in the double-up symbol collection area 310. FIG. 3J thus shows at this point in the symbol accumulation sequence that: (1) three double-up symbols have been accumulated in the double-up symbol collection area 310; (2) one extra-row symbol has been accumulated in the extra-row symbol collection area 320; and (3) two boost symbols have been accumulated in the boost symbol collection area 330.

FIGS. 3K and 3L shows that since three double-up symbols have been accumulated in the double-up symbol collection area 310, the EGM now applies this double-up enhancement feature to the award symbols accumulated on the reels in the symbol accumulation sequence. Specifically, the EGM doubles the values of all of the award symbols accumulated on the reels in the symbol accumulation sequence. FIG. 3L also shows that since three double-up symbols have been accumulated in the double-up symbol collection area 310, the EGM now adds a new double-up symbol collection area 310A in the symbol accumulation sequence. FIG. 3K also shows that the extra-row symbol collection area 320 and the boost symbol collection area 330 have both moved downwardly toward the reels.

FIG. 3M shows the plurality of reels 210, 220, 230, 240, and 250 for the symbol accumulation sequence for a fifth activation of the reels for the symbol accumulation sequence. FIG. 3M shows no additional award symbols occurred on reels for the symbol accumulation sequence. FIG. 3M shows the quantity of activations as 2 for the symbol accumulation sequence. FIG. 3M shows that the boost symbol 333 has occurred on the secondary reel 332 of the boost symbol collection area and has been accumulated in the boost symbol collection area 330. FIG. 3M thus shows at this point in the symbol accumulation sequence that: (1) one extra-row symbol has been accumulated in the extra-row symbol collection area 320; (2) two boost symbols have been accumulated in the boost symbol collection area 330; and (3) zero double-up symbols have been accumulated in the double-up symbol collection area 310A.

FIG. 3N shows that even though three double-up symbols have been accumulated in the boost symbol collection area 320, the EGM does not yet and cannot apply this boost enhancement feature to the award symbols accumulated on the reels in the symbol accumulation sequence because the boost enhancement feature is blocked by the uncompleted extra-row symbol collection area 320.

FIG. 3O shows the plurality of reels 210, 220, 230, 240, and 250 for the symbol accumulation sequence for a sixth activation of the reels for the symbol accumulation sequence. FIG. 3O shows no additional award symbols occurred on reels for the symbol accumulation sequence. FIG. 3O shows the quantity of activations as 1 for the symbol accumulation sequence. FIG. 3O shows that the extra-row symbol 327 has occurred on the secondary reel 326 and has been accumulated in the extra-row symbol collection area 320. FIG. 3O also shows that the double-up symbol 313 has occurred on the secondary reel 332 and has been accumulated in the double-up symbol collection area 310A. FIG. 3O thus shows at this point in the symbol accumulation sequence that: (1) two extra-row symbols have been accumulated in the extra-row symbol collection area 320; (2) three boost symbols have been accumulated in the boost symbol collection area 330 and the boost enhancement is ready to apply but is blocked by the extra-row symbol collection area; and (3) one double-up symbol has been accumulated in the new double-up symbol collection area 310A.

FIG. 3P shows the plurality of reels 210, 220, 230, 240, and 250 for the symbol accumulation sequence for a seventh activation of the reels for the symbol accumulation sequence. FIG. 3P shows that two additional award symbol 257 and 258 occurred on reels for the symbol accumulation sequence. FIG. 3P shows the quantity of activations reset to 3 for the symbol accumulation sequence because these additional award symbols have been accumulated in this activation of the reels. FIG. 3P shows that the extra-row symbol 323 has occurred on the first secondary reel 322 and has been accumulated in the extra-row symbol collection area 320. FIG. 3P also shows that the double-up symbol 315 has occurred on the secondary reel 314 and has been accumulated in the double-up symbol collection area 310A. FIG. 3P thus shows at this point in the symbol accumulation sequence that: (1) three extra-row symbols have been accumulated in the extra-row symbol collection area 320 and the extra-row enhancement is ready to apply; (2) three boost symbols have been accumulated in the boost symbol collection area 320 and the boost enhancement is ready to apply; and (3) two double-up symbols have been accumulated in the double-up symbol collection area 310A.

FIGS. 3Q and 3R show that since three extra-row symbols have been accumulated in the extra-row symbol collection area 320, the EGM now applies this extra-row enhancement feature to the reels in the symbol accumulation sequence. FIG. 3R shows this extra row 290. FIGS. 3Q and 3R shows that since three boost symbols have been accumulated in the boost symbol collection area 330 that is no longer at this point blocked by the extra-row symbol collection area 320, the EGM now applies this boost enhancement feature to the accumulated award symbols in the symbol accumulation sequence. Specifically, the EGM adds a randomly determined amount to each of the values of all of the award symbols accumulated on the reels in the symbol accumulation sequence as best shown in FIG. 3S. In this example, a plurality of the added amounts are different, although two or more of the added values can be the same in accordance with the present disclosure. FIGS. 3R and 3S show that since three extra-row symbols have been accumulated in the extra-row symbol collection area 320, the EGM now adds a new extra-row symbol collection area 320A in the symbol accumulation sequence. FIG. 3S also shows that since three boost symbols have been accumulated in the boost symbol collection area 330, the EGM now adds a new boost symbol collection area 330A in the symbol accumulation sequence.

FIG. 3T shows the plurality of reels 210, 220, 230, 240, and 250 for the symbol accumulation sequence for an eighth activation of the reels for the symbol accumulation sequence. FIG. 3T shows no additional award symbols occurred on reels for the symbol accumulation sequence. FIG. 3S shows the quantity of activations as 2 for the symbol accumulation sequence. FIG. 3T shows that the boost symbol 335 has occurred on the secondary reel 334 and has been accumulated in the boost symbol collection area 330A. FIG. 3T thus shows at this point in the symbol accumulation sequence that: (1) two double-up symbols have been accumulated in the double-up symbol collection area 310A; (2) zero extra-row symbols have been accumulated in the extra-row symbol collection area 320A; and (3) one boost symbol has been accumulated in the boost symbol collection area 330A.

FIG. 3U shows the plurality of reels 210, 220, 230, 240, and 250 for the symbol accumulation sequence for a ninth activation of the reels for the symbol accumulation sequence. FIG. 3U shows two additional award symbols 259 and 260 occurred on reels for the symbol accumulation sequence. Specifically, these two award symbols have occurred and been accumulated in the extra row 290. FIG. 3U shows the quantity of activations reset to 3 for the symbol accumulation sequence because these additional award symbols have been accumulated in this activation of the reels. FIG. 3U shows that no additional boost, double-up, or extra-row symbols have occurred in this activation. FIG. 3U thus shows at this point in the symbol accumulation sequence that: (1) two double-up symbols have been accumulated in the double-up symbol collection area 310A; (2) zero extra-row symbols have been accumulated in the new extra-row symbol collection area 320A; and (3) one boost symbol has been accumulated in the boost symbol collection area 330A.

FIG. 3V shows the plurality of reels 210, 220, 230, 240, and 250 for the symbol accumulation sequence for a tenth activation of the reels for the symbol accumulation sequence. FIG. 3V shows no additional award symbols occurred on reels for the symbol accumulation sequence. FIG. 3V shows the quantity of activations as 2 for the symbol accumulation sequence. FIG. 3V shows that no additional boost, double-up, or extra-row symbols have occurred in this activation. FIG. 3V thus shows at this point in the symbol accumulation sequence that: (1) two double-up symbols have been accumulated in the double-up symbol collection area 310A; (2) zero extra-row symbols have been accumulated in the new extra-row symbol collection area 320A; and (3) one boost symbol has been accumulated in the boost symbol collection area 330A.

FIG. 3W shows the plurality of reels 210, 220, 230, 240, and 250 for the symbol accumulation sequence for an eleventh activation of the reels for the symbol accumulation sequence. FIG. 3W shows no additional award symbols occurred on reels for the symbol accumulation sequence. FIG. 3W shows the quantity of activations as 1 for the symbol accumulation sequence. FIG. 3W shows that one additional double-up symbol 317 have occurred in this activation. FIG. 3W shows that one extra-row symbol 323 has occurred in this activation. FIG. 3W thus shows at this point in the symbol accumulation sequence that: (1) three double-up symbols have been accumulated in the double-up symbol collection area 310A and that this enhancement feature is ready to apply to the accumulated award symbols; (2) one extra-row symbol has been accumulated in the extra-row symbol collection area 320A; and (3) one boost symbol has been accumulated in the boost symbol collection area 330A.

FIGS. 3X and 3Y show that since three double-up symbols have been accumulated in the double-up symbol collection area 310A, the EGM now applies this double-up enhancement feature (again) to the award symbols accumulated on the reels in the symbol accumulation sequence. Specifically, the EGM doubles the values of all of the award symbols accumulated on the reels in the symbol accumulation sequence. FIG. 3Y also shows that since three double-up symbols have been accumulated in the double-up symbol collection area 310A, the EGM now adds a new double-up symbol collection area 310B in the symbol accumulation sequence. FIG. 3Y also shows that the extra-row symbol collection area 320A and the boost symbol collection area 330A have both moved downwardly toward the reels.

FIG. 3Z shows the plurality of reels 210, 220, 230, 240, and 250 for the symbol accumulation sequence for a twelfth activation of the reels for the symbol accumulation sequence. FIG. 3Z shows no additional award symbols occurred on reels for the symbol accumulation sequence. FIG. 3Z shows an indication that the quantity of activations is 0 for the symbol accumulation sequence and thus there are no remaining activations of the reels for the symbol accumulation sequence. FIG. 3Z shows that no additional boost, double-up, or extra-row symbols have occurred in this activation. FIG. 3Z thus shows at this point in the symbol accumulation sequence that: (1) one extra-row symbol has been accumulated in the extra-row symbol collection area 320A; (2) one boost symbol has been accumulated in the boost symbol collection area 330A; and (3) no double-up symbols have been accumulated in the double-up symbol collection area 310B. FIG. 3Z shows that the total award as 4700 credits which is the sum values of the accumulated award symbols.

FIG. 3AA shows an alternative embodiment where after an enhancement feature is used one or more times, it does not reappear. In this example, the double-up symbol collection area 310B does not reappear after it is used the second time.

FIG. 3BB shows an alternative embodiment including alternative enhancement features and specifically alternative collection areas such as compress collection area 350 and jackpots collection area 360. The compress collection area 350 is associated with a compression enhancement feature and the jackpots collection area 360 is associated with a jackpot enhancement feature.

FIGS. 3CC, 3DD, and 3EE show for this alternative embodiment of FIG. 3BB that that since three compress symbols (not labeled) have been accumulated in the compress symbol collection area 350, the EGM applies the compress enhancement feature to the award symbols accumulated on the reels in the symbol accumulation sequence. Specifically, for each column, the EGM adds all the values of all of the award symbols accumulated on the reels in that column and displays a new award symbol at the bottommost symbol display position. The EGM displays the new award symbol indicating the sum of such values (or at least the sum of such values). The EGM also removes each of the other award symbols in each of the columns. In this example, (1) for the first column of symbol display positions, the EGM uses the values 200 and 75 respectively associated with the accumulated award symbols 271 and 272 to determine the value of 275 associated with the displayed new award symbol 281 (and removes the award symbols 271 and 272 from the display); (2) for the second column of symbol display positions, the EGM uses the values 100 and 200 respectively associated with the accumulated award symbols 273 and 274 to determine the value of 300 associated with the displayed new award symbol 282 (and removes the award symbols 273 and 274 from the display); (3) for the third column of symbol display positions, the EGM uses the values 75 and 50 respectively associated with the accumulated award symbols 275 and 276 to determine the value of 125 associated with the displayed new award symbol 283 (and removes the award symbols 275 and 276 from the display); (4) for the fourth column of symbol display positions, the EGM uses the values 100 and 100 respectively associated with the accumulated award symbols 277 and 278 to determine the value of 200 associated with the displayed new award symbol 284 (and removes the award symbols 277 and 278 from the display); and (5) for the fifth column of symbol display positions, the EGM uses the values 100 and 200 respectively associated with the accumulated award symbols 279 and 280 to determine the value of 300 associated with the displayed new award symbol 285 (and removes the award symbols 279 and 280 from the display). The EGM also removes the jackpot symbol collection area 360 for the rest of the sequence in this example embodiment (as shown in FIG. 3FF). In various embodiments, the EGM can apply this compression feature on less than all of the columns. In various other embodiments, the EGM can apply this compression feature to one or more of the rows of the symbol display positions. In various other embodiments, the EGM can apply this compression feature to one or more of the columns and to one or more of the rows of the symbol display positions. In various other embodiments, the EGM displays the multiple award symbols compressing into the single award symbol in any suitable manner.

Although not shown, the EGM can provide a collect symbol collection area that is associated with a collect enhancement feature that can apply to the award symbols accumulated on the reels in the symbol accumulation sequence. For the collect enhancement feature, the EGM adds all the values of all of the award symbols accumulated on all of the reels and displays and provides that total value to the player without changing any of the award symbols at the symbol display positions. The EGM thus continues to display the award symbol in each of the rows and columns. In various other embodiments, the EGM can apply this collect feature to less than all of the rows and/or columns.

It should be appreciated from the above example embodiments, that the gaming system and method of the present disclosure provide various different ways of providing a compression enhancement feature.

In one such example embodiment providing a compression enhancement feature, the gaming system and method: (1) cause a display of randomly determined accumulated award symbols at symbol display positions arranged in rows and columns, wherein a first plurality of the accumulated award symbols are at the symbol display positions of a first one of the columns; (2) cause a display of a randomly determined compression triggering event; (3) thereafter, cause a display of a new accumulated award symbol at one of the symbol display positions of the first one of the columns, wherein the displayed new accumulated award symbol indicates an award amount that is at least a sum of the award amounts indicated by the first plurality of accumulated award symbols at the symbol display positions of the first one of the columns prior to the display of the compression triggering event; and (4) after the display of the compression triggering event, cause a display of a removal the first plurality of accumulated award symbols from the symbol display positions of the first one of the columns. In various such embodiments, the gaming system and method cause a display after the display of the compression triggering event, of the first plurality of accumulated award symbols at the symbol display positions of the first one of the columns compressing to form the new accumulated award symbol. In various such embodiments, the gaming system and method: (1) cause a display for each of the columns, a plurality of the accumulated award symbols at the symbol display positions of the column before the display of the compression triggering event; (2) after the display of the compression triggering event, cause a display for each of the columns, of a new accumulated award symbol at one of the symbol display positions of the column, wherein the displayed new accumulated award symbol indicates an award amount that is at least a sum of the award amounts indicated by the plurality of accumulated award symbols at the symbol display positions of the column prior to the display of the compression triggering event; and (3) after the display of the compression triggering event, cause a display for each of the columns, of a removal the first plurality of accumulated award symbols from the symbol display positions of the column. In various such embodiments, the symbol display position of the first one of the columns that the new accumulated award symbol is displayed at is a bottommost symbol display position of the first one of the columns. In various such embodiments, the display of the compression triggering event includes a display of a plurality of randomly determined compression symbols. In various such embodiments, the compression symbols are different than the accumulated award symbols. In various such embodiments, the display of the compression triggering event includes a display of a plurality of compression symbols in a compression symbol accumulation area.

In another example embodiment providing a compression feature, the gaming system and method: (1) cause a display of randomly determined accumulated award symbols at symbol display positions arranged in rows and columns, wherein a first plurality of the accumulated award symbols are at symbol display positions of a first one of the rows; (2) cause a display of a randomly determined compression triggering event; (3) thereafter, cause a display of a new accumulated award symbol at one of the symbol display positions of the first one of the rows, wherein the displayed new accumulated award symbol indicates an award amount that is at least a sum of the award amounts indicated by the first plurality of accumulated award symbols at the symbol display positions of the first one of the rows prior to the display of the compression triggering event; and (4) after the display of the compression triggering event, cause a display of a removal the first plurality of accumulated award symbols from the symbol display positions of the first one of the rows. In various such embodiments, the gaming system and method cause a display after the display of the compression triggering event, of the first plurality of accumulated award symbols at the symbol display positions of the first one of the rows compressing to form the new accumulated award symbol. In various such embodiments, the gaming system and method: (1) cause a display for each of the rows, of a plurality of the accumulated award symbols at symbol display positions of the row before the display of the compression triggering event; (2) after the display of the compression triggering event, cause a display for each of the rows, of a new accumulated award symbol at one of the symbol display positions of the row, wherein the displayed new accumulated award symbol indicates an award amount that is at least a sum of the award amounts indicated by the plurality of accumulated award symbols at the symbol display positions of the row prior to the display of the compression triggering event; and (3) after the display of the compression triggering event, cause a display for each of the rows, of a removal the first plurality of accumulated award symbols from the symbol display positions of the row. In various such embodiments, the symbol display position of the first one of the rows that the new accumulated award symbol is displayed at an end most symbol display position of the first one of the rows. In various such embodiments, the display of the compression triggering event includes a display of a plurality of randomly determined compression symbols. In various such embodiments, the compression symbols are different than the accumulated award symbols. In various such embodiments, the display of the compression triggering event includes a display of a plurality of compression symbols in a compression symbol accumulation area.

In another example embodiment providing a compression feature, the gaming system and method: (1) cause a display of randomly determined accumulated award symbols at symbol display positions, each of the accumulated award symbols indicating an award amount associated with that accumulated award symbol; (2) cause a display of a randomly determined compression triggering event; (3) after the display of the compression triggering event, cause a display of a new accumulated award symbol at one of the symbol display positions, wherein the displayed new accumulated award symbol indicates an award amount that is at least a sum of the award amounts indicated by a first plurality of accumulated award symbols at the symbol display positions; and (4) after the display of the compression triggering event, cause a display of a removal the first plurality of accumulated award symbols from the symbol display positions. In various such embodiments, the gaming system and method cause a display after the display of the compression triggering event, of the first plurality of accumulated award symbols at the symbol display positions compressing to form the new accumulated award symbol. In various such embodiments, the gaming system and method: (1) after the display of the compression triggering event, cause a display of a plurality of new accumulated award symbols at a plurality of the symbol display positions, wherein each displayed new accumulated award symbol indicates an award amount that is at least a sum of the award amounts indicated by a different plurality of accumulated award symbols at the symbol display positions prior to the display of the compression triggering event; and (2) after the display of the compression triggering event, cause a display of a removal the all of the plurality of accumulated award symbols from the symbol display positions except for the plurality of new accumulated award symbols. In various such embodiments, the display of the compression triggering event includes a display of a plurality of randomly determined compression symbols. In various such embodiments, the compression symbols are different than the accumulated award symbols. In various such embodiments, the display of the compression triggering event includes a display of a plurality of compression symbols in a compression symbol accumulation area.

Turning back to the Figures, FIGS. 3FF, 3GG, 3HH, 3II, and 3JJ show for this alternative embodiment of FIGS. 3BB, 3CC, 3DD, and 3EE that since three jackpot symbols (not labeled) have been accumulated in the jackpot symbol collection area 360, the EGM applies the jackpot enhancement feature in the symbol accumulation sequence. This jackpot enhancement feature does not change the award symbols. Specifically, for this enhancement feature, the EGM displays an indication of the jackpot award (FIGS. 3GG and 3HH) and the amount of the jackpot award (FIG. 3II) and provides that award to the player. The EGM also removes the jackpot symbol collection area 360 for the rest of the sequence in this example embodiment (as shown in FIG. 3JJ).

In various embodiments, the EGM can apply this compression feature on less than all of the columns. In various other embodiments, the EGM can apply this compression feature to one or more of the rows of the symbol display positions. In various other embodiments, the EGM can apply this compression feature to one or more of the columns and to one or more of the rows of the symbol display positions. In various other embodiments, the EGM displays the multiple award symbols compressing into the single award symbol in any suitable manner.

In various embodiments, such as the example embodiments described above, the gaming system accumulates up to one award symbol for each symbol display position. In various other embodiments, the gaming system can accumulate more than one award symbol at one or more of the symbol display positions. In various embodiments, the award provided to the player is based on the accumulated award symbols at the symbol display positions at the end of the symbol accumulation sequence, In various embodiments, such as the example embodiments described above, the award provided to the player for the symbol accumulation sequence is based on the accumulated award symbols at the symbol display positions at the end of the symbol accumulation sequence. In various other embodiments, the award can be based on one or more other factors or symbols.

In various other embodiments, the gaming system provides a group gaming aspect to the sequence disclosed herein. In one such embodiment, the game is a cooperative community game wherein a plurality of players cooperate or play together during the symbol accumulation sequence to win one or more awards. In another such embodiment, the games disclosed herein a competition community game wherein a plurality of players compete or player against each other during the symbol accumulation sequence to win one or more awards.

In different embodiments, one or more awards provided in association with the games disclosed herein include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In various embodiments, one or more display devices of the EGM display the symbol accumulation sequence. In other embodiments, in addition or in alternative to each EGM displaying the symbol accumulation sequence, the gaming system causes one or more community or overhead display devices to display part or all of the symbol accumulation sequence to one or more other players or bystanders either at a gaming establishment or viewing over a network, such as the internet. In another embodiment, in addition or in alternative to each EGM displaying the symbol accumulation sequence, the gaming system causes one or more internet sites to each display the symbol accumulation sequence such that a player is enabled to log on from a personal web browser. In another such embodiment, the gaming system enables the player to play one or more games on one device while viewing the symbol accumulation sequence from another device. For example, the gaming system enables the player to play one or more games on a mobile phone while viewing the status of the symbol accumulation sequence on a desktop or laptop computer.

It should be appreciated that in different embodiments, one or more of the determinations disclosed herein is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal gaming device) are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
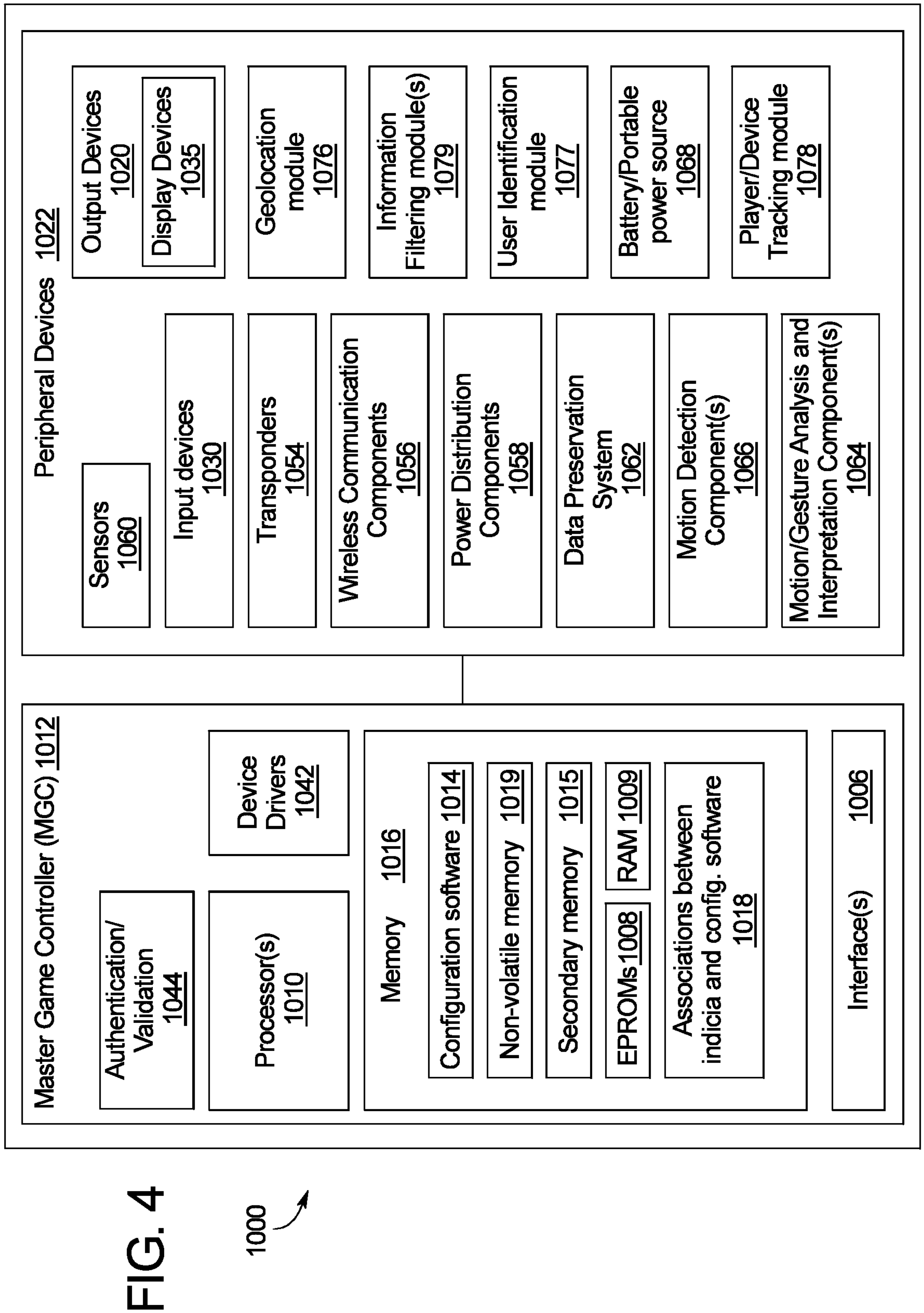
FIG. 4 is a schematic block diagram of one embodiment of an electronic configuration of an example gaming system disclosed herein.
Figure 5A:
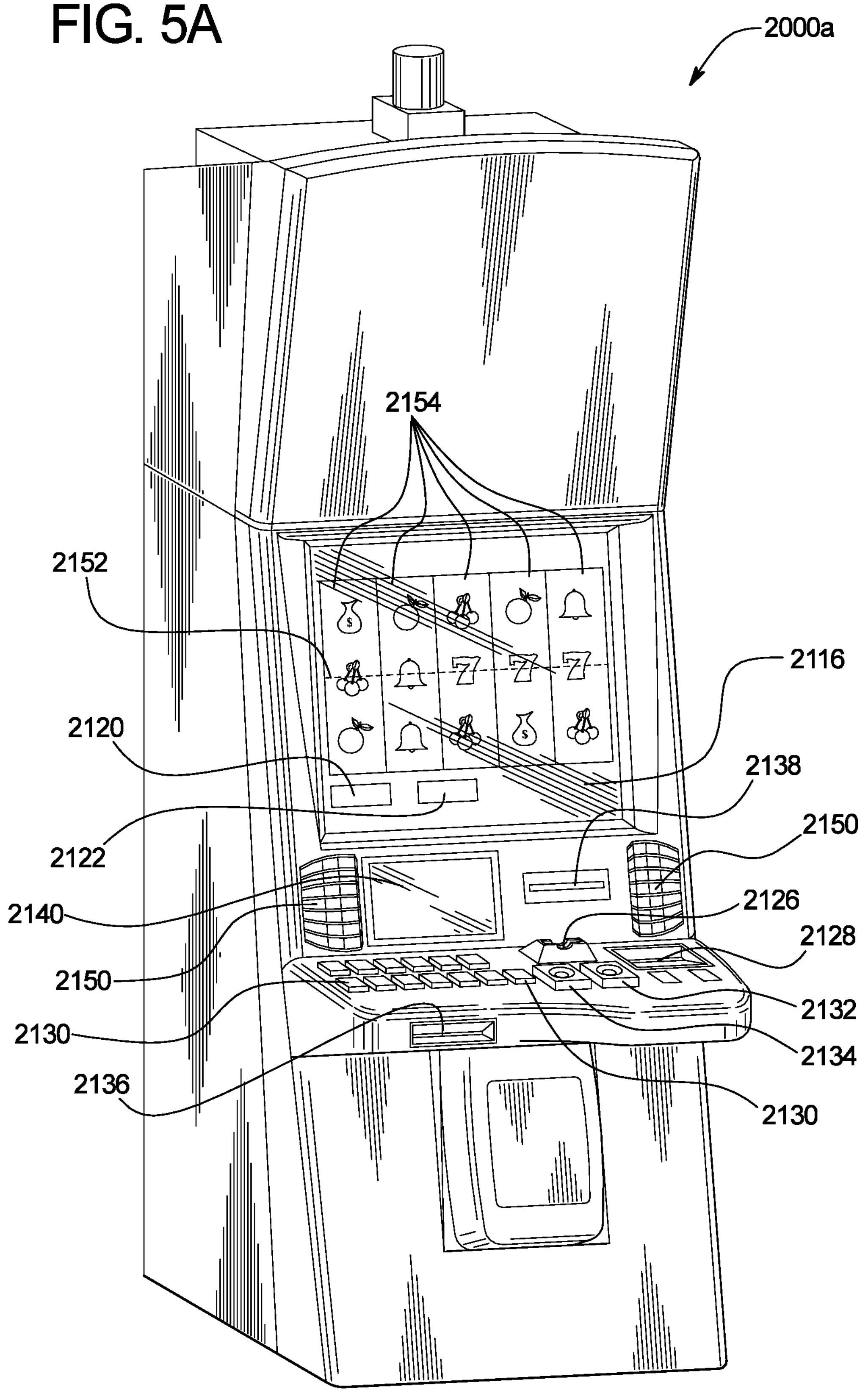
FIGS. 5A and 5B are perspective views of example alternative embodiments of the gaming system disclosed herein.
Figure 5B:
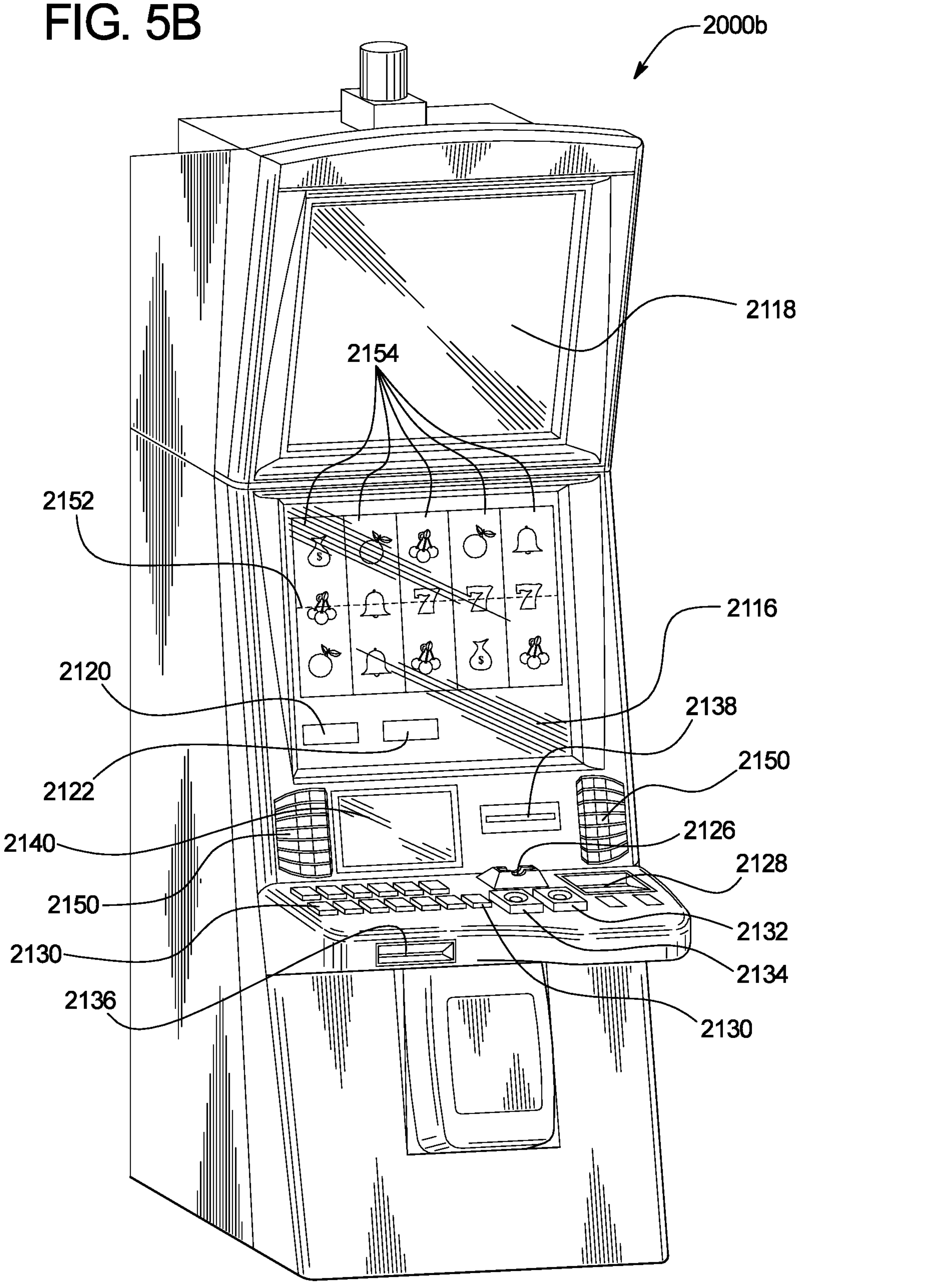
Figure 5C:
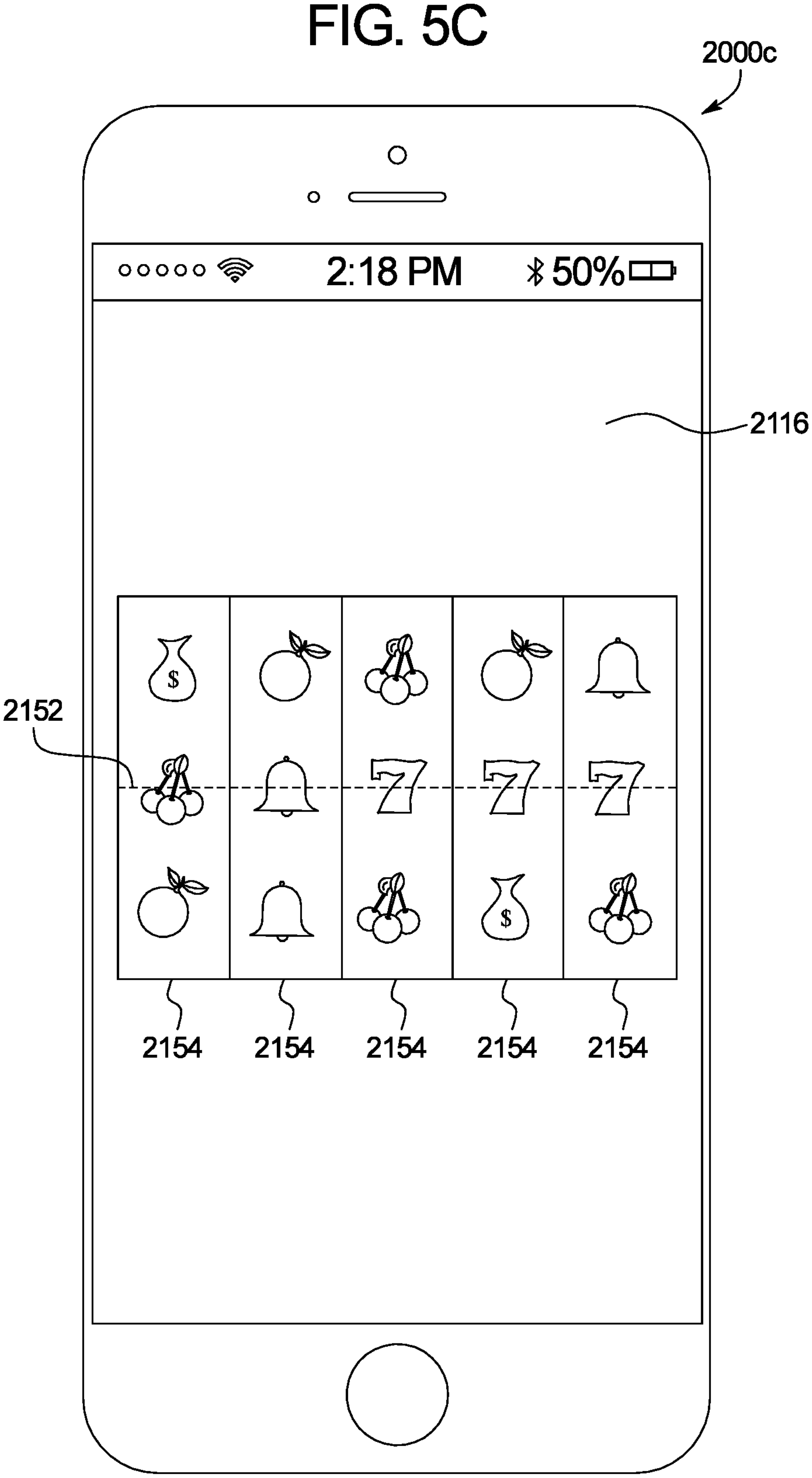
FIG. 5C is a front view of an example personal gaming device of the gaming system disclosed herein.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part, or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part, or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™' near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 5A includes a central display device 2116, a player tracking display 2140, a credit display 2120, and a bet display 2122. The example EGM 2000*b*** illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touchscreen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/

0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touchscreen coupled to a touch-screen controller or other touch-sensitive display overlay to enable interaction with any images displayed on a display device (as described below). One such input device is a conventional touch-screen button panel. The touchscreen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled “Finite Pool Gaming Method and Apparatus”; U.S. Pat. No. 7,563,163, entitled “Gaming Device Including Outcome Pools for Providing Game Outcomes”; U.S. Pat. No. 7,833,092, entitled “Method and System for Compensating for Player Choice in a Game of Chance”; U.S. Pat. No. 8,070,579, entitled “Bingo System with Downloadable Common Patterns”; and U.S. Pat. No. 8,398,472, entitled “Central Determination Poker Game,” which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled “Using Multiple Bingo Cards to Represent Multiple Slot Paylines and Other Class III Game Options”; U.S. Pat. No. 7,731,581, entitled “Multi-Player Bingo Game with Multiple Alternative Outcome Displays”; U.S. Pat. No. 7,955,170, entitled “Providing Non-Bingo Outcomes for a Bingo Game”; U.S. Pat. No. 8,070,579, entitled “Bingo System with Downloadable Common Patterns”; and U.S. Pat. No. 8,500,538, entitled “Bingo Gaming System and Method for Providing Multiple Outcomes from Single Bingo Pattern,” which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled “Gaming Machine Having a Lottery Game and Capability for Integration with Gaming Device Accounting System and Player Tracking System,” and U.S. Pat. No. 8,597,116, entitled “Virtual Player Tracking and Related Services,” which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 5B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game, or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity," which is incorporated herein by reference.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness, and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored, or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume, and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

a housing comprising an openable access door;

a security monitoring circuit within the housing and configured to monitor the access door, and that causes a signal to be sent to a remote server when the access door is opened;

a power distribution component within the housing;

a plurality of output devices comprising a display device supported by the housing and a speaker supported by the housing;

a plurality of input devices supported by the housing, said input devices comprising a touch screen coupled to the display device, a bill acceptor supported by the housing, a validator supported by the housing, and a cashout button supported by the housing;

a sound card within the housing and operable with the speaker;

a processor within the housing; and a trusted memory device within the housing and configured to provide a gaming regulatory authority a root trusted authority that can be tracked and verified as original, the trusted memory device storing a plurality of instructions that, when executed by the processor, cause the processor to:

cause a display, via the display device, of a credit balance after the acceptor receives a physical currency or a physical ticket and after the validator validates the physical currency or the physical ticket;

wherein the plurality of instructions, when executed by the processor, for a symbol accumulation sequence, cause the processor to:

cause a display, by a display device, of randomly determined accumulated award symbols at symbol display positions, the symbol display positions arranged in rows and columns, each of the accumulated award symbols indicating an award amount associated with that accumulated award symbol;

cause a display, by the display device, for each of the columns, of a plurality of the accumulated award symbols at the symbol display positions of the column;

cause a display, by the display device, of a randomly determined compression triggering event;

after the display of the compression triggering event, cause a display, by the display device, for each of the columns, of a new accumulated award symbol at one of the symbol display positions of the column, wherein the displayed new accumulated award symbol indicates an award amount that is at least a sum of the award amounts indicated by the plurality of accumulated award symbols at the symbol display positions of the column prior to the display of the compression triggering event;

after the display of the compression triggering event, cause a display, by the display device, for each of the columns, of a removal the first plurality of accumulated award symbols from the symbol display positions of the column;

cause a display, by the display device, of an award based on the plurality of new accumulated award symbols;

cause an increase in the credit balance by an amount based on the award; and in response to detecting a cashout input, via one of the plurality of input devices, initiate a payout associated with the credit.

2. The gaming system of claim 1, wherein when executed by the processor, the plurality of instructions cause the processor to cause a display, by the display device, after the display of the compression triggering event, of the plurality of accumulated award symbols at the symbol display positions of each of the columns compressing to form the new accumulated award symbol for that column.

3. The gaming system of claim 1, wherein the symbol display position of each of the columns that the new accumulated award symbol for that column is displayed at is a bottommost symbol display position of the first one of the columns.

4. The gaming system of claim 1, wherein the display of the compression triggering event comprises a display of a plurality of randomly determined compression symbols.

5. The gaming system of claim 4, wherein the compression symbols are different than the accumulated award symbols.

6. The gaming system of claim 1, wherein the display of the compression triggering event comprises a display of a plurality of compression symbols in a compression symbol accumulation area.

7. A gaming system comprising:

a housing comprising an openable access door;

a security monitoring circuit within the housing and configured to monitor the access door, and that causes a signal to be sent to a remote server when the access door is opened;

a power distribution component within the housing;

a plurality of output devices comprising a display device supported by the housing and a speaker supported by the housing;

a plurality of input devices supported by the housing, said input devices comprising a touch screen coupled to the display device, a bill acceptor supported by the housing, a validator supported by the housing, and a cashout button supported by the housing;

a sound card within the housing and operable with the speaker;

a processor within the housing; and a trusted memory device within the housing and configured to provide a gaming regulatory authority a root trusted authority that can be tracked and verified as original, the trusted memory device storing a plurality of instructions that, when executed by the processor, cause the processor to:

cause a display, via the display device, of a credit balance after the acceptor receives a physical currency or a physical ticket and after the validator validates the physical currency or the physical ticket;

wherein the plurality of instructions, when executed by the processor, for a symbol accumulation sequence, cause the processor to:

cause a display, by a display device, of randomly determined accumulated award symbols at symbol display positions, the symbol display positions arranged in rows and columns, each of the accumulated award symbols indicating an award amount associated with that accumulated award symbol;

cause a display, by the display device, for each of the rows, of a plurality of the accumulated award symbols at symbol display positions of the row before the display of the compression triggering event;

cause a display, by the display device, of a randomly determined compression triggering event;

after the display of the compression triggering event, cause a display, by the display device, for each of the rows, of a new accumulated award symbol at one of the symbol display positions of the row, wherein the displayed new accumulated award symbol indicates an award amount that is at least a sum of the award amounts indicated by the plurality of accumulated award symbols at the symbol display positions of the row prior to the display of the compression triggering event;

after the display of the compression triggering event, cause a display, by the display device, for each of the rows, of a removal the first plurality of accumulated award symbols from the symbol display positions of the row;

cause a display, by the display device, of an award based on the plurality of new accumulated award symbols;

cause an increase in the credit balance by an amount based on the award; and in response to detecting a cashout input, via one of the plurality of input devices, initiate a payout associated with the credit balance.

8. The gaming system of claim 7, wherein when executed by the processor, the plurality of instructions cause the processor to cause a display, by the display device, after the display of the compression triggering event, of the plurality of accumulated award symbols at the symbol display positions of each one of the rows compressing to form the new accumulated award symbol for that row.

9. The gaming system of claim 7, wherein the symbol display position of each one of the rows that the new accumulated award symbol for that row is displayed at an end most symbol display position of the rows.

10. The gaming system of claim 7, wherein the display of the compression triggering event comprises a display of a plurality of randomly determined compression symbols.

11. The gaming system of claim 10, wherein the compression symbols are different than the accumulated award symbols.

12. The gaming system of claim 7, wherein the display of the compression triggering event comprises a display of a plurality of compression symbols in a compression symbol accumulation area.

13. A gaming system comprising:

a housing comprising an openable access door;

a security monitoring circuit within the housing and configured to monitor the access door, and that causes a signal to be sent to a remote server when the access door is opened;

a power distribution component within the housing;

a plurality of output devices comprising a display device supported by the housing and a speaker supported by the housing;

a plurality of input devices supported by the housing, said input devices comprising a touch screen coupled to the display device, a bill acceptor supported by the housing, a validator supported by the housing, and a cashout button supported by the housing;

a sound card within the housing and operable with the speaker;

a processor within the housing; and a trusted memory device within the housing and configured to provide a gaming regulatory authority a root trusted authority that can be tracked and verified as original, the trusted memory device storing a plurality of instructions that, when executed by the processor, cause the processor to:

cause a display, via the display device, of a credit balance after the acceptor receives a physical currency or a physical ticket and after the validator validates the physical currency or the physical ticket;

wherein the plurality of instructions, when executed by the processor, for a symbol accumulation sequence, cause the processor to:

cause a display, by a display device, of randomly determined accumulated award symbols at symbol display positions, each of the accumulated award symbols indicating an award amount associated with that accumulated award symbol;

cause a display, by the display device, of a randomly determined compression triggering event;

after the display of the compression triggering event, cause a display, by the display device, of a plurality of new accumulated award symbols at a plurality of the symbol display positions, wherein each displayed new accumulated award symbol indicates an award amount that is at least a sum of the award amounts indicated by a different plurality of accumulated award symbols at the symbol display positions prior to the display of the compression triggering event;

after the display of the compression triggering event, cause a display, by the display device, of a removal all of the plurality of accumulated award symbols from the symbol display positions except for the plurality of new accumulated award symbols;

cause a display, by the display device, of an award based on the plurality of new accumulated award symbols;

cause an increase in the credit balance by an amount based on the award; and in response to detecting a cashout input, via one of the plurality of input devices, initiate a payout associated with the credit.

14. The gaming system of claim 13, wherein when executed by the processor, the plurality of instructions cause the processor to cause a display, by the display device, after the display of the compression triggering event, of the plurality of accumulated award symbols at the symbol display positions compressing to form the new accumulated award symbol.

15. The gaming system of claim 13, wherein the display of the compression triggering event comprises a display of a plurality of randomly determined compression symbols.

16. The gaming system of claim 15, wherein the compression symbols are different than the accumulated award symbols.

17. The gaming system of claim 13, wherein the display of the compression triggering event comprises a display of a plurality of compression symbols in a compression symbol accumulation area.

* * * * *